(12) United States Patent
Itani

(10) Patent No.: US 7,269,342 B1
(45) Date of Patent: Sep. 11, 2007

(54) VIDEO SIGNAL REPRODUCING DEVICE

(75) Inventor: Tetsuya Itani, Nara (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/869,096

(22) PCT Filed: Dec. 22, 1999

(86) PCT No.: PCT/JP99/07253

§ 371 (c)(1),
(2), (4) Date: Aug. 22, 2001

(87) PCT Pub. No.: WO00/38419

PCT Pub. Date: Jun. 29, 2000

(30) Foreign Application Priority Data

Dec. 22, 1998 (JP) .................. 10/364558
Jan. 20, 1999 (JP) .................. 11/011815
Jan. 21, 1999 (JP) .................. 11/012824

(51) Int. Cl.
*H04N 5/91* (2006.01)

(52) U.S. Cl. ........................ 386/129; 386/131

(58) Field of Classification Search .............. 386/46, 386/85, 110, 129, 131; 348/445, 446
See application file for complete search history.

(56) References Cited

U.S. PATENT DOCUMENTS

| | | | | |
|---|---|---|---|---|
| 5,276,515 A | * | 1/1994 | Katsumata et al. | 348/704 |
| 5,353,119 A | | 10/1994 | Dorricott et al. | |
| 5,563,660 A | | 10/1996 | Tsukagoshi | |
| 5,822,008 A | * | 10/1998 | Inoue et al. | 348/446 |

FOREIGN PATENT DOCUMENTS

| | | |
|---|---|---|
| CN | 1108020 A | 9/1995 |
| EP | 600446 A2 | 6/1994 |
| EP | 0 782 334 A2 | 7/1997 |
| EP | 0 888 018 A1 | 12/1998 |
| EP | 0 944 269 A1 | 9/1999 |
| GB | 2326304 A | 12/1998 |

OTHER PUBLICATIONS

International Search Report for PCT/JP99/07253, Apr. 11, 2000.

* cited by examiner

*Primary Examiner*—Huy Nguyen
(74) *Attorney, Agent, or Firm*—RatnerPrestia

(57) ABSTRACT

The image signal reproduction apparatus for reproducing a main image signal including either a first type of image signal obtained by converting a film material image into an electrical signal or a second type of image signal including a video signal as a material thereof, using a transfer information including the main image signal and a determination flag for determining whether the main image signal is the first type of image signal or the second type of image signal.

14 Claims, 60 Drawing Sheets

VIDEO SIGNAL REPRODUCING DEVICE

This application is a U.S. National Phase Application of PCT International Application PCT/JP99/07253.

TECHNICAL FIELD

The present invention relates to an image signal reproduction apparatus for reproducing a video signal in a progressive scanning way by transferring various image information such as movie materials or video materials via optical disks such as digital video disk (DVD), video tapes, satellite broadcast, ground-based broadcast, and the like.

BACKGROUND ART

Conventionally, image outputs of DVD, satellite broadcast, and the like are commonly output by interlaced scanning so that the video outputs can be reproduced by an image receiver. Recently, image signal reproducing apparatuses for converting interlaced scanned image signals into progressive scanned signals are being introduced as monitors and projectors compatible with multi-scanning, or monitors for computers are becoming widespread.

FIG. 39 is a block diagram showing a configuration of a conventional image signal reproducing apparatus. In FIG. 39, reference numeral 1 denotes a disk on which a main image signal and a determination flag are recorded in an encoded and modulated signal form suitable for recording in advance. The main signal is either an image signal obtained by converting a film material into an electrical signal or an image signal of which material is a video signal. The determination flag shows whether the main image signal is of film material or video material. Reference numeral 2 denotes a pickup which converts the signal recorded on the disk 1 into an electrical signal. Reference numeral 3 denotes a disk rotating device which rotates the disk 1 at a certain revolution-per-minute suitable for the disk 1. Reference numeral 4 denotes an interlaced scanned video signal reproduction circuit which demodulates and decodes the main image signal recorded on the disk 1, and outputs the resultant signal as an interlaced scanned image signal. Reference numeral 5 denotes a first memory which functions as a buffer memory when the interlaced scanned image signal is reproduced. Reference numeral 6 denotes an NTSC encoder which converts the interlaced scanned image signal into an NTSC video format and outputs the result. Reference numeral 7 denotes an interlaced scanned image output terminal through which the reproduced interlaced scanned image output is output. Reference numeral 8 denotes a first material determination circuit which reads the determination flag recorded on the disk 1 from an output of the pickup 2. Reference numeral 9 denotes a field repeat signal generating circuit which generates a field repeat signal when the interlaced scanned image signal reproduction circuit 4 converts the main image signal into an interlaced scanned image signal in the case when the main image signal is of film material. Reference numeral 10 denotes a progressive scanning conversion circuit which converts an output of the interlaced scanned image signal reproduction circuit 4 into a progressive scanned image signal and outputs the result. Reference numeral 11 denotes a second memory which is capable of storing a field of image signal and which is used in the operation of the progressive scanning conversion circuit 10. Reference numeral 12 denotes a D/A converter which converts an output of the progressive scanning conversion circuit 10 into an analog value and outputs the result. Reference numeral 13 denotes a progressive scanning image output terminal through which the progressive scanned image signal is output to an image display apparatus not shown.

The operation of the conventional image signal reproduction apparatus thus constructed will be described.

FIG. 40 is a schematic diagram showing structures of the interlaced scanned image signal and the progressive scanned image signal in the conventional image signal reproduction apparatus. In the interlaced scanned image signal, one field of image is created in ⅟60 second. One frame of image is composed of two fields. The number of vertical pixels of each of the two fields is 240. The pixels of one field are buried between the other fields in the vertical direction, vice versa. In the progressive scanned image signal, one frame is created in ⅟60 second and the number of pixels in the vertical direction is 480.

Both signals have a vertical frequency of ⅟60 second. The number of horizontal scanning lines of the progressive scanned image signal is twice as many as that of the interlaced scanned image signal. The horizontal scanning frequency of the interlaced scanned image signal is about 15.75 KHz, while that of the progressive scanned image signal is about 31.5 KHz.

FIG. 41 is a schematic signal diagram showing a structure of the image signal recorded in the disk 1 of the conventional image signal reproduction apparatus. As shown in FIG. 41, the image signal recorded in the disk 1 has two forms. Specifically, FIG. 41a) shows a film material. In this case, the original material is a film image composed of 24 frames of pictures per second. Each frame of the film image is compressed and recorded onto the disk 1 as an image of 720×480 dots. FIG. 41b) shows a video material image. In this case, the original material is an interlaced scanned image composed of 30 frames/60 fields per second. Each frame is an image of 720×480 dots, but interlaced, so that each field is an image of 720×240 dots. The field is compressed and recorded onto the disk 1. As shown in FIG. 41, the determination flag, which shows whether the main image signal is of film material or video material, is recorded on the disk 1 along with the main video signal.

FIG. 42 is a schematic signal diagram showing a reproduced signal from a film material disk of the conventional image signal reproduction apparatus.

When the material of the image signal recorded in the disk 1 is a film, 24 frames of images of 720×480 dots per second are recorded. The interlaced scanned image signal reproduction circuit 4 reads the signal recorded on the disk 1 from an output of the pickup 2. A first material determination circuit 8 reads the determination flag from an output of the pickup 2 and determines the type of the main image signal, and outputs the resultant type as a determination signal to the interlaced scanned image signal reproduction circuit 4 and the field repeat signal generation circuit 9. Based on an output of the first material determination circuit 8, the interlaced scanned image reproduction circuit 4 recognizes that the main image signal recorded in the disk 1 is of film material. As shown in FIG. 42, the film material images are recorded in the disk 1 in order of the frame numbers . . . , n, n+1, n+2, n+3, . . . . The film material signal thus recorded is converted into an interlaced scanned image and output by the interlaced scanned signal reproduction circuit 4. This is because television monitors are commonly used as an image display apparatus for home entertainment, and the display format is the interlaced scanning. Since the television monitor is designed to display a moving image of 30 frames/60 fields per second, the interlaced scanning video signal reproduction circuit 4 converts 24 frames of images per second into 30 frames/60 fields per second and outputs the result. The interlaced scanning video signal reproduction circuit 4 divides each frame of recorded information into two interlaced scanned field images, odd and even, as shown in the interlaced scanned reproduced image signal in FIG. 42. The interlaced scanning video signal reproduction circuit 4 further displays the head field after the last field of each frame in response to the field repeat signal repeated every 5 fields output from the field repeat signal generation circuit 9 so that 24 frames of film images per second are converted into the interlaced scanned images of 30 frames/60 fields per second which are output. The first memory 5 functions as a buffer memory when the interlaced scanning video signal reproduction circuit 4 reproduces an image. The interlaced scanning video signal reproduction circuit 4 outputs a breakpoint between frames of the interlaced scanned image signal thus generated as the field repeat signal to the progressive scanned conversion circuit 10 as shown in FIG. 12. The NTSC encoder 6 produces an NTSC standard video signal from the interlaced scanned image signal thus reproduced and outputs the result through the interlaced scanned image output terminal 7. A television monitor (not shown) is connected to the interlaced scanned image output terminal 7 so that the user can see the film material image converted into the interlaced scanned image on the monitor.

Further, the interlaced scanned image signal reproduced circuit 4 inputs the interlaced scanned image signal to the progressive scanning conversion circuit 10. The progressive scanning conversion circuit 10 recognizes that the input digital image signal is of film material, based on the presence or absence of the field repeat signal output of the field repeat signal generation circuit 9. Specifically, when the main image is of film material, the field repeat signal output from the field repeat signal generation circuit 9 changes to a 5 field period as shown in FIG. 12. Such a change is detected, and it is determined that the main image is the film material. Accordingly, the progressive scanned image conversion is performed. In the case of the film material, for each frame of each material, the original image of 720×480 dots is divided into two fields of 720×240 dots. Therefore, these fields are synthesized again. Accordingly, the progressive scanning conversion circuit 10 can detect the timing of switching of the frame of the film signal which is a material of the input digital image signal, based on the field repeat signal shown in FIG. 42. The progressive scanning conversion circuit 10 stores the head field of the progressive scanning conversion circuit input shown in FIG. 42 in the second memory 11 and thereafter stores the second field in the second memory 11, and reads both information for each line at a double speed, thereby obtaining the progressive scanning conversion output shown in FIG. 42. The converted image signal is converted into an analog signal by the D/A converter 12, and the resultant analog signal is output through the progressive scanned image signal output terminal 13. A television monitor (not shown) for the progressive scanned image signal is connected to the progressive scanned image signal output terminal 13. The user can see the film material images restored to the progressive scanned image via the television monitor.

FIG. 43 is a schematic signal diagram showing a reproduced signal of the conventional video material disk.

In the case when the material of image signals recorded in the disk 1 is video, an interlaced scanned image of 30 frames/60 fields per second is recorded as recorded information, each field having a 720×240 dots image as shown in FIG. 43. The interlaced scanned image signal reproduction circuit 4 reads the signal recorded in the disk 1 from an output of the pickup 2. The first material determination circuit 8 reads the determination flag from the output of the pickup 2 and determines the type of the main image signal, and outputs the determination flag as the determination signal to the interlaced scanned image signal reproduction circuit 4 and the field repeat signal generation circuit 9. As shown in FIG. 43, the video material images are recorded in the disk 1 in order of the frame numbers . . . , m, m+1, m+2, m+3, m+4, . . . . The interlaced scanned image signal reproduction circuit 4 outputs the video material signal thus recorded as the interlaced scanned image signal shown in FIG. 43 without alteration. The first memory 5 functions as a buffer memory when the interlaced scanned image signal reproduction circuit 4 reproduces an image.

The NTSC encoder 6 produces an NTSC standard video signal from the interlaced scanned image signal thus reproduced and outputs the result through the interlaced scanned image output terminal 7. A television monitor (not shown) is connected to the interlaced scanned image output terminal 7 so that the user can see the film material image converted into the interlaced scanned image via the monitor.

Further, the interlaced scanned image signal reproduced circuit 4 inputs the interlaced scanned image signal to the progressive scanning conversion circuit 10. The progressive scanning conversion circuit 10 recognizes that the input digital image signal is of video material, based on the presence or absence of the field repeat signal output of the field repeat signal generation circuit 9. Specifically, when the main image is of video material, the field repeat signal output from the field repeat signal generation circuit 9 keeps a 5 field period as shown in FIG. 43. Such a situation is detected, and it is determined that the main image is the video material. Accordingly, the progressive scanned image conversion is performed while the main image signal is regarded as the video material. In the case of the video material, the progressive scanning conversion circuit 10 generates a progressive scanned image signal using two pieces of field information, i.e., current field image information and the previous field. In this case, the progressive scanning conversion circuit 10 also uses data for the previous field to interpolate in the vertical direction with respect to pixels having small movements between the current and previous fields of the progressive scanned conversion circuit input shown in FIG. 43. With respect to pixels having large movements between the current and previous fields, vertical interpolated data is generated from upper and lower pixel data in the same field to obtain a progressive scanning conversion circuit output shown in FIG. 43. The converted image signal is converted into an analog signal by the D/A converter 12. The analog signal is output through the progressive scanned image signal output terminal 13. A television monitor (not shown) for the progressive scanned image signal is connected to the progressive scanned image signal output terminal 13 so that the user can see the video material image converted into the progressive scanned image via the monitor.

FIG. 44 is a schematic signal diagram showing a reproduced signal from a disk, which is a film material disk partially including a recorded video signal, of the conventional image signal reproduction apparatus.

Even when the signal source is of film material, part of the signal source may be recorded as a video signal. This happens as follows. A film material may initially be recorded in a video or the like before being recorded on the disk 1. When the material as video is restored to 24-frame information again, part of the material remains as video and is recorded in the disk 1. Specifically, when information to be recorded in the disk 1 is generated, a breakpoint between the frames of the original picture in the recorded video is found by detecting a matching every 5 fields in the material recorded in the video of 60 fields, and the video is restored to 24-frame information which is in turn recorded on the disk 1. Therefore, when noise or the like occurs in the information in the video, the detection of a matching every 5 fields is not successful. The video information remains as it is, and is still recorded on the disk.

In FIG. 44, the $n^{th}$ frame and the $n+1^{th}$ frame in the recorded information are recorded as film material while the $n+2^{th}$ frame to the $n+6^{th}$ frame are recorded as video information. The $n+7^{th}$ frame and thereafter are recorded as film material. When such a disk is reproduced by the conventional image information reproduction apparatus, the $n^{th}$ frame, the $n+1^{th}$ frame, and the $n+2^{th}$ frame are processed as film information. However, since a field repeat signal existing originally is not detected in the even field of the $n+3^{th}$ frame, the progressive scanning conversion circuit 10 determines that the $n+3^{th}$ frame is of video material and thereafter performs the progressive scanning conversion for up to the $n+7^{th}$ frame as video material. The progressive scanning conversion circuit 10 starts performing the progressive scanning conversion again from the $n+8^{th}$ frame as video material. Specifically, in a portion indicated by A in FIG. 44, although the material is actually film, the progressive scanning conversion circuit 10 operates, recognizing the material as video. Thus, the progressive scanning conversion is not optimized.

In such an image signal reproduction apparatus, optimized progressive scanning conversion cannot be performed for an image signal of film material which has been partially recorded as a video signal of 60 fields per second as described above, causing the picture quality to be reduced. This is a drawback for the image signal reproduction apparatus. Accordingly, there is a demand for an image signal reproduction apparatus capable of applying progressive scanning conversion suitable for film material to an image signal of film material which has been partially recorded as a video signal of 60 fields per second.

Conventionally, image outputs of reproduction only disks such as a digital versatile disk (hereinafter referred to as DVD) and CD, magneto-optical disks for recording using optical and magnetic means (hereinafter generically referred to as optical disks), satellite broadcast, ground-based broadcast, and the like are commonly output by interlaced scanning so that the video outputs can be reproduced by an image receiver. Recently, image signal reproducing apparatuses for converting interlaced scanned image signals into progressive scanned signals are being introduced as monitors and projectors compatible with multi-scanning, or monitors for computers is becoming widespread.

FIG. 45 is a block diagram showing a configuration of a conventional image signal reproducing apparatus. In FIG. 45, reference numeral 201 denotes a disk on which either an image signal obtained by converting a film material image into an electrical signal or an image signal of which material is a video signal is recorded in an encoded and modulated signal form suitable for pre-recording in advance. Reference numeral 202 denotes a pickup which converts the signal recorded on the disk 201 into an electrical signal. Reference numeral 203 denotes a disk rotating device which rotates the disk 201 at a certain revolutions-per-minute suitable for the disk 201. Reference numeral 204 denotes an interlaced scanned video signal reproduction circuit which demodulates and decodes the image signal recorded on the disk 201, and outputs the resultant signal as an interlaced scanned image signal. Reference numeral 205 denotes an NTSC encoder which converts the interlaced scanned image signal into an NTSC video format and outputs the result. Reference numeral 206 denotes an interlaced scanned image output terminal through which the reproduced interlaced scanned image is output. Reference numeral 207 denotes a progressive scanned image signal conversion circuit which converts an output of the interlaced scanned image signal reproduction circuit 204 into a progressive scanned image signal and outputs the result. Reference numeral 208 denotes a first memory which is capable of storing a field of image signals and which is used in the operation of the progressive scanned image signal conversion circuit 207. Reference numeral 209 denotes a color difference converter which converts an output of the progressive scanned image signal conversion circuit 207 into a progressive scanned color difference signal and outputs the result. Reference numeral 210 denotes a progressive scanning image output terminal through which the progressive scanned image signal is output to an image display apparatus not shown.

The operation of the conventional image signal reproduction apparatus thus constructed will be described with reference to FIGS. 46 through 50.

FIG. 46 is a schematic diagram showing structures of the interlaced scanned image signal and the progressive scanned image signal in the conventional image signal reproduction apparatus. In the interlaced scanned image signal, one field of image is created in 1/60 second. One frame of image is composed of two fields. The number of vertical pixels of each of the two fields is 240. The pixels of one field are buried between the other fields in the vertical direction, vice versa. In the progressive scanned signal, one frame is created in 1/60 second and the number of pixels in the vertical direction is 480. Both have a vertical frequency of 1/60 second. The number of horizontal scanning lines of the progressive scanned image signal is twice as many as that of the interlaced scanned image signal. The horizontal scanning frequency of the interlaced scanned image signal is about 15.75 KHz, while that of the progressive scanned image signal is about 31.5 KHz.

FIG. 47 is a schematic signal diagram showing a structure of an image signal recorded in the disk 201 of the conventional image signal reproduction apparatus. As shown in FIG. 47, the image signal recorded in the disk 201 has two forms. Specifically, FIG. 47*a*) shows a film material. In this case, the original material is a film image composed of 24 frames of pictures per second. Each frame of the film image is compressed and recorded onto the disk 201 as an image of 720×480 dots. FIG. 47*b*) shows a video material image. In this case, the original material is an interlaced scanned image composed of 30 frames/60 fields per second. Each frame is an image of 720×480 dots, but is interlaced, so that each field is an image of 720×240 dots. The field is compressed and recorded onto the disk 201.

When the material of the image signal recorded in the disk 201 is a film, 24 frames of images of 720×480 dots per second are recorded as recorded information. The interlaced scanned image signal reproduction circuit 204 reads the signal recorded on the disk 201 from an output of the pickup 202. As shown in FIG. 47*a*-1), the film material images are recorded in the disk 201 in order of the frame numbers . . . , n, n+1, n+2, n+3, . . . .

The film material signal thus recorded is modulated and converted into an interlaced scanned image and output by the interlaced scanned signal reproduction circuit 204. This is because television monitors are most commonly used as an image display apparatus for home entertainment, and the display format is the interlaced scanning. Since the television monitor is designed to display a moving image of 30 frames/60 fields per second, the interlaced scanning video signal reproduction circuit 204 converts 24 frames of images per second into an interlaced scanned image of 30 frames/60 fields per second and outputs the result.

Specifically, the interlaced scanning video signal reproduction circuit 204 divides each frame of recorded information into two interlaced scanned field images, odd and even, as shown in the interlaced scanned reproduced image output in FIG. 47a-2). The interlaced scanning video signal reproduction circuit 204 further displays the head field after the last field of each frame so that 24 frames of film images per second are converted into the interlaced scanned images of 30 frames/60 fields per second which are output. The NTSC encoder 205 produces an NTSC standard video signal from the interlaced scanned image signal thus reproduced, and outputs it through the interlaced scanned image output terminal 206. A television monitor (not shown) is connected to the interlaced scanned image output terminal 206 so that the user can see the film material image converted into the interlaced scanned image on the monitor.

Further, the interlaced scanned image signal reproduced circuit 204 inputs the interlaced scanned image signal to the progressive scanned image signal conversion circuit 207. The progressive scanned image signal conversion circuit 207 stores the head field of the progressive scanning conversion circuit input shown in FIG. 47a-2) in the first memory 7 and thereafter stores the second field in the first memory 7, and reads both information for each line at a double speed, thereby obtaining the progressive scanning conversion output shown in FIG. 47a-3). The converted image signal is converted into an analog signal by the color difference converter 209, and the resultant analog signal is output through the progressive scanned image signal output terminal 210. A television monitor (not shown) for the progressive scanned image signal is connected to the progressive scanned image signal output terminal 210. The user can see the film material images restored to the progressive scanned image via the television monitor.

In the case when the material of image signals recorded in the disk 201 is video, an interlaced scanned image of 30 frames/60 fields per second is recorded as recorded information, each field having a 720×240 dots image. The interlaced scanned image signal reproduction circuit 204 reads the signal recorded in the disk 201 from an output of the pickup 202, and modulates the signal and outputs the modulated signal as the interlaced scanned image signal shown in FIG. 47b-2) without alteration.

The NTSC encoder 205 produces an NTSC standard video signal from the interlaced scanned image signal thus reproduced and outputs it through the interlaced scanned image output terminal 206. A television monitor (not shown) is connected to the interlaced scanned image output terminal 206 so that the user can see the film material image converted into the interlaced scanned image via the monitor.

Further, the interlaced scanned image signal reproduced circuit 204 inputs the interlaced scanned image signal to the progressive scanned image signal conversion circuit 207. In the case of the video material, the progressive scanning conversion circuit 207 generates a progressive scanned image signal using two pieces of field information, i.e., current field image information and the previous field. In this case, the progressive scanned image signal conversion circuit 207 also uses data for the previous field to interpolate in the vertical direction with respect to pixels having small movements between the current and previous fields of the progressive scanned conversion circuit output shown in FIG. 47b-2). With respect to pixels having large movements between the current and previous fields, vertical interpolated data is generated from upper and lower pixel data in the same field to obtain a progressive scanning conversion circuit output shown in FIG. 47b-3). The converted image signal is converted into an analog progressive scanned color difference signal by the color difference converter 209. The analog progressive scanned color difference signal is output through the progressive scanned image signal output terminal 210. A television monitor (not shown) for the progressive scanned image signal is connected to the progressive scanned image signal output terminal 210 so that the user can see the video material image converted into the progressive scanned image via the monitor.

FIG. 48 is a schematic diagram showing the vertical frequency characteristics of materials for the conventional image signal reproduction apparatus. In the case of the video material to be interlaced scanned, each field has 240 lines, two fields having 480 lines. In the case of the film material, optical information recorded on the original film is converted into electrical information of 480 lines of progressive scanned signals. Therefore, the vertical frequency characteristics are of a high band region indicated by the characteristics of the film material shown in FIG. 48. The film material image is supposed to be reproduced by the interlaced scanned receiver. Bandwidth is limited in advance in order to avoid feedback interference. As indicated by the characteristics of the film material after removing interlace interference, the vertical frequency characteristics are reduced to the same level as that of the characteristics of the video material, at which level the film material image is recorded.

FIG. 49 is a schematic diagram showing the vertical frequency characteristics of a progressive scanned image output for the conventional image signal reproduction apparatus. As shown in FIG. 49, the vertical frequency characteristics after conversion into the progressive scanned image output are inferior to the characteristics of the original film material.

FIG. 50 is a schematic diagram showing the frequency characteristics of visual appreciation of the interlaced scanned image and the progressive scanned image output of the conventional image signal reproduction apparatus. In general, a progressive scanning image monitor has twice as many the number of the horizontal scanning frequency as that of an interlaced scanning image monitor. Therefore, the electrical and optical frequency bands required to attain the same resolution needs to be doubled. The double number of scanning lines leads to a characteristic in which visual impression is low resolution. Therefore, comparing the interlaced scanned image signal with the image signal obtained by converting the interlaced scanned image signal into the progressive scanned image signal, the latter image signal gives the user the impression that the frequency characteristics are poorer. Particularly, in the conventional image signal reproduction apparatus, the interlaced scanned image and the progressive scanned image are output at the same time. Therefore, both images can be easily compared with each other, so that a large difference between both images would be a large drawback for the image signal reproduction apparatus.

In such an image signal reproduction apparatus, there is a problem in that, as described above, with respect to the film material image signal, the vertical frequency after the progressive scanning conversion has characteristics significantly inferior to the characteristics of the original film. There is also a problem in that there is the visual impression that the picture quality after the progressive scanning conversion has lower resolution than that of the picture quality after the interlaced scanning.

Accordingly, there is a demand for introduction of an image signal reproduction apparatus capable of outputting a progressive scanned signal which has resolution close to that of the original film after the progressive scanning conversion and has resolution which is not visually degraded as compared with the interlaced scanned image.

Conventionally, image outputs of DVD, satellite broadcast, and the like are commonly output by interlaced scanning so that the video outputs can be reproduced by an image receiver. Recently, image signal reproducing apparatuses for converting interlaced scanned image signals into progressive scanned signals are being introduced as monitors and projectors compatible with multi-scanning, or monitors for computers is becoming widespread.

FIG. 51 is a block diagram showing a configuration of an image signal reproduction apparatus which is a conventional example of the technologies related to the present invention. The image signal reproduction apparatus includes an image signal and a determination flag for determining the aspect ratio of the image signal, and reproduces an information signal recorded on a disk. In FIG. 51, reference numeral 301 denotes a disk on which an image signal and the determination flag indicating the aspect ratio of the image signal are recorded in an encoded and modulated signal form suitable for recording (or reproduction) in advance. Reference numeral 302 denotes a pickup which converts the signal recorded on the disk 301 into an electrical signal. Reference numeral 303 denotes a disk rotating device which rotates the disk 301 at a certain revolutions-per-minute suitable for the disk 301. Reference numeral 304 denotes an interlaced scanned video signal reproduction circuit which demodulates and decodes the image signal recorded on the disk 301, and outputs the resultant signal as an interlaced scanned image signal. Reference numeral 305 denotes a material determination circuit which reads the determination flag recorded on the disk 301 from an output of the pickup 302.

Reference numeral 306 denotes a first aspect ratio conversion circuit which is controlled by the first control circuit 312 and which converts the aspect ratio of the input image signal and outputs the result. Reference numeral 307 denotes an NTSC encoder which converts the interlaced scanned image signal into an NTSC video format and outputs the result. Reference numeral 308 denotes an interlaced scanned image output terminal through which the reproduced interlaced scanned image is output to a monitor (not shown) for the interlaced scanned image signal.

Reference numeral 309 denotes a progressive scanned image signal conversion circuit which converts an output of the first aspect ratio conversion circuit 306 into a progressive scanned image signal and outputs the result. Reference numeral 310 denotes a color difference converter which converts an output of the progressive scanned image signal conversion circuit 309 into an analog color difference signal and outputs the result. Reference numeral 311 denotes a progressive scanning image output terminal through which the progressive scanned image signal is output to a monitor (not shown) for the progressive scanning image.

Reference numeral 312 denotes a first control circuit which controls the first aspect ratio conversion circuit 306 using an output of the material determination circuit 305 and an output of a first aspect ratio setting section 313. Reference numeral 313 denotes the first aspect ratio setting section which is used by the user to set the aspect ratio of the receiver.

The operation of the conventional image signal reproduction apparatus thus constructed will be described with reference to FIGS. 52 through 60.

FIG. 52 is a schematic diagram showing structures of the interlaced scanned image signal and the progressive scanned image signal in disk 301 in the conventional image signal reproduction apparatus. In the interlaced scanned image signal, one field of image is created in ⅟60 second. One frame of image is composed of two fields. The number of vertical pixels of each of the two fields is 240. The pixels of one field are buried between the other fields in the vertical direction, vice versa. In the progressive scanned signal, one frame is created in ⅟60 second and the number of pixels in the vertical direction is 480. Both have a vertical frequency of ⅟60 second. The number of horizontal scanning lines of the progressive scanned image signal is twice as many as that of the interlaced scanned image signal. The horizontal scanning frequency of the interlaced scanned image signal is about 15.75 KHz, while that of the progressive scanned image signal is about 31.5 KHz.

FIG. 53 is a schematic signal diagram showing the aspect ratio of an image signal of the conventional image signal reproduction apparatus. As shown in FIG. 53a), the image signal of image source recorded in the disk 301 has three forms. Specifically, FIG. 53a)a-1) shows a material having information which fills a full screen of 4:3 (hereinafter referred to as a 4:3 full image). FIG. 53a)a-2) shows a material having an image of 16:9 in the middle of the 4:3 screen, the upper and lower portions being shaded (hereinafter referred to as a 4:3 letterbox image). FIG. 53a)a-3) shows a material having information which fills a full screen of 16:9 (hereinafter referred to as a 16:9 full image).

FIG. 53b) shows the aspect ratio of the monitor for the interlaced scanned image signal. As shown in FIG. 53b), there are two types of monitor for the interlaced scanned image signal, one type shown in FIG. 53b)b-1) having an aspect ratio of 4:3 and the other shown in FIG. 53b)b-2) having an aspect ratio of 16:9.

FIG. 53c) shows the aspect ratio of the monitor for the progressive scanned image signal. As shown in FIG. 53c), there are two types of monitor for the interlaced scanned image signal, one type shown in FIG. 53c)c-1) having an aspect ratio of 4:3 and the other shown in FIG. 53c)c-2) having an aspect ratio of 16:9.

The interlaced scanned image signal reproduction circuit 304 reads a signal recorded on the disk 301 from an output of the pickup 302, reproduces the interlaced scanned image signal, and outputs the result to the first aspect ratio conversion circuit 306. The material determination circuit 305 reads the determination flag from an output of the pickup 302, determines the type of the image signal, and outputs the result as the determination signal to the first control circuit 312.

The user sets the aspect ratio of a monitor via which the user intends to output the image signal, using the first aspect ratio setting section 313. The first control circuit 312 controls the first aspect ratio conversion circuit 306 using an output of the material determination circuit 305 and an output of the first aspect ratio setting section 313.

FIG. 54 is a schematic diagram for explaining the operation of the first aspect ratio conversion circuit 306 of the conventional image signal reproduction apparatus. Assuming that the monitor has an aspect ratio of 4:3, the first aspect ratio conversion circuit 306 has a function which compresses a material having an aspect ratio of 16:9 in the vertical direction. Specifically, in order to display the 16:9 material on the 4:3 monitor at the correct aspect ratio, 4 lines of information of an input image signal are subjected to a filtering process so that 3 lines of information are generated. Such a process is performed for the entire screen, so that the entire screen is compressed in the vertical direction. In this case, the aspect ratio is correctly converted for the 16:9 screen, but leaves blanks in the upper and lower portions. Such portions are rendered as black images. The aspect ratio conversion function can select a working or non-working state using the first control circuit 312. In the case of the non-working state, the first aspect ratio conversion circuit 306 outputs the input image signal without the aspect ratio conversion.

In FIG. 51, the user sets the aspect ratio of the monitor for display to 4:3 or 16:9 using the first aspect ratio setting section 313. On the other hand, the material determination circuit 305 outputs the aspect ratio of the image source, i.e., whichever it is, the 4:3 full screen or the 4:3 letterbox screen or the 16:9 screen, to the first control circuit 312. The first control circuit 312 causes the aspect ratio conversion operation of the first aspect ratio conversion circuit 306 to be in the non-working state when the aspect ratio of the image source of the material determination circuit 305 is the 4:3 full image or the 4:3 letterbox image. The first control circuit 312 causes the aspect ratio conversion operation of the first aspect ratio conversion circuit 306 to be in the non-working state when the material determination circuit 305 indicates that the aspect ratio of the image source is 16:9 and the first aspect ratio setting section outputs 16:9. Note that the first control circuit 312 causes the aspect ratio conversion operation of the first aspect ratio conversion circuit 306 to be in the working state when the material determination circuit 305 indicates that the aspect ratio of the image source is 16:9 and the first aspect ratio setting section outputs 4:3.

The NTSC encoder 307 converts an output of the first aspect ratio conversion circuit 306 to the NTSC video format. The interlaced scanned image output is output through the interlaced scanned image output terminal 308 to the interlaced scanned image monitor (not shown).

Next, the cases when the image source of the conventional image signal apparatus corresponds to the angle of view of the interlaced scanned image monitor image and when the image source of the conventional image signal apparatus corresponds to the angle of view of the progressive scanned image monitor image, will be described with respect to FIGS. 55 through 57 and FIGS. 58 through 60, respectively, for each of the 4:3 full screen, the 4:3 letterbox image, and the 16:9 image.

FIG. 55 is a schematic diagram for explaining the aspect ratio of an image displayed on the interlaced scanned image monitor in the case of the image source having the 4:3 full image in the conventional image signal reproduction apparatus. As shown in FIG. 55b-1, the correct aspect ratio is displayed on the 4:3 monitor. However, as shown in FIG. 55b-2, the 16:9 monitor does not display the correct aspect ratio, so that the displayed image is extended horizontally. On the other hand, the interlaced scanned image monitor includes a 4:3 output switch function since the standard aspect ratio of the conventional interlaced scanned image signal is 4:3. The interlaced scanned image monitor can display as shown in FIG. 55b-3 at the correct 4:3 aspect ratio using the 4:3 output switch function.

FIG. 56 is a schematic diagram for explaining the aspect ratio of an image displayed on the interlaced scanned image monitor in the case of the image source having the 4:3 letterbox image in the conventional image signal reproduction apparatus. As shown in FIG. 56b-1, the correct aspect ratio is displayed on the 4:3 monitor. However, as shown in FIG. 56b-2, the 16:9 monitor does not display the correct aspect ratio, so that the displayed image is extended horizontally. On the other hand, the interlaced scanned image monitor includes a 4:3 letterbox image output switch function since the standard aspect ratio of the conventional interlaced scanned image signal is 4:3. The interlaced scanned image monitor can display as shown in FIG. 56b-3 at the correct 16:9 aspect ratio using the 4:3 output switch function.

FIG. 57 is a schematic diagram for explaining the aspect ratio of an image displayed on the interlaced scanned image monitor in the case of the image source having the 16:9 image in the conventional image signal reproduction apparatus. As shown in FIG. 57b-1, the aspect ratio with no change is not correctly displayed on the 4:3 monitor, so that the displayed image is extended vertically. However, if the user sets the fact that a monitor to be connected is 16:9, to the first aspect ratio setting section, the first aspect ratio conversion circuit 306 is activated. The aspect ratio is converted so that the image is correctly displayed as shown in FIG. 57b-4. In addition, as shown in FIG. 57b-2, the 16:9 monitor displays the image at the 16:9 aspect ratio.

Specifically, in the conventional image signal reproduction apparatus, the interlaced scanned image monitor can display at the correct aspect ratio any combination of 3 types of image sources, i.e., the 4:3 full image, the 4:3 letterbox image, and the 16:9 image with 2 types image monitor, i.e., the 4:3 monitor and the 16:9 monitor.

An output of the first aspect ratio conversion circuit 306 is input to the progressive scanned image signal conversion circuit 309. The progressive scanned image signal conversion circuit 309 converts the input interlaced scanned image signal to the progressive scanned image signal, and outputs the result. The color difference converter 310 converts the progressive scanned image signal to a color difference image signal, and outputs the progressive scanned image output through the progressive scanned image output terminal 311 to the progressive scanned image monitor (not shown).

FIG. 58 is a schematic diagram for explaining the aspect ratio of an image displayed on the progressive scanned image monitor in the case of the image source having the 4:3 full image in the conventional image signal reproduction apparatus. As shown in FIG. 58c-1, the aspect ratio is correctly displayed on the 4:3 monitor. However, as indicated by c-2 in FIG. 58, the aspect ratio with no change is not correctly displayed on the 16:9 monitor, so that the displayed image is extended horizontally. Here, the progressive scanned image 16:9 monitor is a monitor intended to receive a high-definition television signal, and does not include the 4:3 output mode. The 16:9 standard aspect ratio of the high-definition television signal is not displayed at the correct aspect.

FIG. 59 is a schematic diagram for explaining the aspect ratio of an image displayed on the progressive scanned image monitor in the case of the image source having the 4:3 letterbox image in the conventional image signal reproduction apparatus. As shown in FIG. 59c-1, the aspect ratio is correctly displayed on the 4:3 monitor. However, as indicated by c-2 in FIG. 59, the aspect ratio with no change is not correctly displayed on the 16:9 monitor, so that the displayed image is extended horizontally. As described above, the progressive scanned image 16:9 monitor is a monitor intended to receive a high-definition television signal, and does not include the 4:3 letterbox output mode.

The 16:9 standard aspect ratio of the high-definition television signal is not displayed at the correct aspect.

FIG. 60 is a schematic diagram for explaining the aspect ratio of an image displayed on the progressive scanned image monitor in the case of the image source having the 16:9 image in the conventional image signal reproduction apparatus. As shown in FIG. 60c-1, the aspect ratio with no change is not correctly displayed on the 4:3 monitor, so that the displayed image is extended vertically. However, if the user indicates the fact that a monitor to be connected is 16:9, to the first aspect ratio setting section, the first aspect ratio conversion circuit 306 is activated. The aspect ratio is converted so that the image is correctly displayed as shown in FIG. 60c-4. In addition, as shown in FIG. 60c-3, the 16:9 monitor displays the image at the 16:9 aspect ratio.

In other words, in the conventional image signal reproduction apparatus, the progressive scanned image monitor cannot display at the correct aspect ratio a combination of the image sources of the 4:3 full image and the 4:3 letterbox image with the 16:9 image monitor.

As described above, in the conventional image signal reproduction apparatus, there is a problem in that the progressive scanned image monitor cannot display at the correct aspect ratio a combination of the image source of the 4:3 full image or the 4:3 letterbox image with the 16:9 image monitor. Accordingly, there is a demand for an image signal reproduction apparatus in which any combination of the 3 types of image sources, i.e., the 4:3 full image, the 4:3 letterbox image, and the 16:9 image with 2 types image monitor, i.e., the 4:3 monitor and the 16:9 monitor, can be displayed at the correct aspect ratio.

An object of the present invention is to provide an image signal reproduction apparatus which can perform a progressive scanning conversion process suitable for film material with respect to a film material image signal part of which is recorded as a video signal of 60 fields per second. This is achieved by determining the type of material of an image signal by determining whether a main image signal is a first type of image signal or a second type of image signal, based on an output of a field difference detection circuit obtained from an interlaced scanned image signal and another interlaced scanned image signal 2 field before in addition to an output of a material determination circuit.

Another object of the present invention is to provide an image signal reproduction apparatus which can output a progressive scanned image with a resolution close to the original film and with less degradation of resolution compared with the interlaced scanned image even in visual appreciation, after subjecting the film material image signal to progressive scanning conversion.

Still another object of the present invention is to solve the above-described problems with the conventional technology and provide an image signal reproduction apparatus which can display an image at the correct aspect ratio in the case of any combination of image sources having different aspects and monitors having different aspects.

DISCLOSURE OF THE INVENTION

An image signal reproduction apparatus according to the present invention is an image signal reproduction apparatus for reproducing a main image signal including either a first type of image signal obtained by converting a film material image into an electrical signal or a second type of image signal including a video signal as a material thereof, using a transfer information including the main image signal and a determination flag for determining whether the main image signal is the first type of image signal or the second type of image signal, the apparatus including: a first timing signal generation section for outputting a first timing signal indicating a field to be repeatedly output in the case where the main image signal is the first type of image signal; a first material determination section for determining whether the main image signal is the first type of image signal or the second type of image signal, based on the determination flag; an interlaced scanned image signal reproduction section for converting the main image signal to an interlaced scanned image signal of 60 fields per second in response to an output of the first timing signal generation section when the first material determination section determines that the main image signal is the first type of image signal, and outputting the main image signal as it is when the first material determination section determines that the main image signal is the second type of image signal; a field memory for storing 2 fields of outputs of the interlaced scanned image signal reproduction section; a field difference detection section for detecting a difference between an output of the interlaced scanned image signal reproduction section and an output of the field memory; a second material determination section for determining whether the main image signal is the first type of image signal or the second type of image signal, based on an output of the first material determination section or on outputs of the first timing signal generation section and the field difference detection section; a second timing signal generation section for generating a second timing signal indicating a breakpoint between frames of the film material in the interlaced scanned image signal, based on an output of the field difference detection section when the second material detection section detects that the main image signal is the first type of image signal; and a progressive scanning conversion section for obtaining a progressive scanned image signal by synthesizing 2 fields of interlaced scanned image signals of 60 fields per second in response to the second timing signal when a generation method of an insertion scanning signal is changed in response to an output of the second material determination section and the second material determination section determines that the main image signal is the first type of image signal, thereby achieving the above-described objects.

The second material determination section may determine that the main image signal is the first type of image signal when an output of the first material determination section or when a state of the timing generation section is in the state of the first type of image signal; even when the output of the first material determination section or the state of the timing generation section transitions from the state of the first type of image signal to the state of the second type of image signal, if the field difference detection section detects a field matching in a given period, the second material determination section may determine that the main image signal is the first type of image signal.

Even when the output of the first material determination section or the state of the timing generation section transitions from the state of the first type of image signal to the state of the second type of image signal, if the field difference detection section detects a field matching every 5 fields, the second material determination section may determine that the main image signal is the first type of image signal.

Another image signal reproduction apparatus according to the present invention is an image signal reproduction apparatus for reproducing an information signal including any one of a first image signal obtained by converting a film material into an electrical signal or a second image signal whose material is a video signal, the apparatus including: an interlaced scanned image signal reproduction section for outputting the information signal as an interlaced scanned image signal of 60 fields per second; a progressive scanning conversion section for converting the information signal to a progressive scanned image signal; and a filtering section for changing a frequency characteristic of an output of the progressive scanning conversion circuit section.

An output of the interlaced scanned image signal reproduction section may be the input of the progressive scanning conversion section.

The filtering section may differentiate frequency characteristics between the first and second image signals.

The frequency characteristic may be able to be changed by a setting made by the user.

Still another image signal reproduction apparatus of the present invention includes: an interlaced scanned image signal reproduction section for reproducing an image signal and an information signal including a determination signal determining the aspect ratio of the image signal as an interlaced scanned image signal of 60 fields per second; a flag determination section for reading the determination flag; a first aspect ratio conversion section for converting the aspect ratio of the interlaced scanned image signal; a first setting section for setting the aspect ratio of an image receiver to which an output of the first aspect ratio conversion section is output; a first control section for controlling the aspect ratio of an output of the first aspect ratio conversion section based on outputs of the first setting section and the flag determination section; a progressive scanning conversion section for converting the output of the first aspect ratio conversion section to a progressive scanned image signal; a second aspect ratio conversion section for converting the image signal into an aspect ratio different from the first aspect ratio of the output of the first aspect ratio conversion section; a second setting section for setting the aspect ratio of an image receiver to which an output of the second aspect ratio conversion section is output; and a second control section for controlling the aspect ratio of an output of the second aspect ratio conversion section based on outputs of the second setting section and the flag determination section, thereby achieving the above-described objects.

The first aspect ratio conversion section may have functions of compressing an input image signal in a vertical direction, and causing a blank portion to be a black image; and the second aspect ratio conversion section may have functions of compressing an input image signal in a horizontal direction, and causing a blank portion to be a black image.

The first aspect ratio conversion section may have functions of compressing an input image signal in a vertical direction, and causing a blank portion as a result of the compression to be a black image; and the second aspect ratio conversion section may have either a function of compressing an input image signal in a horizontal direction, and causing a blank portion as a result of the compression to be a black image, or a function of expanding the image in the vertical direction.

The determination flag may include at least two pieces of image information of an aspect ratio of 4:3, an aspect ratio of 16:9, and 16:9 image information in a screen having an aspect ratio of 4:3.

BEST MODE FOR CARRYING OUT THE INVENTION

Hereinafter, examples of the present invention will be described with reference to the drawings.

Example 1

Figure 1:
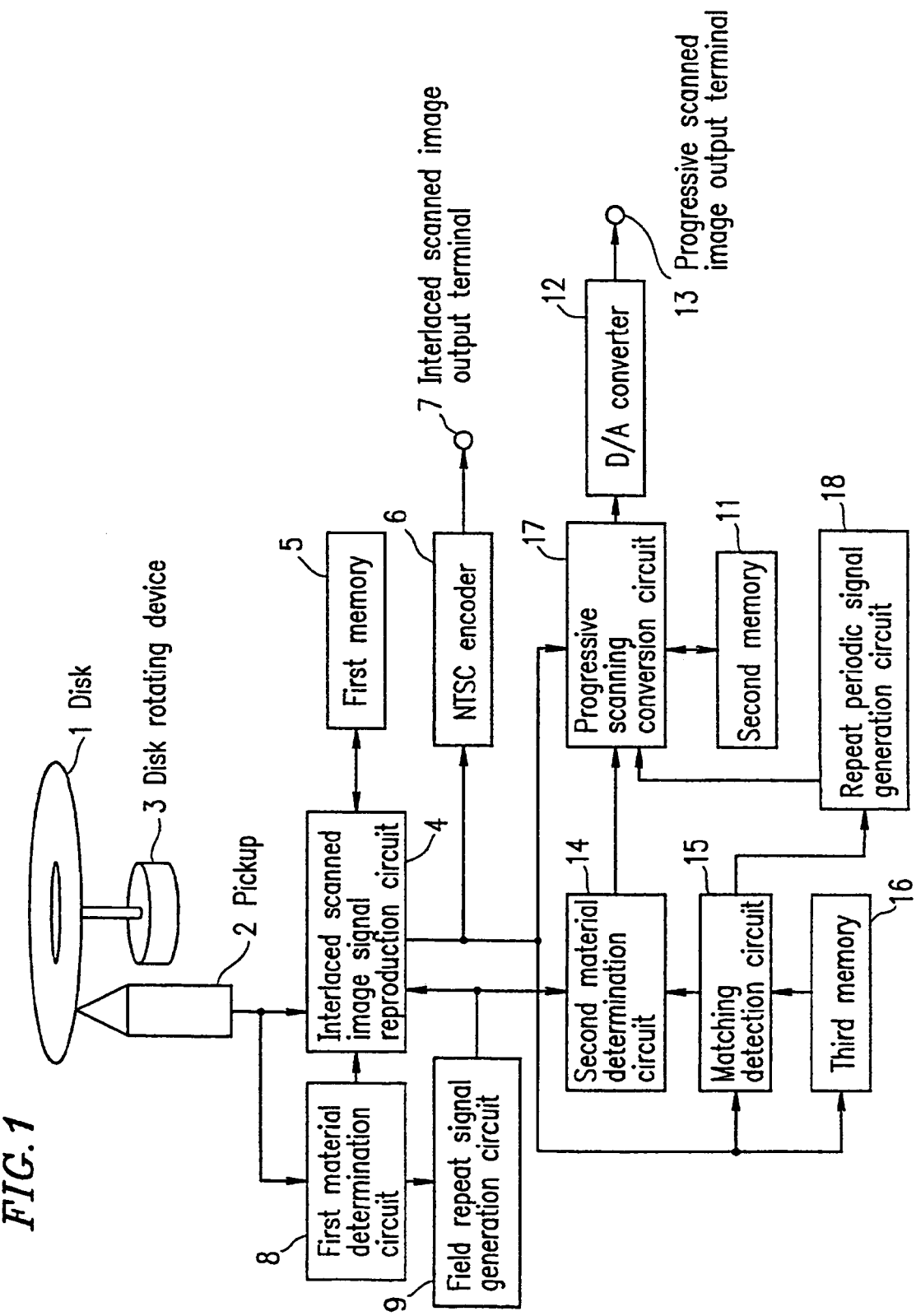
FIG. 1 is a block diagram showing a configuration of an image signal reproduction apparatus according to Example 1 of the present invention.

FIG. 1 is a block diagram showing a configuration of an image signal reproduction apparatus according to Example 1 of the present invention. In FIG. 1, reference numeral 1 denotes a disk on which a main image signal and a determination flag are recorded in an encoded and modulated signal form suitable for recording in advance. The main signal is either an image signal obtained by converting a film material into an electrical signal or an image signal of which material is a video signal. The determination flag shows whether the main image signal is of film material or video material. Reference numeral 2 denotes a pickup which converts the signal recorded on the disk 1 into an electrical signal. Reference numeral 3 denotes a disk rotating device which rotates the disk 1 at a certain revolution-per-minute suitable for the disk 1. Reference numeral 4 denotes an interlaced scanned video signal reproduction circuit which demodulates and decodes the main image signal recorded on the disk 1, and outputs the resultant signal as an interlaced scanned image signal. Reference numeral 5 denotes a first memory which functions as a buffer memory when the interlaced scanned image signal is reproduced. Reference numeral 6 denotes an NTSC encoder which converts the interlaced scanned image signal into an NTSC video format and outputs the result. Reference numeral 7 denotes an interlaced scanned image output terminal through which the reproduced interlaced scanned image output is output. Reference numeral 8 denotes a first material determination circuit which reads the determination flag recorded on the disk 1 from an output of the pickup 2. Reference numeral 9 denotes a field repeat signal generating circuit which generates a field repeat signal when the interlaced scanned image signal reproduction circuit 4 converts the main image signal into an interlaced scanned image signal in the case when the main image signal is of film material. Reference numeral 11 denotes a second memory which is capable of storing a field of image signal and which is used in the operation of a progressive scanning conversion circuit 17 (described later). Reference numeral 12 denotes a D/A converter which converts an output of the progressive scanning conversion circuit 17 into an analog value and outputs the result. Reference numeral 13 denotes a progressive scanning image output terminal through which the progressive scanned image signal is output to an image display apparatus (not shown). Reference numeral 14 denotes a second material determination circuit which determines the type of an image signal recorded on the disk 1 based on an output of the field repeat signal generation circuit 9 and an output of a second matching detection circuit 15, thereby controlling the progressive scanning conversion circuit 17. Reference numeral 15 denotes the matching detection circuit which compares an output of the interlaced scanned image signal reproduction circuit 4 and an output of a third memory 16. Reference numeral 16 denotes the third memory which delays an output of the interlaced scanned image signal reproduction circuit 4 by 2 fields, and outputs the delayed output. Reference numeral 17 denotes the progressive scanning conversion circuit which converts an output of the interlaced scanned image signal reproduction circuit 4 to a progressive scanned image signal, and outputs the result. Reference numeral 18 denotes a repeat periodic signal generation circuit which provides a field repeat signal required for progressive scanning conversion in the progressive scanning conversion circuit 17 in response to an output of the second matching detection circuit 15.

The operation of the image signal reproduction apparatus thus constructed of Example 1 of the present invention will be described.

Figure 2:
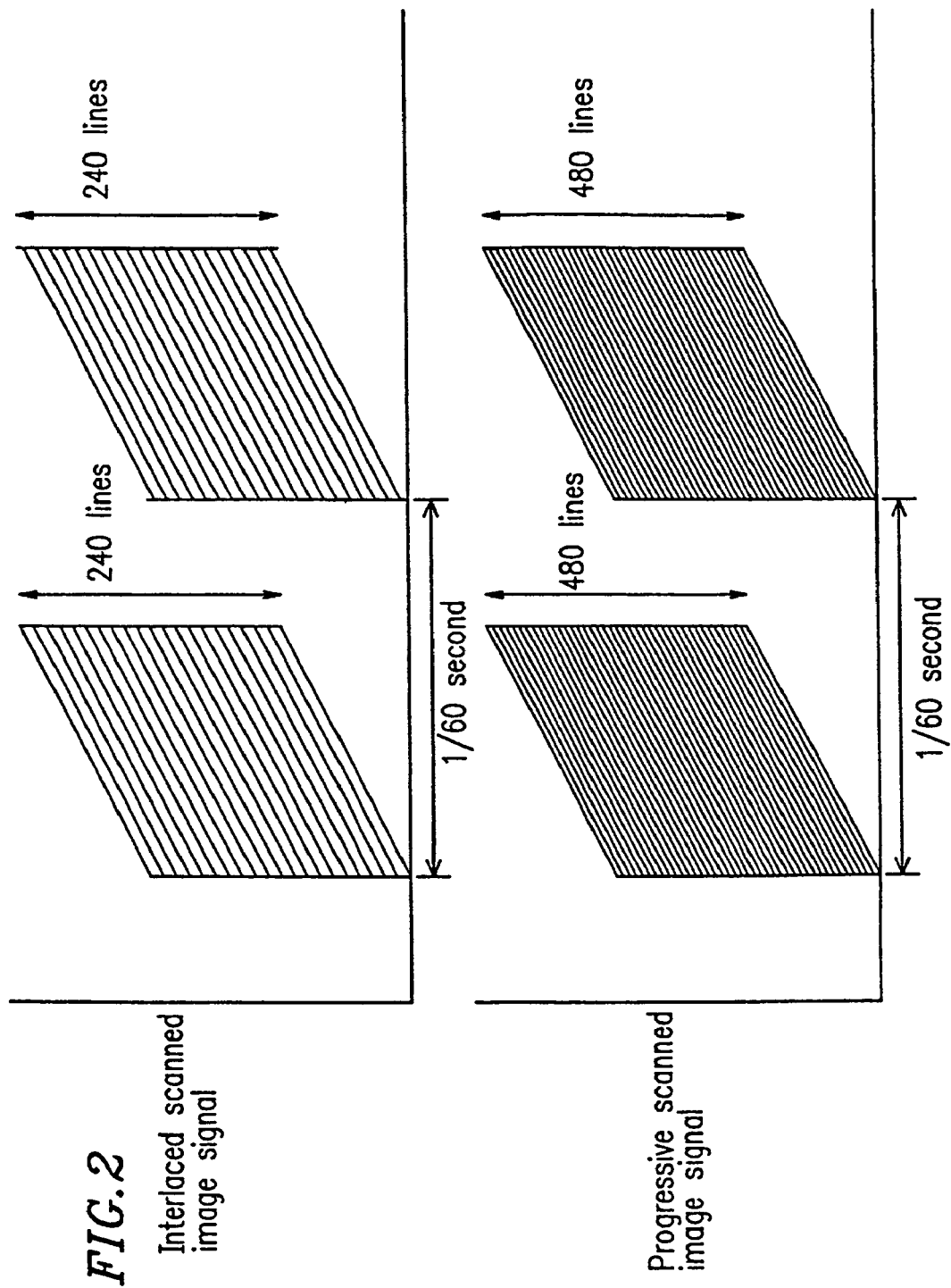
FIG. 2 is a schematic diagram showing structures of an interlaced scanned image signal and a progressive scanned image signal of the image signal reproduction apparatus according to Example 1 of the present invention.

FIG. 2 is a schematic diagram showing structures of the interlaced scanned image signal and the progressive scanned image signal in the image signal reproduction apparatus according to Example 1 of the present invention. As described using FIG. 18 in the BACKGROUND ART section, in the interlaced scanned image signal, one field of image is created in 1/60 second. One frame of image is composed of two fields. The number of vertical pixels of each of the two fields is 240. The pixels of one field is buried between the other fields in the vertical direction, vice versa. In the progressive scanned signal, one frame is created in 1/60 second and the number of pixels in the vertical direction is 480.

Both signals have a vertical frequency of 1/60 second. The number of horizontal scanning lines of the progressive scanned image signal is twice as many as that of the interlaced scanned image signal. The horizontal scanning frequency of the interlaced scanned image signal is about 15.75 KHz, while that of the progressive scanned image signal is about 31.5 KHz.

Figure 3:
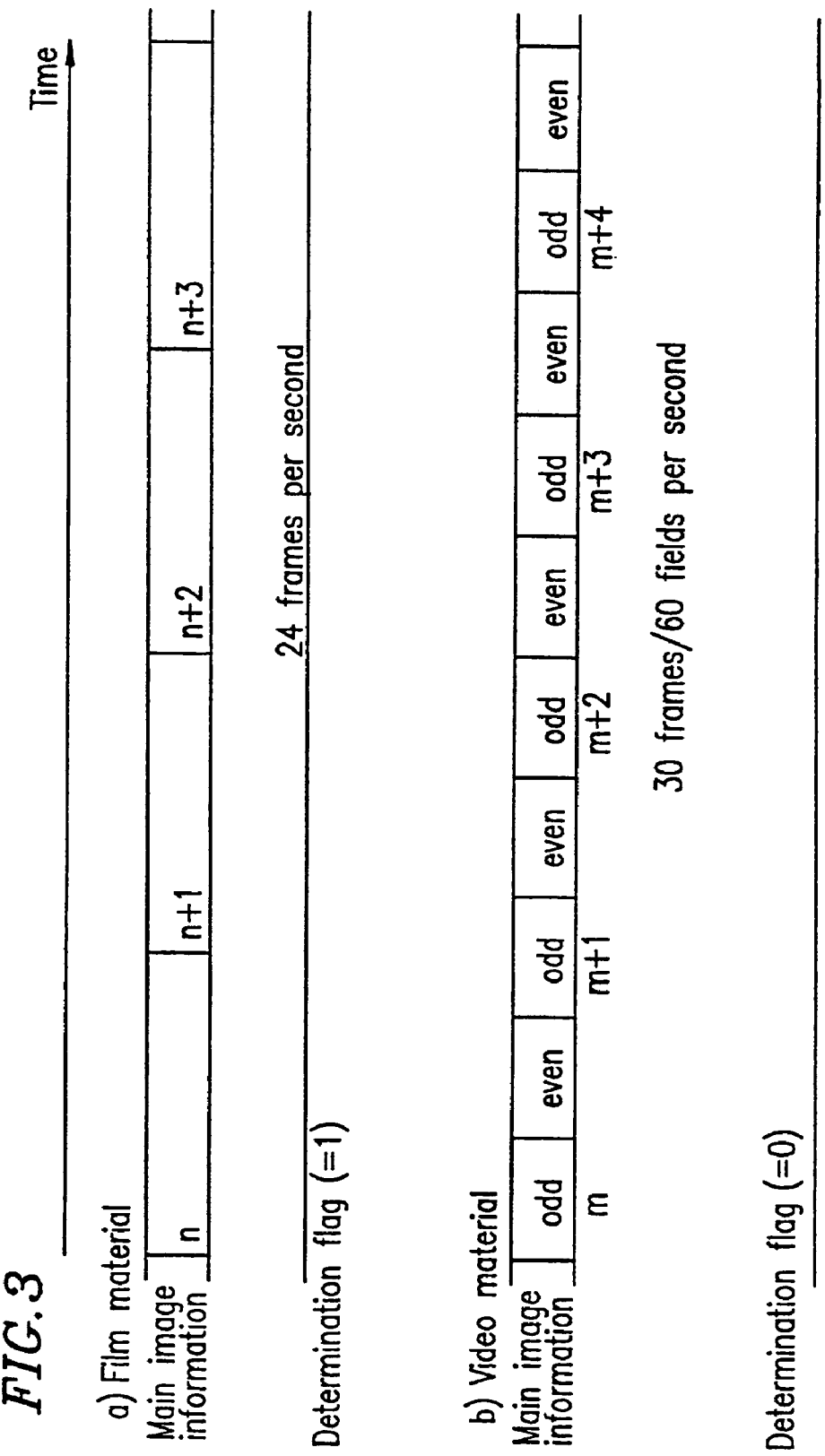
FIG. 3 is a schematic signal diagram showing a structure of an image signal recorded in the disk 1 of the image signal reproduction apparatus according to Example 1 of the present invention.

FIG. 3 is a schematic signal diagram showing a structure of the image signal recorded in the disk 1 of the image signal reproduction apparatus according to Example 1 of the present invention. As shown in FIG. 3, the image signal recorded in the disk 1 has two forms. Specifically, FIG. 3a) shows a film material. In this case, the original material is a film image composed of 24 frames of pictures per second. Each frame of the film image is compressed and recorded onto the disk 1 as an image of 720×480 dots. FIG. 3b) shows a video material image. In this case, the original material is an interlaced scanned image composed of 30 frames/60 fields per second. Each frame is an image of 720×480 dots, but interlaced, so that each field is an image of 720×240 dots. The field is compressed and recorded onto the disk 1.

As shown in FIG. 3, the determination flag, which shows whether the main image signal is of film material or video material, is recorded on the disk 1 along with the main video signal.

Figure 4:
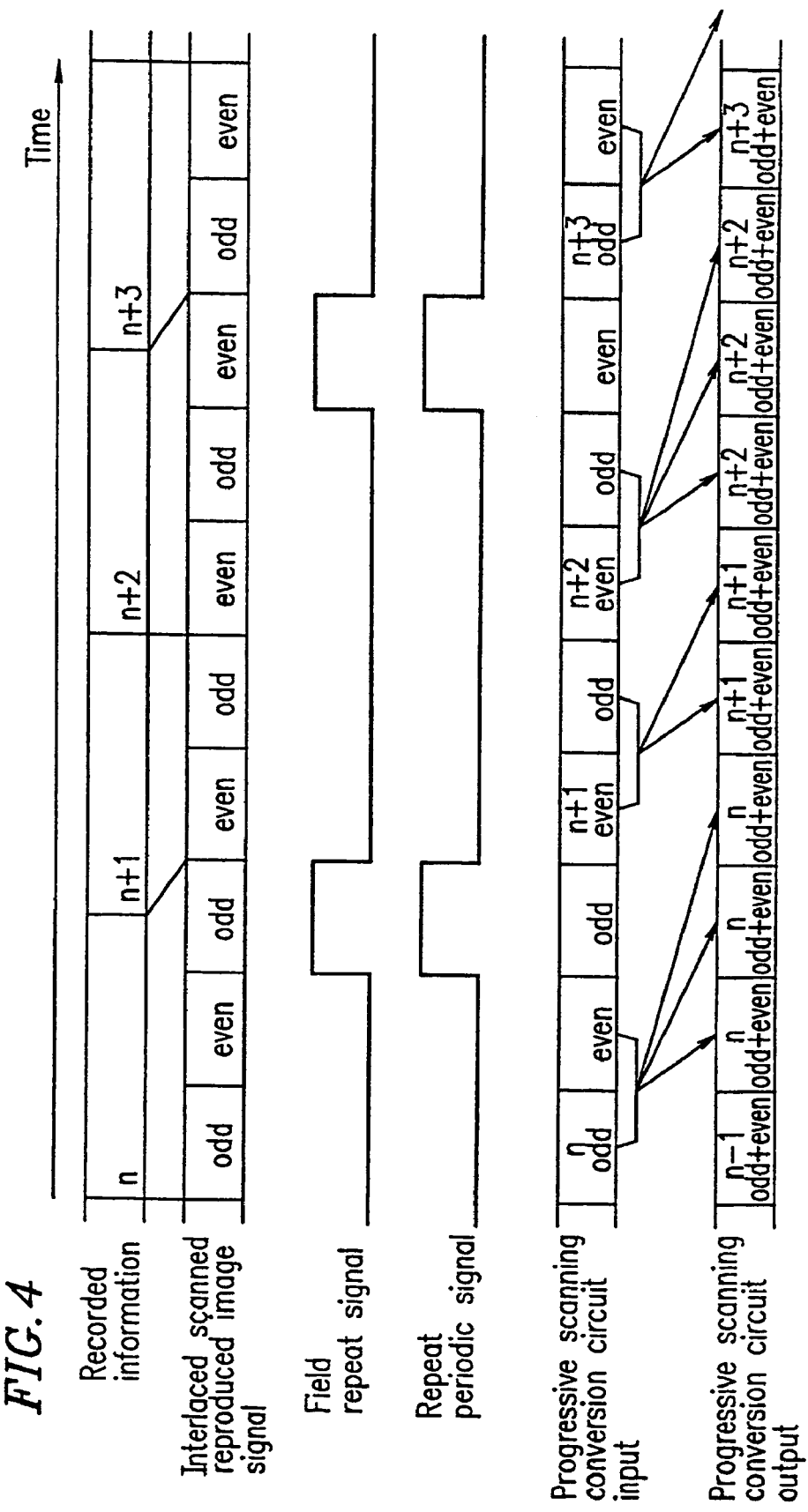
FIG. 4 is a schematic signal diagram showing a structure of a reproduced signal in a film material disk of the image signal reproduction apparatus according to Example 1 of the present invention.

FIG. 4 is a schematic signal diagram showing a reproduced signal from a film material disk of Example 1 of the present invention.

When the material of the image signal recorded in the disk 1 is a film, 24 frames of images of 720×480 dots per second are recorded. The interlaced scanned image signal reproduction circuit 4 reads the signal recorded on the disk 1 from an output of the pickup 2. The first material determination circuit 8 reads the determination flag from an output of the pickup 2 and determines the type of the main image signal, and outputs the result to the interlaced scanned image signal reproduction circuit 4 and the field repeat signal generation circuit 9. Based on an output of the first material determination circuit 8, the interlaced scanned reproduction circuit 4 recognizes that the main image signal recorded in the disk 1 is of film material. As shown in FIG. 4, the film material images are recorded in the disk 1 in order of the frame numbers . . . , n, n+1, n+2, n+3, . . . . The film material signal thus recorded is converted into an interlaced scanned image and is output by the interlaced scanned signal reproduction circuit 4. This is because television monitors are commonly used as an image display apparatus for home entertainment, and the display format is the interlaced scanning. Since the television monitor is designed to display a moving image of 30 frames/60 fields per second, the interlaced scanning video signal reproduction circuit 4 converts 24 frames of images per second into 30 frames/60 fields per second and outputs the result. The interlaced scanning video signal reproduction circuit 4 divides each frame of recorded information into two interlaced scanned field images, odd and even, as shown in the interlaced scanned reproduced image signal in FIG. 4. The interlaced scanning video signal reproduction circuit 4 further displays the head field after the last field of each frame in response to the field repeat signal repeated every 5 fields output from the field repeat signal generation circuit 9 so that 24 frames of film images per second are converted into the interlaced scanned images of 30 frames/60 fields per second which are output. The first memory 5 functions as a buffer memory when the interlaced scanning video signal reproduction circuit 4 reproduces an image.

The NTSC encoder 6 produces an NTSC standard video signal from the interlaced scanned image signal thus reproduced and outputs the result through the interlaced scanned image output terminal 7. A television monitor (not shown) is connected to the interlaced scanned image output terminal 7 so that the user can see the film material image converted into the interlaced scanned image on the monitor.

Further, the interlaced scanned image signal reproduced circuit 4 inputs the interlaced scanned image signal to the progressive scanning conversion circuit 17, the matching detection circuit 15, and the third memory 16. The third memory 16 delays the input interlaced scanned image signal by 2 fields, and outputs the result to the matching detection circuit 15.

Figure 5:
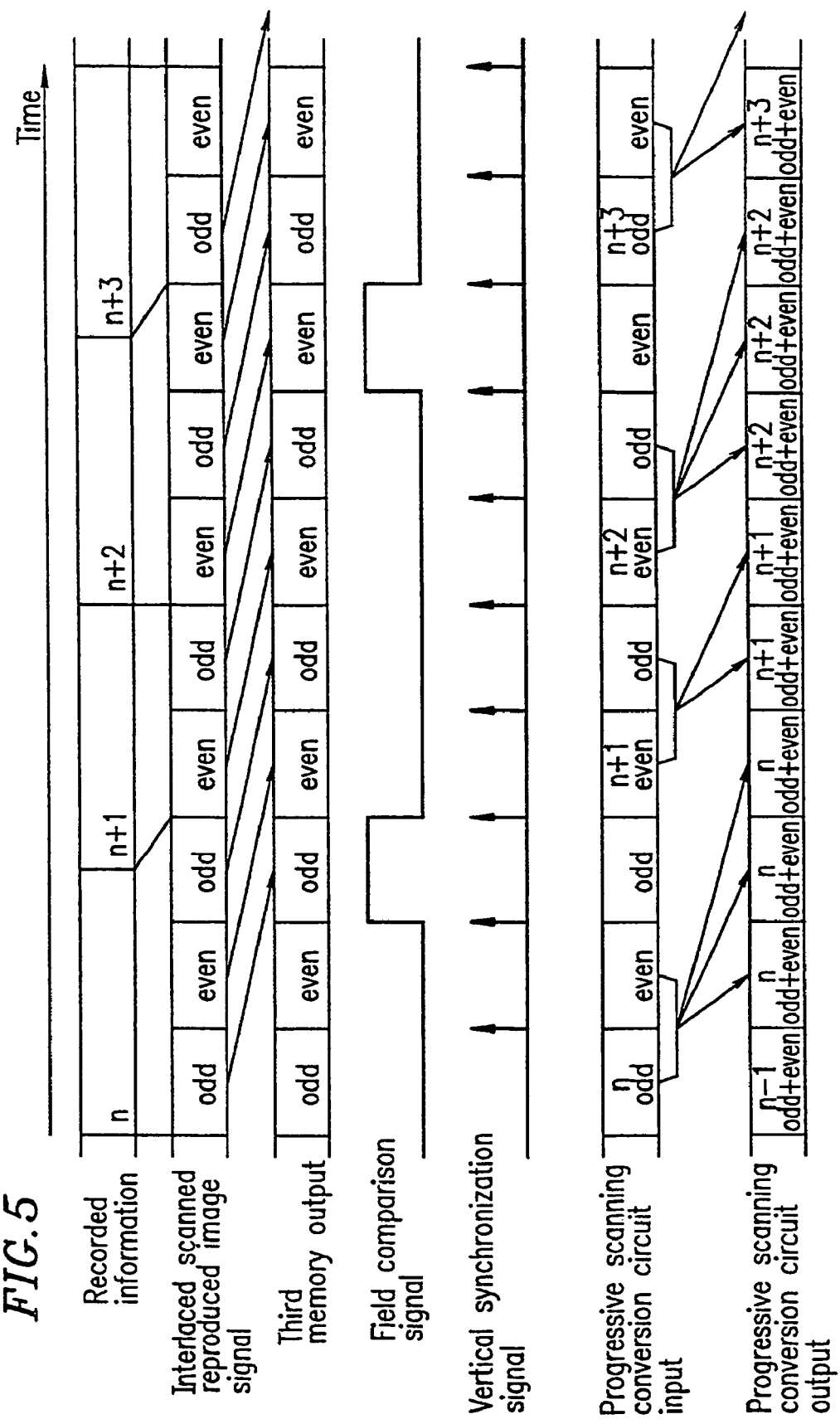
FIG. 5 is a schematic signal diagram showing an operation of a matching detection circuit in a film material disk of the image signal reproduction apparatus according to Example 1 of the present invention.

FIG. 5 is a schematic signal diagram showing an operation of the matching detection circuit in a film material disk of the image signal reproduction apparatus according to Example 1 of the present invention.

In the matching detection circuit 15, it is determined whether the material of an image signal is a film material or video material. Specifically, if the input image signal is obtained by converting film to video, a head field is repeated after a last field for each frame. Therefore, the same field appears once every 5 fields. Accordingly, the matching detection circuit 15 detects that the number of pixels, which satisfies that the data difference in each pixel of each field between an output of the third memory 16 and an output of the interlaced scanned image signal generation circuit 4 is smaller than or equal to a predetermined threshold, is greater than or equal to a certain value. If the matching detection circuit 15 thus detects the matching of fields, the matching detection is provided to the field comparison information shown in FIG. 5. In this way, the matching detection is "1" every 5 fields. Therefore, when the matching detection circuit 15 detects a change in the field comparison information every 5 fields, the matching detection circuit 15 determines that the material of the image signal is of film.

Figure 6:
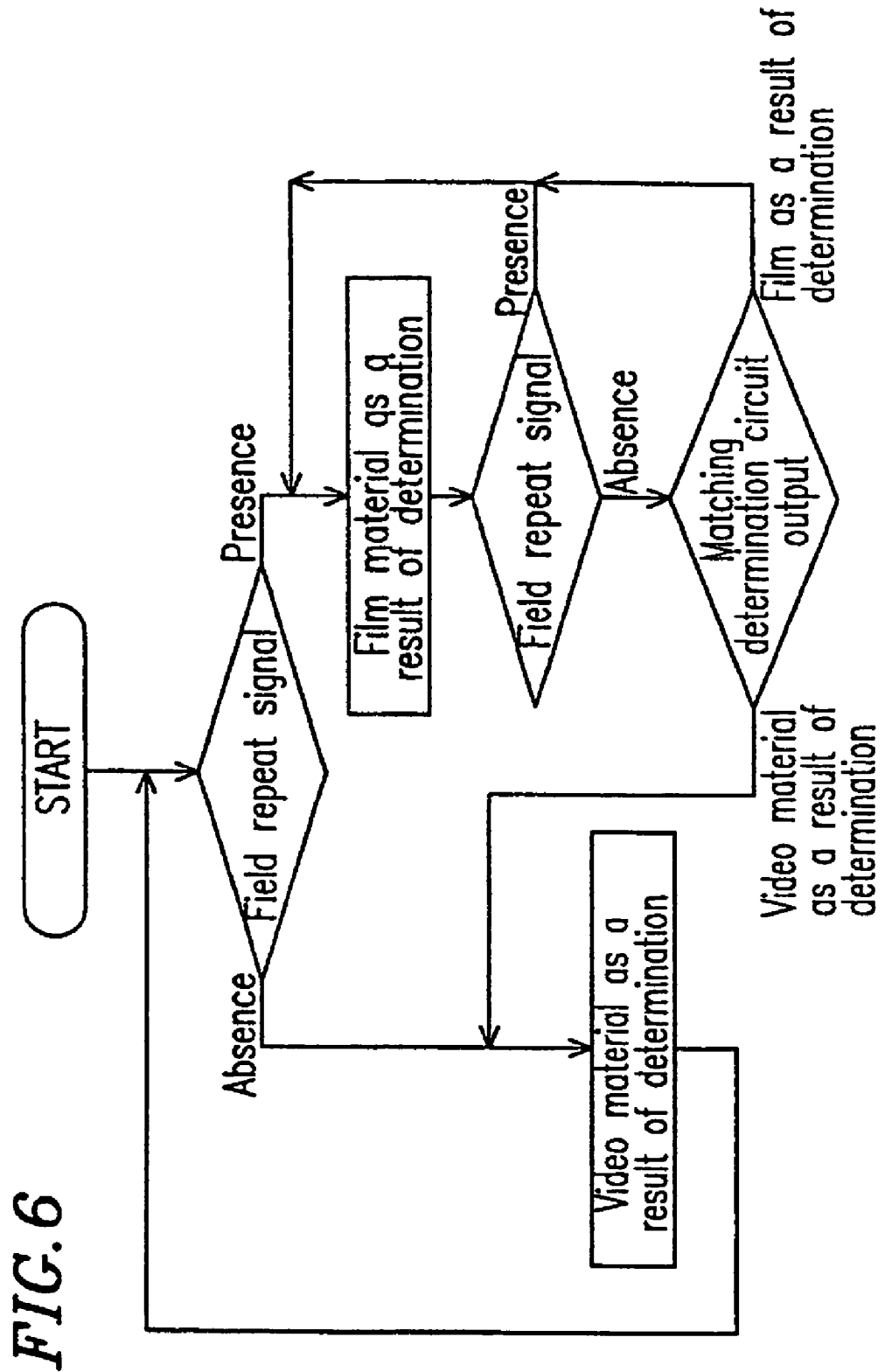
FIG. 6 is a flowchart showing a determination method of a second material determination circuit of the image signal reproduction apparatus according to Example 1 of the present invention.

FIG. 6 is a flowchart showing a determination method of the second material determination circuit according to Example 1 of the present invention.

As shown in FIG. 6, the second material determination circuit 14 determines whether the material of an image signal is a film material or video material, based on an output of the field repeat signal generation circuit 9 and an output of the matching detection circuit 15. Specifically, when the field repeat signal is generated, it is determined that the material of the image signal is of film material. Even after transition from the state where the field repeat signal is generated to the state where the field repeat signal is not generated, if the matching detection circuit determines that the material of the image signal is the film material, the second material determination circuit 14 determines that the material is the film material.

The repeat periodic signal generation circuit 18 generates a repeat periodic signal shown in FIG. 4, based on the field comparison information every 5 fields detected by the matching detection circuit 15. The field comparison information only indicates how much information a current field matches a second field before the current field. The matching detection depends on the threshold used for determining whether matching or not and the image information, and therefore the matching may not be detected. The repeat periodic signal generation circuit 18 also functions as a flywheel circuit so that the repeat information of the 5 field period is generated when the field comparison information is not obtained.

When the second material determination circuit 14 determines that the main image is of film material, the progressive scanning conversion circuit 17 performs the progressive scanning conversion in response to the repeat periodic signal generated by the repeat periodic signal generation circuit 18. Specifically, in the case of film material, for each frame of each material, an original image of 720×480 dots is divided into 2 fields of 720×240 dots, which may be synthesized again. Therefore, the progressive scanning conversion circuit 17 can detect the timing of switching of the frames of the film signal which is the material of an input digital image signal, using the repeat periodic signal shown in FIG. 4. In response to the repeat periodic signal, the progressive scanning conversion circuit 17 stores the head field of the progressive scanning conversion circuit input shown in FIG. 4 in the second memory 11 and the second field in the second memory 11, and reads out both information on a line-by-line basis at a double speed, thereby obtaining the progressive scanning conversion circuit output shown in FIG. 4. The converted image signal is converted into an analog signal by the D/A converter 12. The resultant analog signal is output through the progressive scanned image signal output terminal 13. A television monitor (not shown) for the progressive scanned image signal is connected to the progressive scanned image signal output terminal 13. The user can see the film material images restored to the progressive scanned image via the television monitor.

Figure 7:
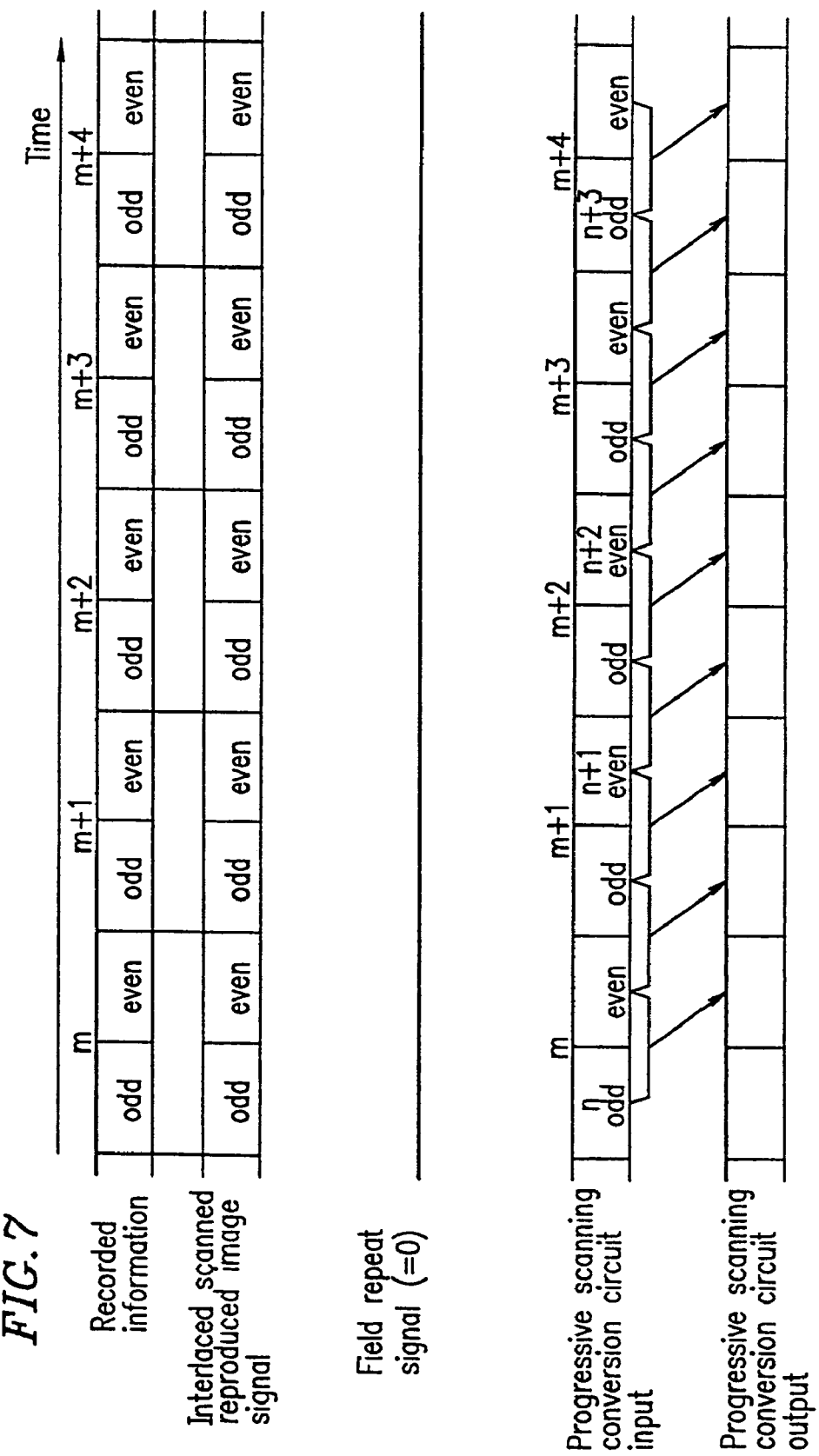
FIG. 7 is a schematic signal diagram showing a structure of a reproduced signal in a video material disk of the image signal reproduction apparatus according to Example 1 of the present invention.

FIG. 7 is a schematic signal diagram showing a reproduced signal of the video material disk of Example 1 of the present invention.

In the case when the material of image signals recorded in the disk 1 is video material, an interlaced scanned image of 30 frames/60 fields per second is recorded as recorded information, each field having a 720×240 dots image as shown in FIG. 7. The interlaced scanned image signal reproduction circuit 4 reads the signal recorded in the disk 1 from an output of the pickup 2. The first material determination circuit 8 reads the determination flag from the output of the pickup 2 and determines the type of the main image signal, and outputs the determination flag as the determination signal to the interlaced scanned image signal reproduction circuit 4 and the field repeat signal generation circuit 9. As shown in FIG. 7, the video material images are recorded in the disk 1 in order of the frame numbers . . . , m, m+1, m+2, m+3, m+4, . . . . The interlaced scanned image signal reproduction circuit 4 outputs the video material signal thus recorded as the interlaced scanned image signal shown in FIG. 7 without alteration. The first memory 5 functions as a buffer memory when the interlaced scanned image signal reproduction circuit 4 reproduces an image.

The NTSC encoder 6 produces an NTSC standard video signal from the interlaced scanned image signal thus reproduced and outputs the result through the interlaced scanned image output terminal 7. A television monitor (not shown) is connected to the interlaced scanned image output terminal 7 so that the user can see the film material image converted into the interlaced scanned image via the monitor.

The matching detection circuit 15 determines whether the material of an image signal is of film material or video material. Specifically, the same field does not appear once every 5 fields when the input image signal is of video material. Therefore, the matching detection circuit 15 determines that the interlaced scanned image is not a film material by detecting no such periodicity.

The second material determination circuit 14 determines whether the material of the image signal is of film material or video material, based on an output of the field repeat signal generation circuit 9 and an output of the matching detection circuit 15. The second material determination circuit 14 shown in FIG. 6 determines that the image signal is of video signal when the field repeat signal is not generated and the matching detection circuit 15 does not determine that the image signal is of film material. The interlaced scanned image signal reproduction circuit 4 inputs the interlaced scanned image signal to the progressive scanning conversion circuit 17. The progressive scanning conversion circuit 17 recognizes that the input digital image signal is of video signal, based on an output of the second material determination circuit 14. Accordingly, the progressive scanning conversion circuit 17 performs the progressive scanning conversion while the main image signal is regarded as the video material. Specifically, in the case of the video material, the progressive scanning conversion circuit 17 generates a progressive scanned image signal using two pieces of field information, i.e., current field image information and the previous field information. In this case, the progressive scanning conversion circuit 17 also uses data for the previous field to interpolate in the vertical direction with respect to pixels having small movements between the current and previous fields of the progressive scanned conversion circuit input shown in FIG. 7. With respect to pixels having large movements between the current and previous fields, vertical interpolated data is generated from upper and lower pixel data in the same field to obtain a progressive scanning conversion circuit output shown in FIG. 7. The converted image signal is converted into an analog signal by the D/A converter 12. The analog signal is output through the progressive scanned image signal output terminal 13. A television monitor (not shown) for the progressive scanned image signal is connected to the progressive scanned image signal output terminal 13 so that the user can see the video material image converted into the progressive scanned image via the monitor.

Figure 8:
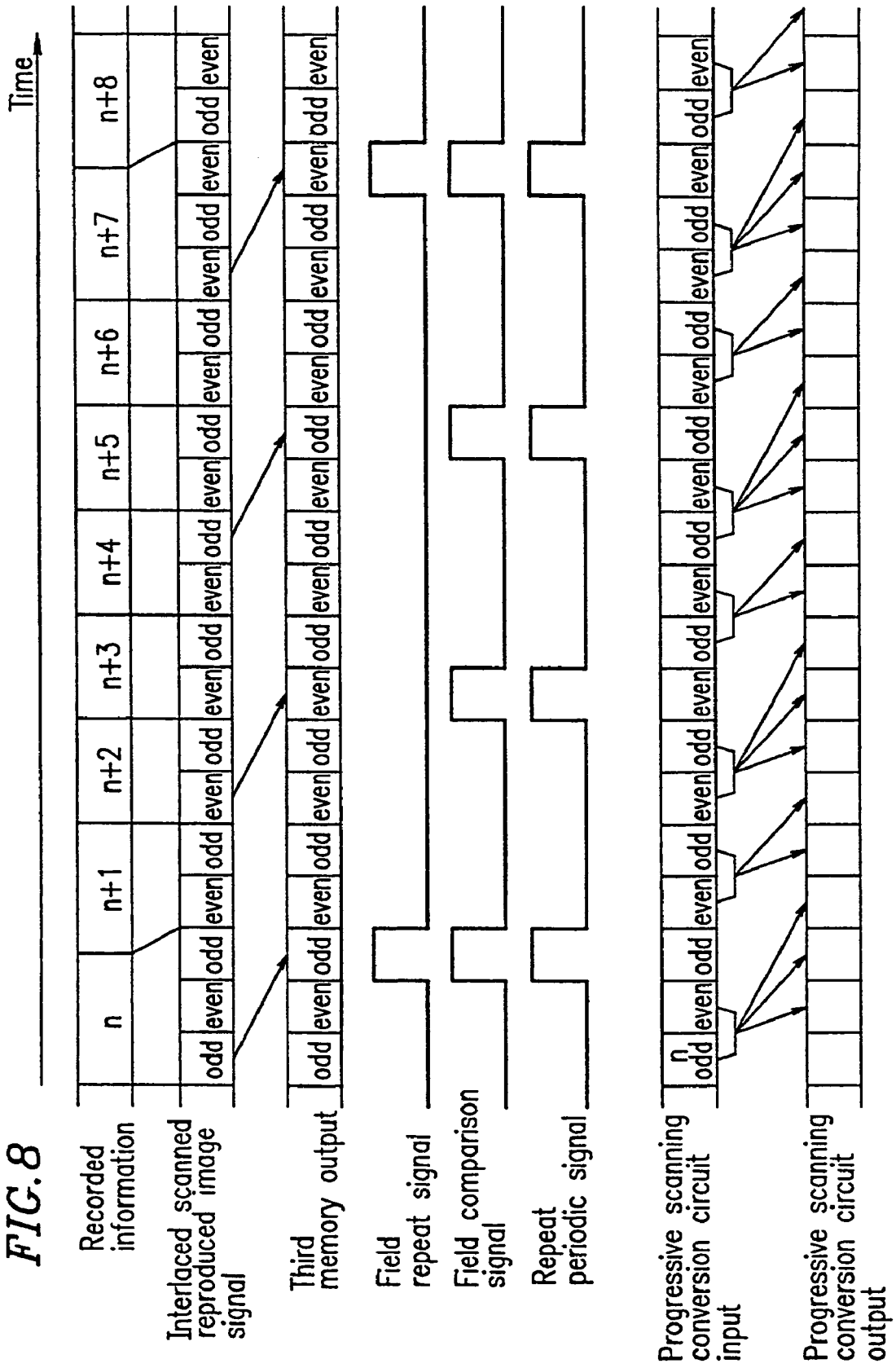
FIG. 8 is a schematic signal diagram showing a reproduced signal in a disk, on part of which a video signal is recorded, in the image signal reproduction apparatus according to Example 1 of the present invention.

FIG. 8 is a schematic signal diagram showing a reproduced signal from a disk, which is a film material disk partially including a recorded video signal, of the image signal reproduction apparatus of Example 1 of the present invention.

Even when the signal source is of film material, part of the signal source may be recorded as a video signal. This happens as follows. A film material may initially be recorded in a video or the like before being recorded on the disk 1. When the material as video is restored to 24-frame information again, part of the material remains as video and is recorded in the disk 1. Specifically, when information to be recorded in the disk 1 is generated, a breakpoint between the frames of the original picture in the recorded video is found by detecting a match every 5 fields in the material recorded in the video of 60 fields, and the video is restored to 24-frame information which is in turn recorded on the disk 1. Therefore, when noise or the like occurs in the information in the video, the detection of a match every 5 fields is not successful. The video information remains as it is, and is still recorded on the disk.

In FIG. 8, the $n^{th}$ frame and the $n+1^{th}$ frame in the recorded information are recorded as film material while the $n+2^{th}$ frame to the $n+6^{th}$ frame are recorded as video information. The $n+7^{th}$ frame and thereafter are recorded as film material. When such a disk is reproduced by the image information reproduction apparatus of Example 1 of the present invention, the $n^{th}$ frame, the $n+1^{th}$ frame, and the $n+2^{th}$ frame are processed as film information. However, a field repeat signal existing originally is not detected in the even field of the $n+3^{th}$ frame. Since the original image signal is obtained by converting the film material to 30 frames/60 fields, the feature that the matching of the field information occurs once every 5 fields is held.

The matching detection circuit 15 counts the number of pixels, which satisfies that the data difference in each pixel of each field between an output of the third memory and an output of the interlaced scanned image signal generation circuit 4 is smaller than or equal to a predetermined threshold, and detects the matching of fields if the count value is greater than or equal to a certain value. Such matching detection is indicated by the field comparison information shown in FIG. 8. In this way, the matching detection is "1" every 5 fields. Therefore, when the matching detection circuit 15 detects a change in the field comparison information every 5 fields, the matching detection circuit 15 determines that the material of the image signal is of film.

The second material determination circuit 14 determines whether the material of an image signal is a film material or video material, based on an output of the field repeat signal generation circuit 9 and an output of the matching detection circuit 15. As shown in FIG. 6, even after transition from the state where the field repeat signal is generated to the state where the field repeat signal is not generated, if the matching detection circuit determines that the material of the image signal is the film material, the second material determination circuit 14 determines that the material is the film material. Therefore, the second material determination circuit 19 determines that the n+2$^{th}$ frame through the n+6$^{th}$ frame are of film material in FIG. 8. When the second material determination circuit 14 determines that the main image is of film material, the progressive scanning conversion circuit 17 performs the progressive scanning conversion in response to the repeat periodic signal generated by the repeat periodic signal generation circuit 18. Specifically, in the case of film material, for each frame of each material, an original image of 720×480 dots is divided into 2 fields of 720×240 dots, which may be synthesized again. Therefore, the progressive scanning conversion circuit 17 can detect the timing of switching of the frames of the film signal which is the material of an input digital image signal, using the repeat periodic signal shown in FIG. 8. In response to the repeat periodic signal, the progressive scanning conversion circuit 17 stores the head field of the progressive scanning conversion circuit input shown in FIG. 8 in the second memory 11 and the second field in the second memory 11, and reads out both information on a line-by-line basis at a double speed, thereby obtaining the progressive scanning conversion circuit output. The converted image signal is converted into an analog signal by the D/A converter 12. The resultant analog signal is output through the progressive scanned image signal output terminal 13. A television monitor (not shown) for the progressive scanned image signal is connected to the progressive scanned image signal output terminal 13. The user can see the film material images restored to the progressive scanned image via the television monitor.

Therefore, the image signal reproduction apparatus according to Example 1 of the present invention can apply the progressive scanning conversion suitable for film material to an image signal of film material which has been partially recorded as a video signal of 60 fields per second.

Example 2

Figure 9:
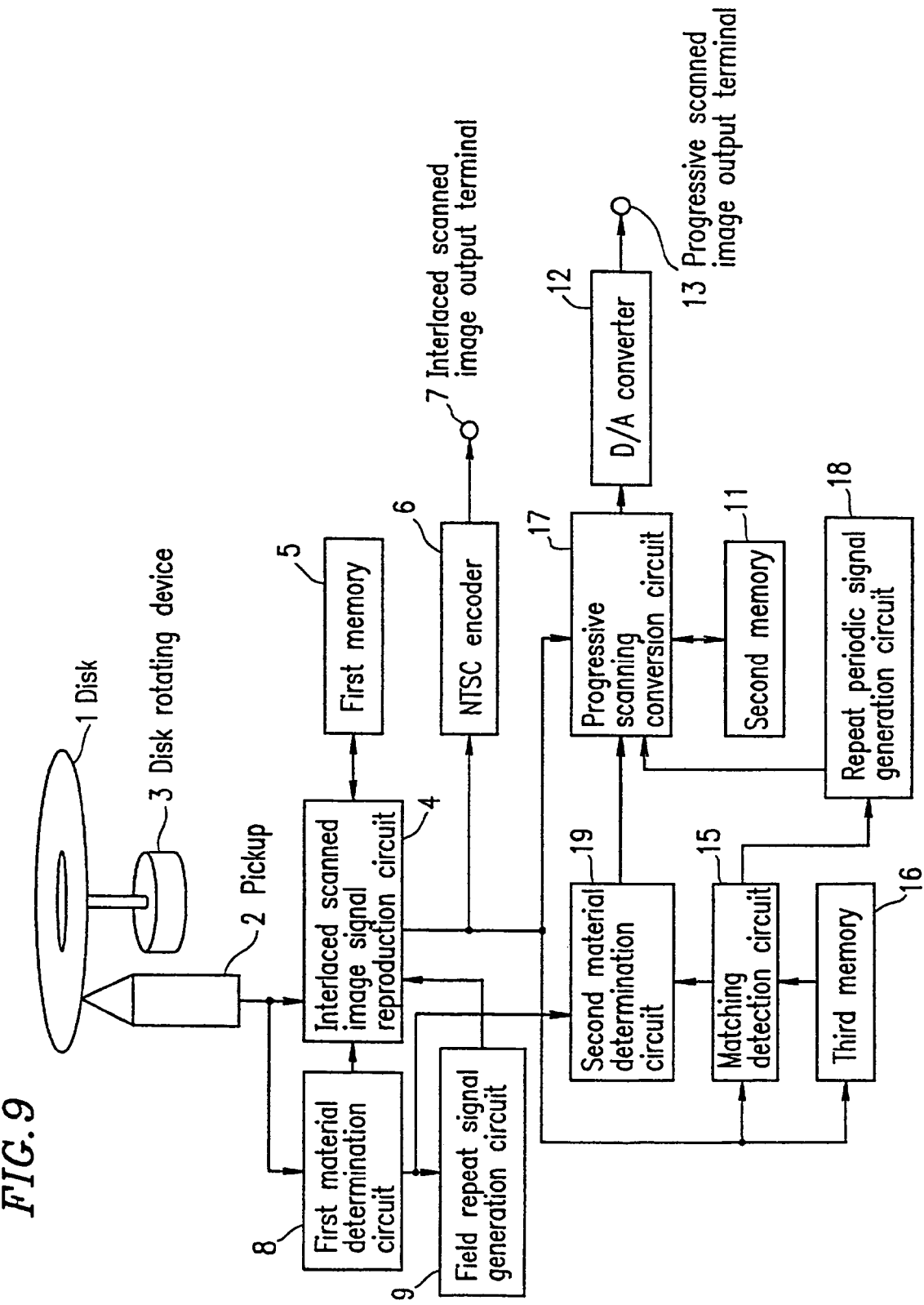
FIG. 9 is a block diagram showing a configuration of an image signal reproduction apparatus according to Example 2 of the present invention.

FIG. 9 is a block diagram showing a configuration of an image signal reproduction apparatus according to Example 2 of the present invention. In FIG. 9, reference numeral 1 denotes a disk on which a main image signal and a determination flag are recorded in an encoded and modulated signal form suitable for recording in advance. The main signal is either an image signal obtained by converting a film material into an electrical signal or an image signal of which material is a video signal. The determination flag shows whether the main image signal is of film material or video material. Reference numeral 2 denotes a pickup which converts the signal recorded on the disk 1 into an electrical signal. Reference numeral 3 denotes a disk rotating device which rotates the disk 1 at a certain revolution-per-minute suitable for the disk 1. Reference numeral 4 denotes an interlaced scanned video signal reproduction circuit which demodulates and decodes the main image signal recorded on the disk 1, and outputs the resultant signal as an interlaced scanned image signal. Reference numeral 5 denotes a first memory which functions as a buffer memory when the interlaced scanned image signal is reproduced. Reference numeral 6 denotes an NTSC encoder which converts the interlaced scanned image signal into an NTSC video format and outputs the result. Reference numeral 7 denotes an interlaced scanned image output terminal through which the reproduced interlaced scanned image output is output. Reference numeral 8 denotes a first material determination circuit which reads the determination flag recorded on the disk 1 from an output of the pickup 2. Reference numeral 9 denotes a field repeat signal generating circuit which generates a field repeat signal when the interlaced scanned image signal reproduction circuit 4 converts the main image signal into an interlaced scanned image signal in the case when the main image signal is of film material. Reference numeral 11 denotes a second memory which is capable of storing a field of image signal and which is used in the operation of a progressive scanning conversion circuit 17. Reference numeral 12 denotes a D/A converter which converts an output of the progressive scanning conversion circuit 10 into an analog value and outputs the result. Reference numeral 13 denotes a progressive scanning image output terminal through which the progressive scanned image signal is output to an image display apparatus (not shown). Reference numeral 19 denotes a second material determination circuit which determines the type of an image signal recorded on the disk 1 based on an output of the first material determination circuit 8 and an output of a second matching detection circuit 15, thereby controlling the progressive scanning conversion circuit 17. Reference numeral 15 denotes the matching detection circuit which compares an output of the interlaced scanned image signal reproduction circuit 4 and an output of a third memory 16. Reference numeral 16 denotes the third memory which delays an output of the interlaced scanned conversion circuit 4 by 2 fields, and outputs the delayed output. Reference numeral 17 denotes the progressive scanning conversion circuit which converts an output of the interlaced scanned conversion circuit 4 to a progressive scanned image signal, and outputs the result. Reference numeral 18 denotes a repeat periodic signal generation circuit which provides a field repeat signal required for progressive scanning conversion in the progressive scanning conversion circuit 17 in response to an output of the second matching detection circuit 15.

The operation of the image signal reproduction apparatus thus constructed of Example 2 of the present invention will be described.

Figure 10:
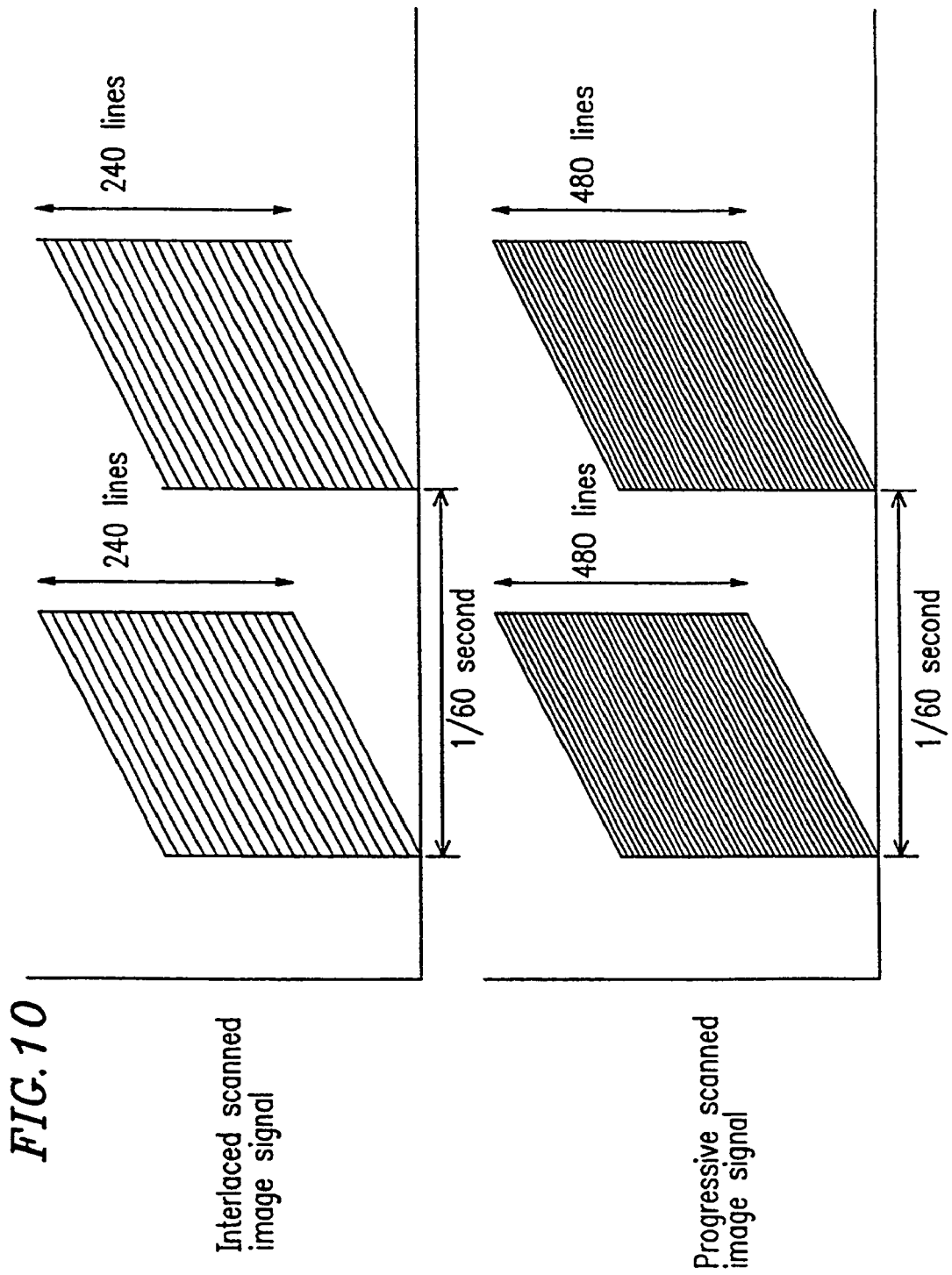
FIG. 10 is a schematic diagram showing structures of an interlaced scanned image signal and a progressive scanned image signal of the image signal reproduction apparatus according to Example 2 of the present invention.
Figure 40:
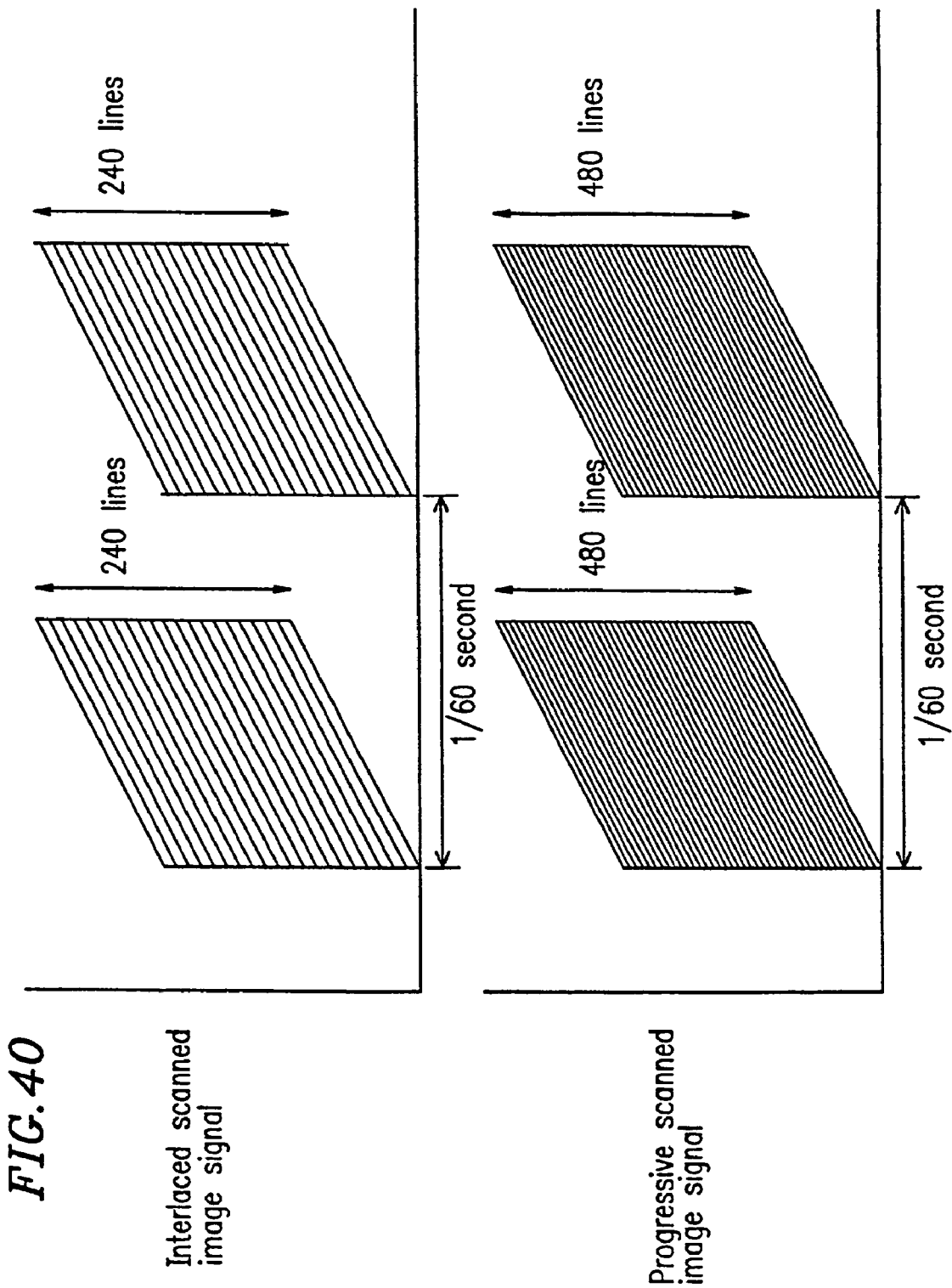
FIG. 40 is a schematic diagram showing structures of an interlaced scanned image signal and a progressive scanned image signal of the conventional image signal reproduction apparatus.
Figure 41:
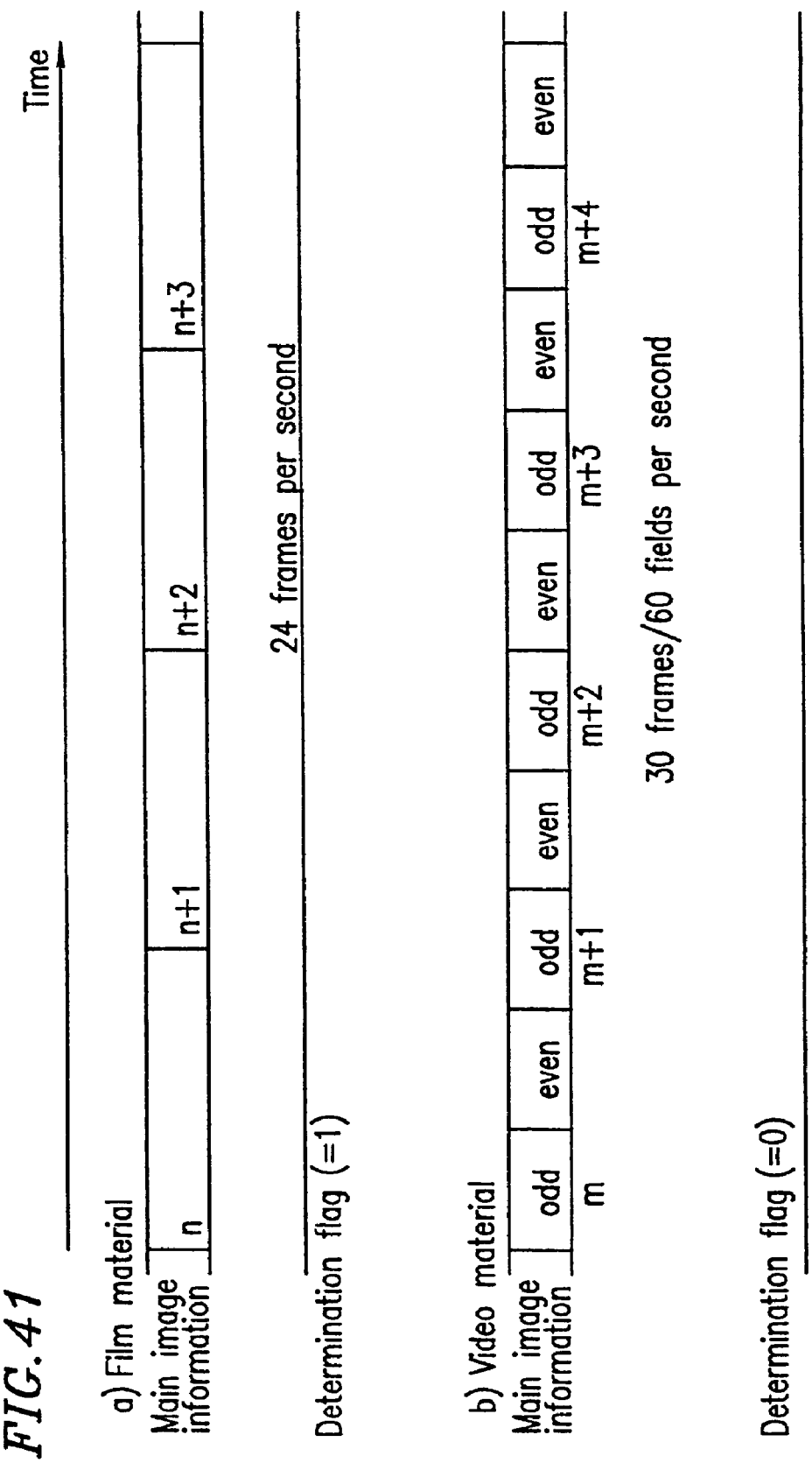
FIG. 41 is a schematic signal diagram showing a structure of an image signal recorded in the disk 1 of the conventional image signal reproduction apparatus.
Figure 42:
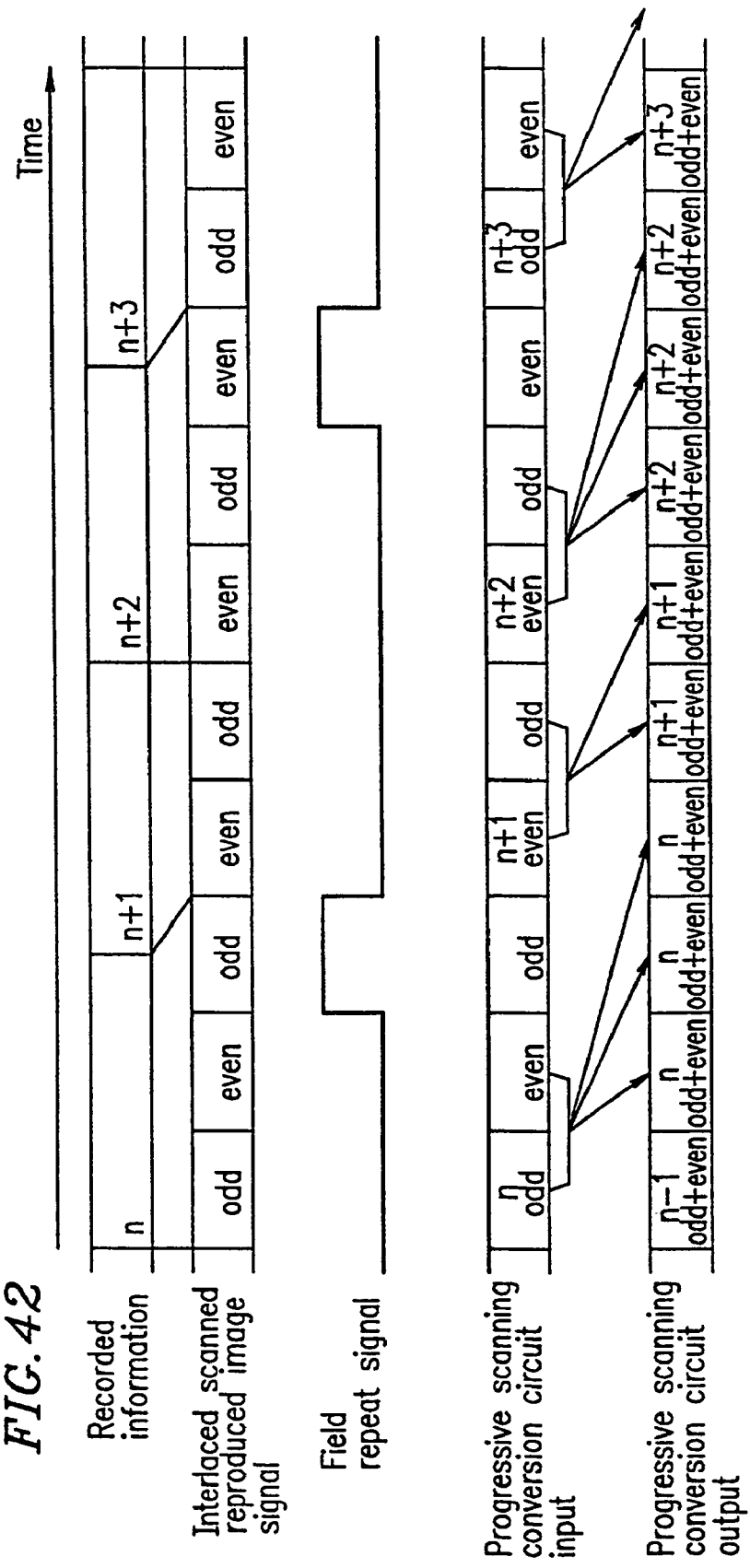
FIG. 42 is a schematic signal diagram showing a structure of a reproduced signal in a film material disk of the conventional image signal reproduction apparatus.
Figure 43:
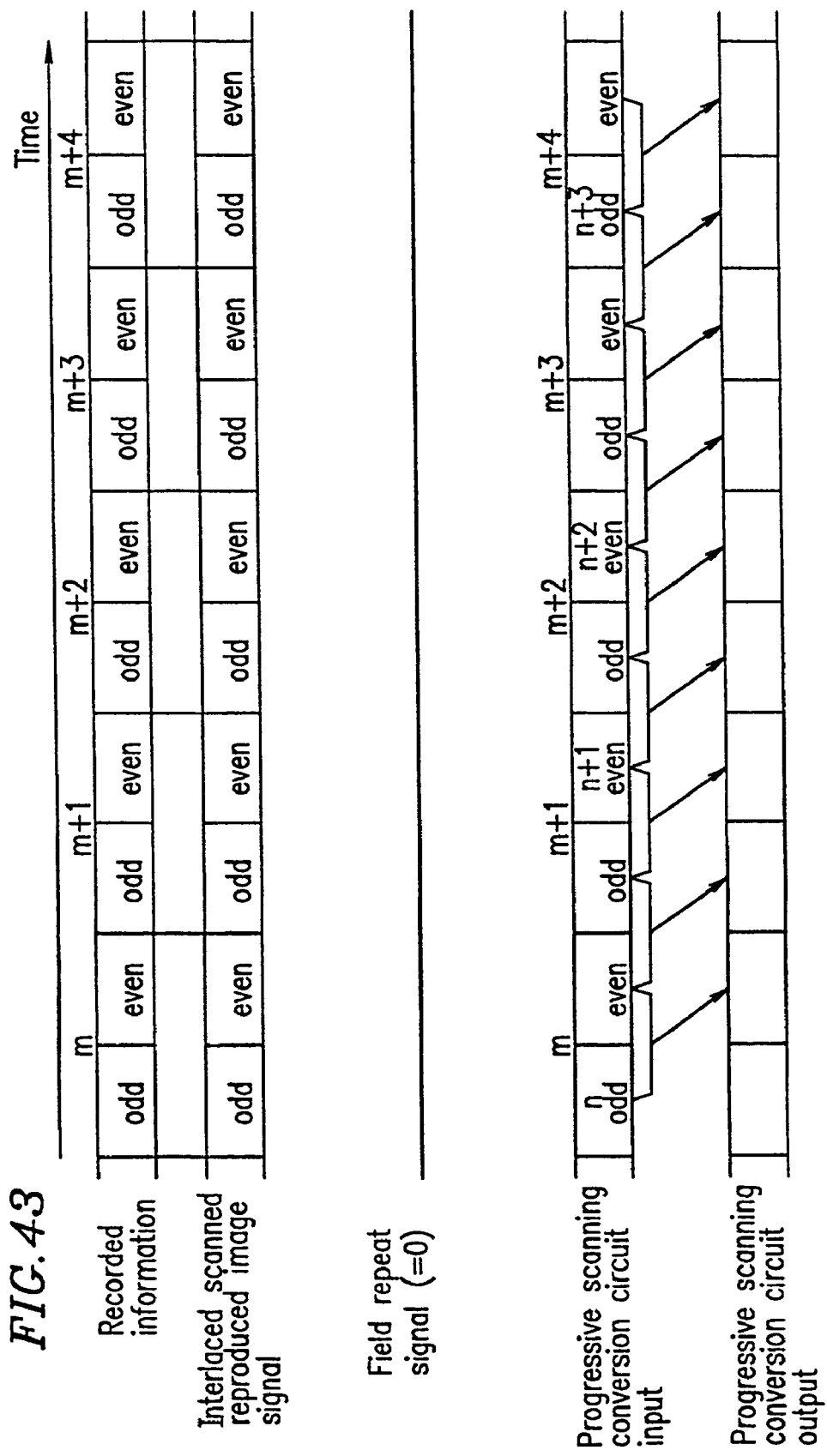
FIG. 43 is a schematic signal diagram showing a structure of a reproduced signal in a video material disk of the conventional image signal reproduction apparatus.
Figure 44:
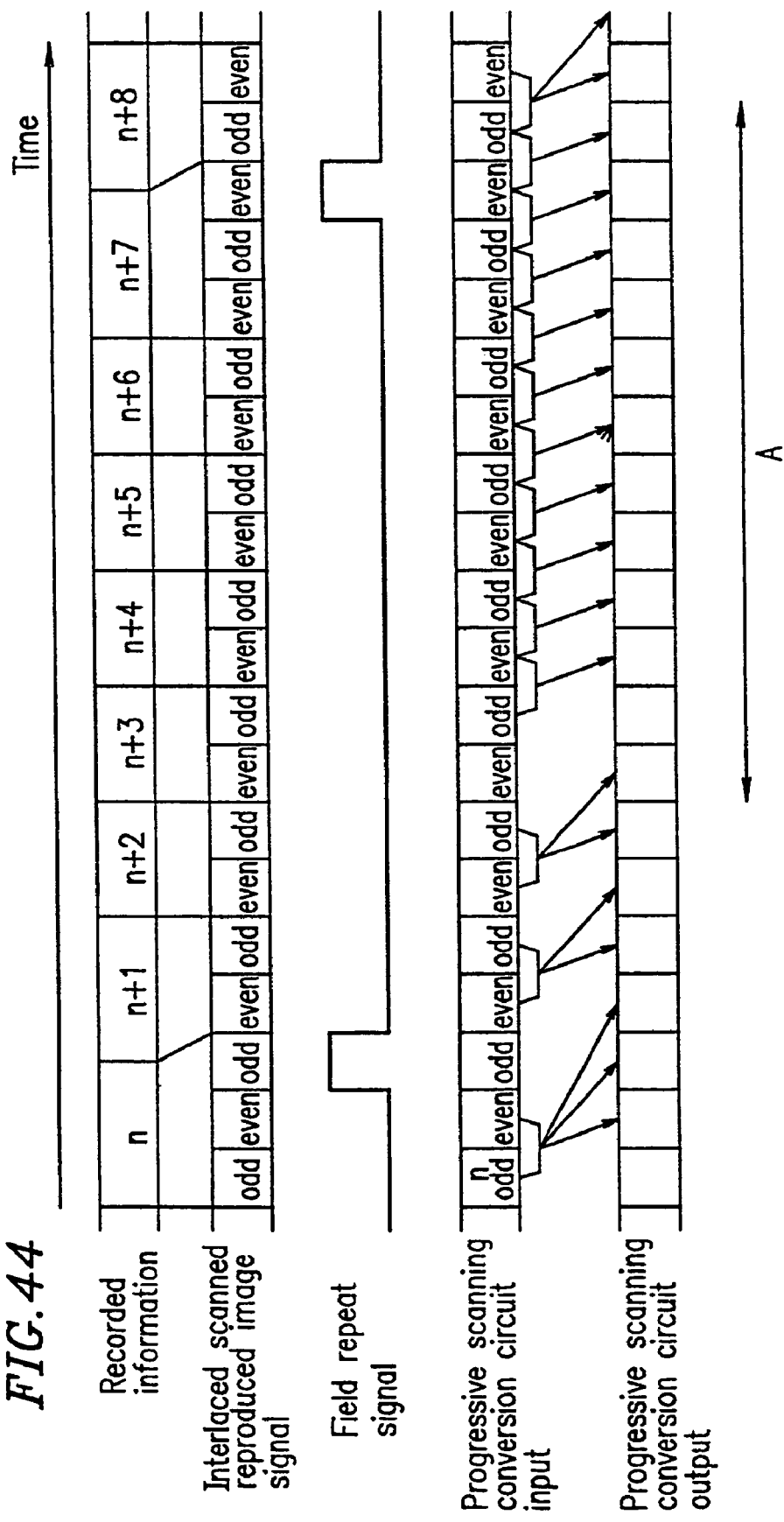
FIG. 44 is a schematic signal diagram showing a reproduced signal in a disk, on part of which a video signal is recorded, in the conventional image signal reproduction apparatus.
Figure 45:
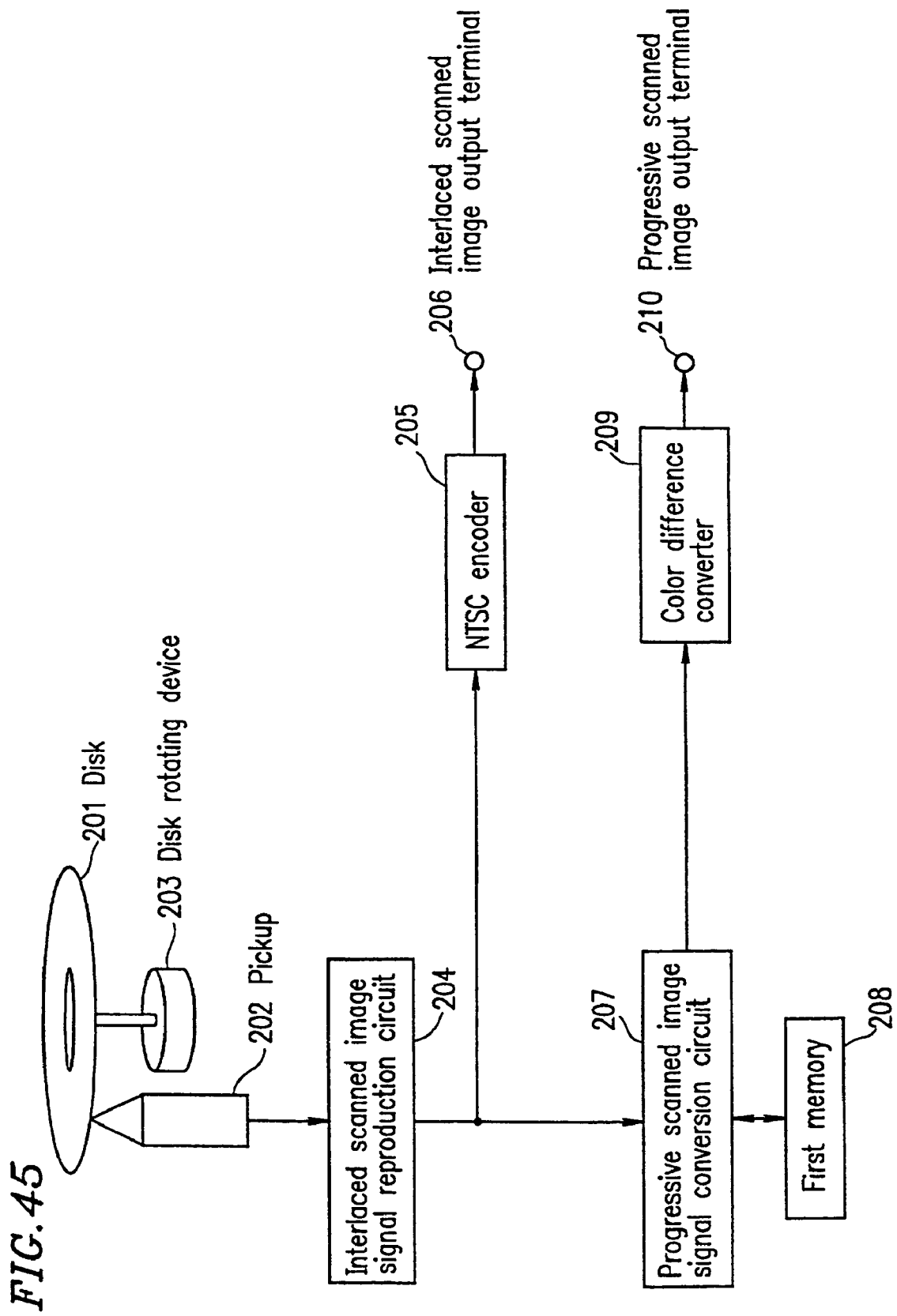
FIG. 45 is a block diagram showing a configuration of a conventional image signal reproduction apparatus.
Figure 46:
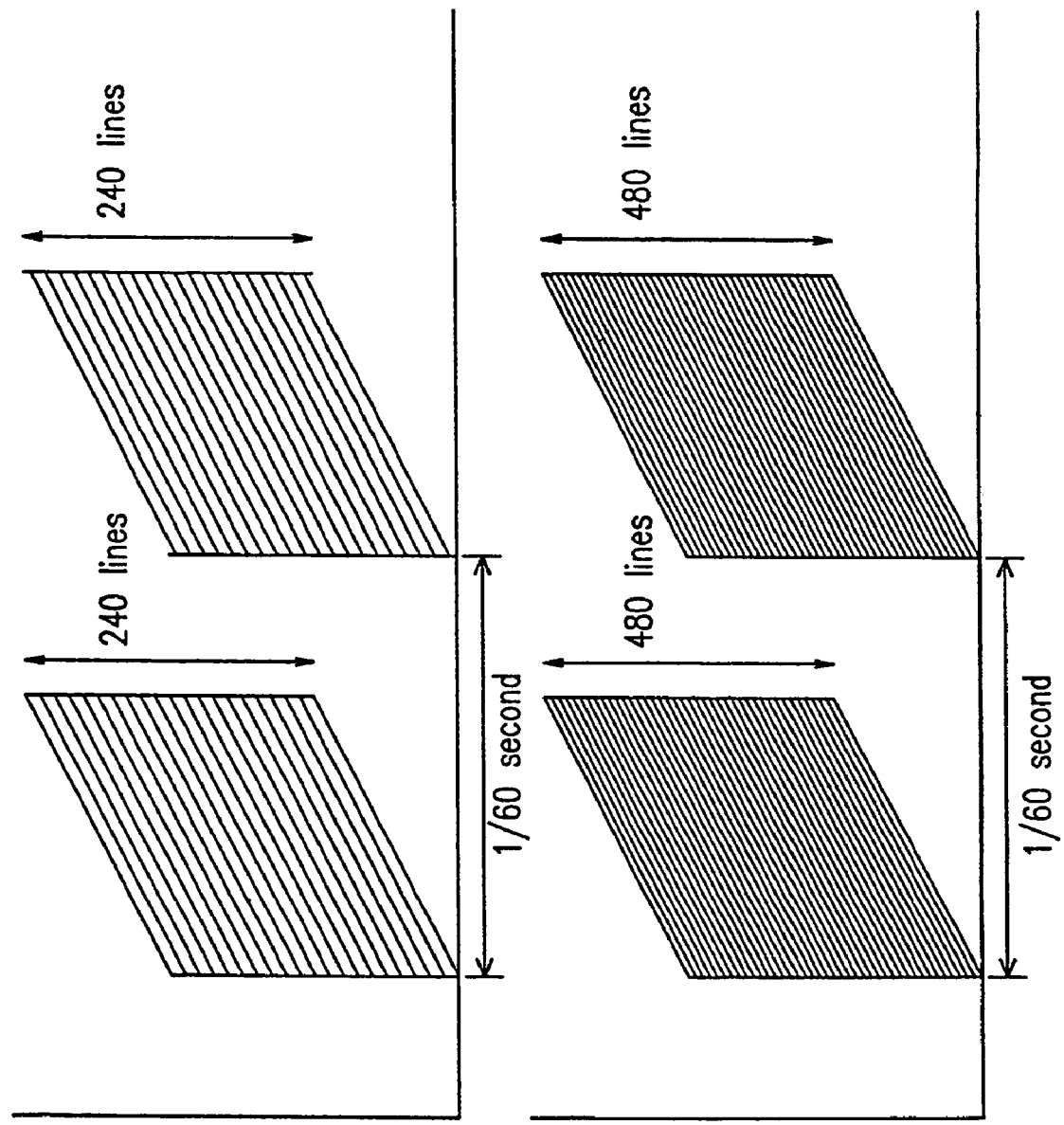
FIG. 46 is a schematic diagram showing structures of an interlaced scanned image signal and a progressive scanned image signal of the conventional image signal reproduction apparatus.
Figure 47:
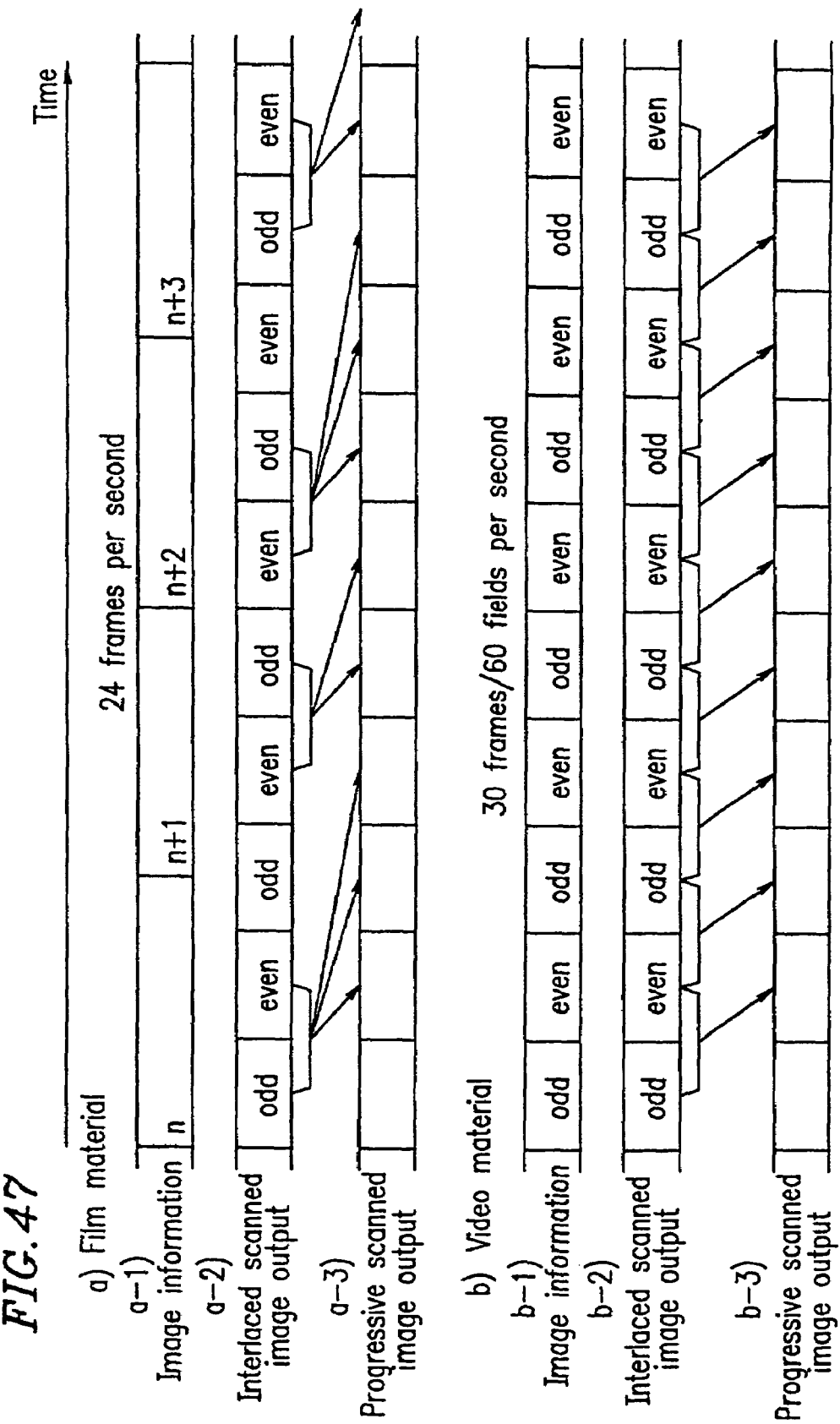
FIG. 47 is a schematic diagram showing a structure of an image signal of the conventional image signal reproduction apparatus.
Figure 48:
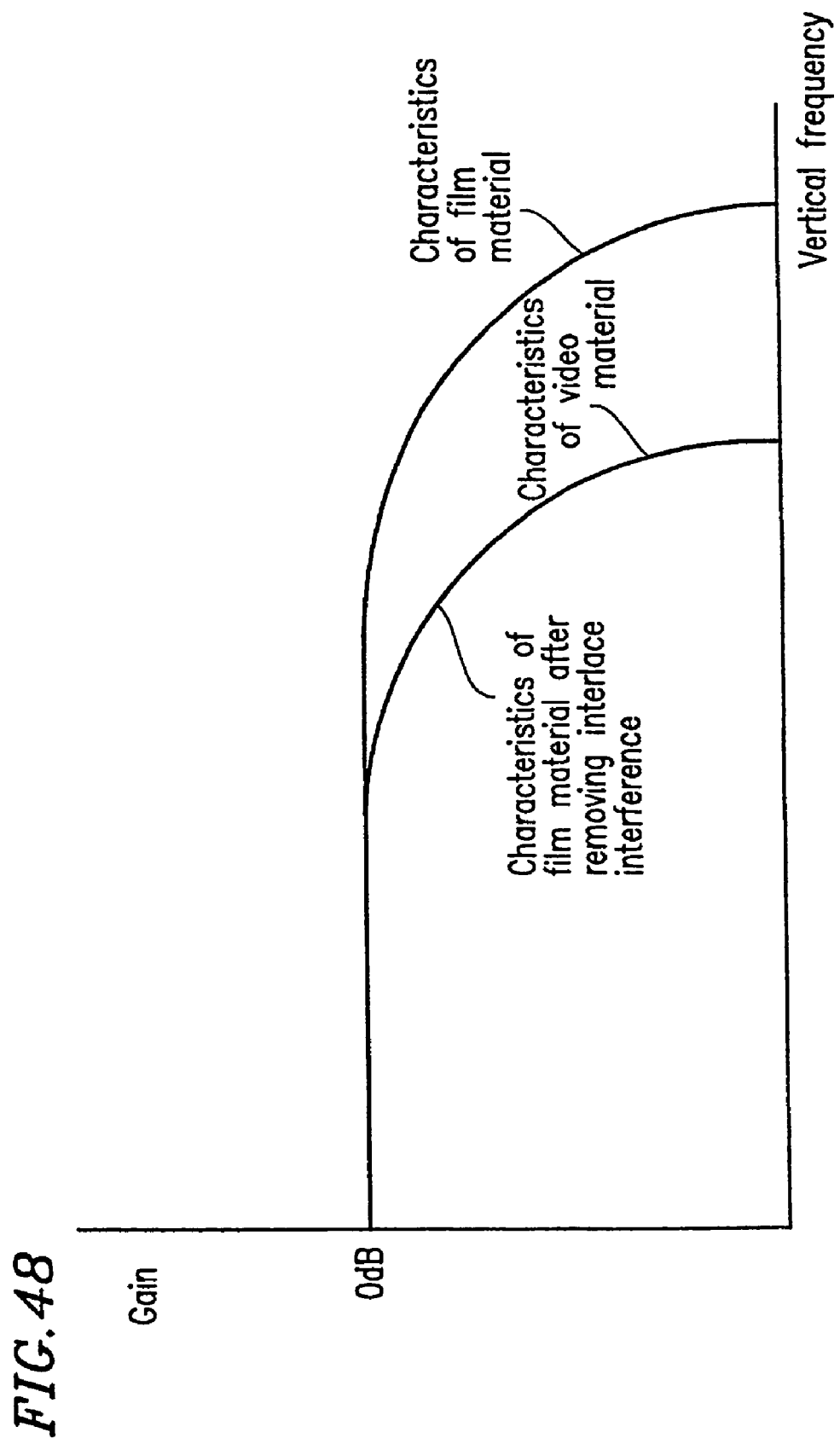
FIG. 48 is a schematic diagram showing the vertical frequency characteristics of material of the conventional image signal reproduction apparatus.
Figure 49:
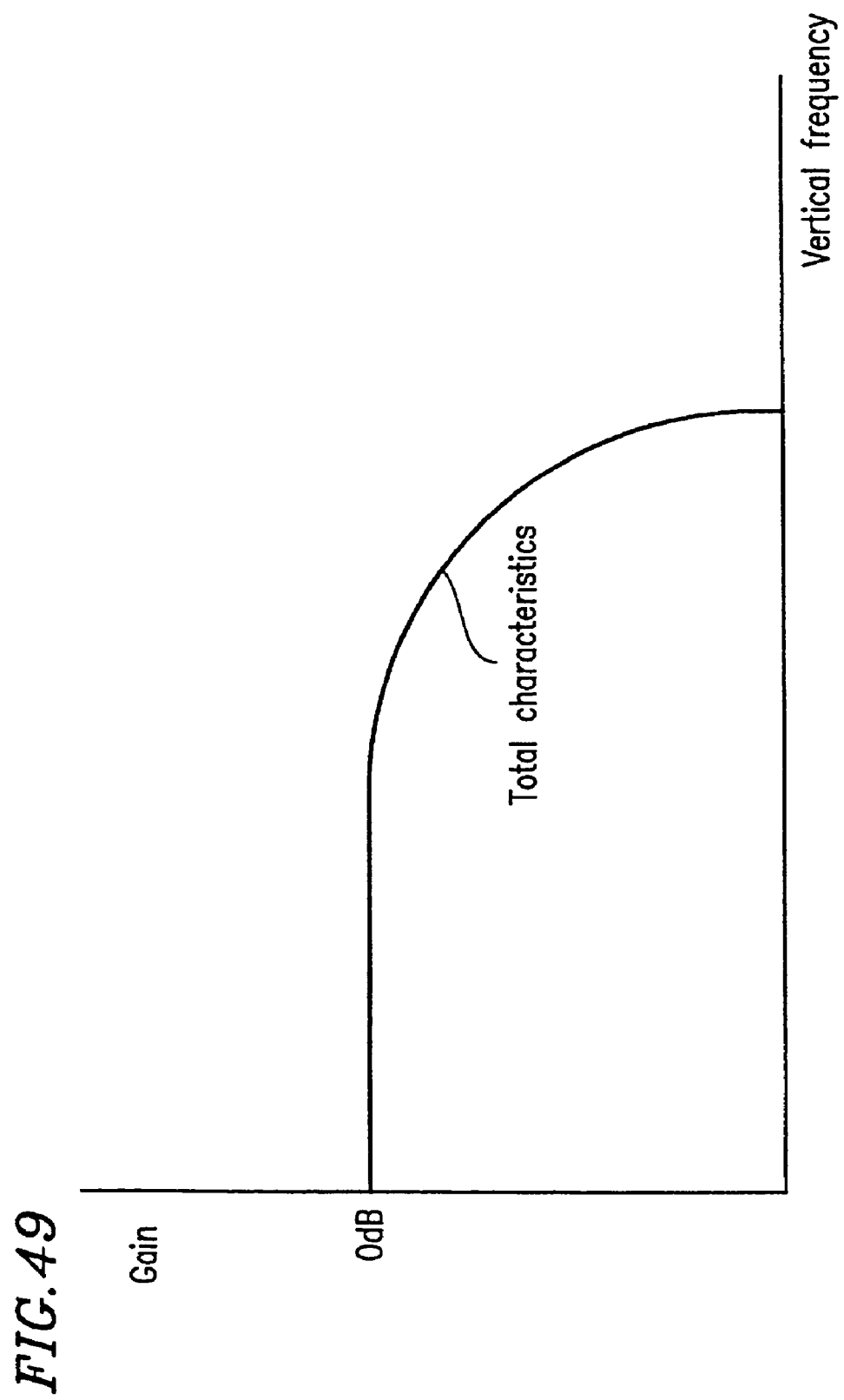
FIG. 49 is a schematic diagram showing the vertical frequency characteristics of a progressive scanned image output of the conventional image signal reproduction apparatus.
Figure 50:
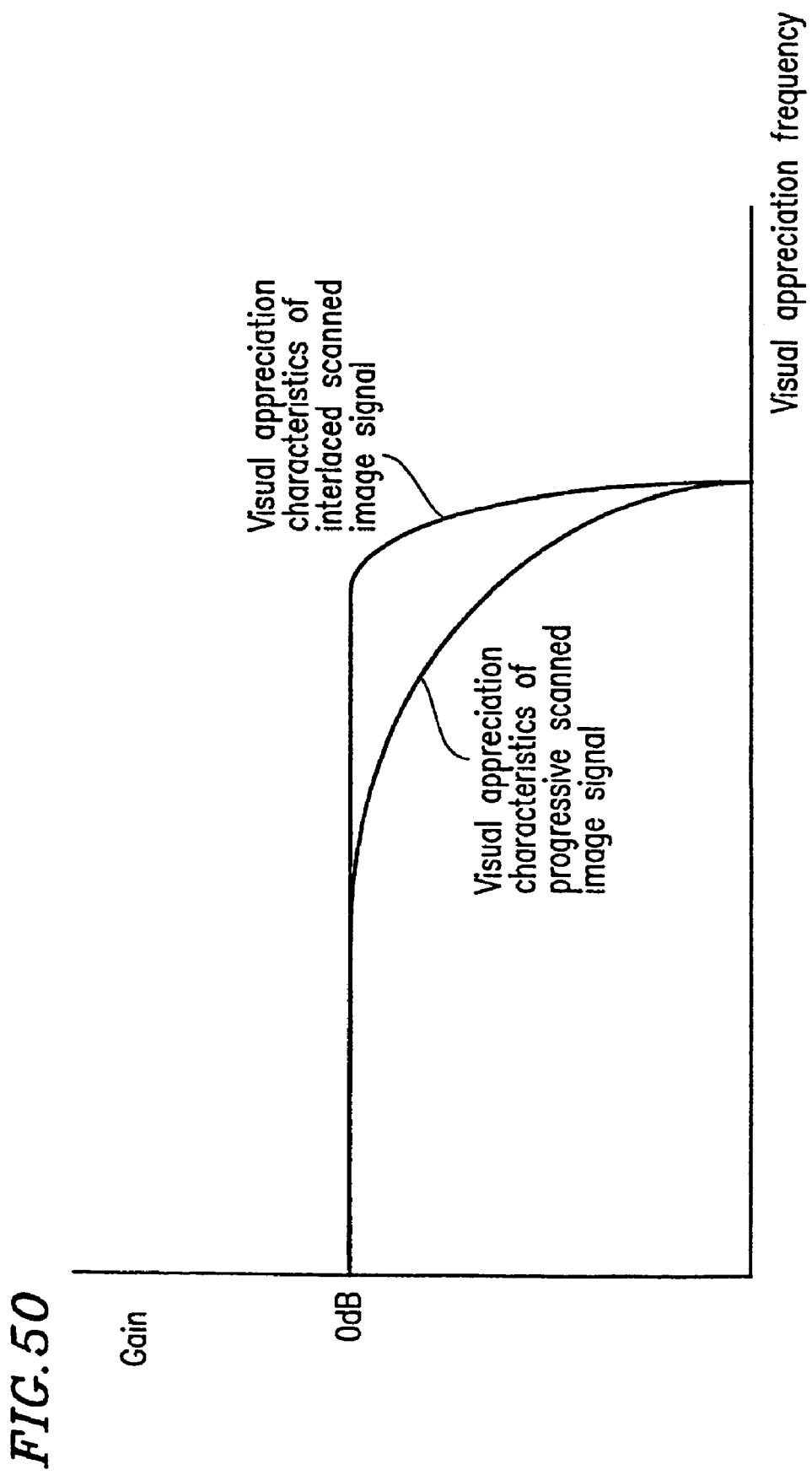
FIG. 50 is a schematic diagram showing visual appreciation-related characteristics of an interlaced scanned image and a progressive scanned image of the conventional image signal reproduction apparatus.
Figure 51:
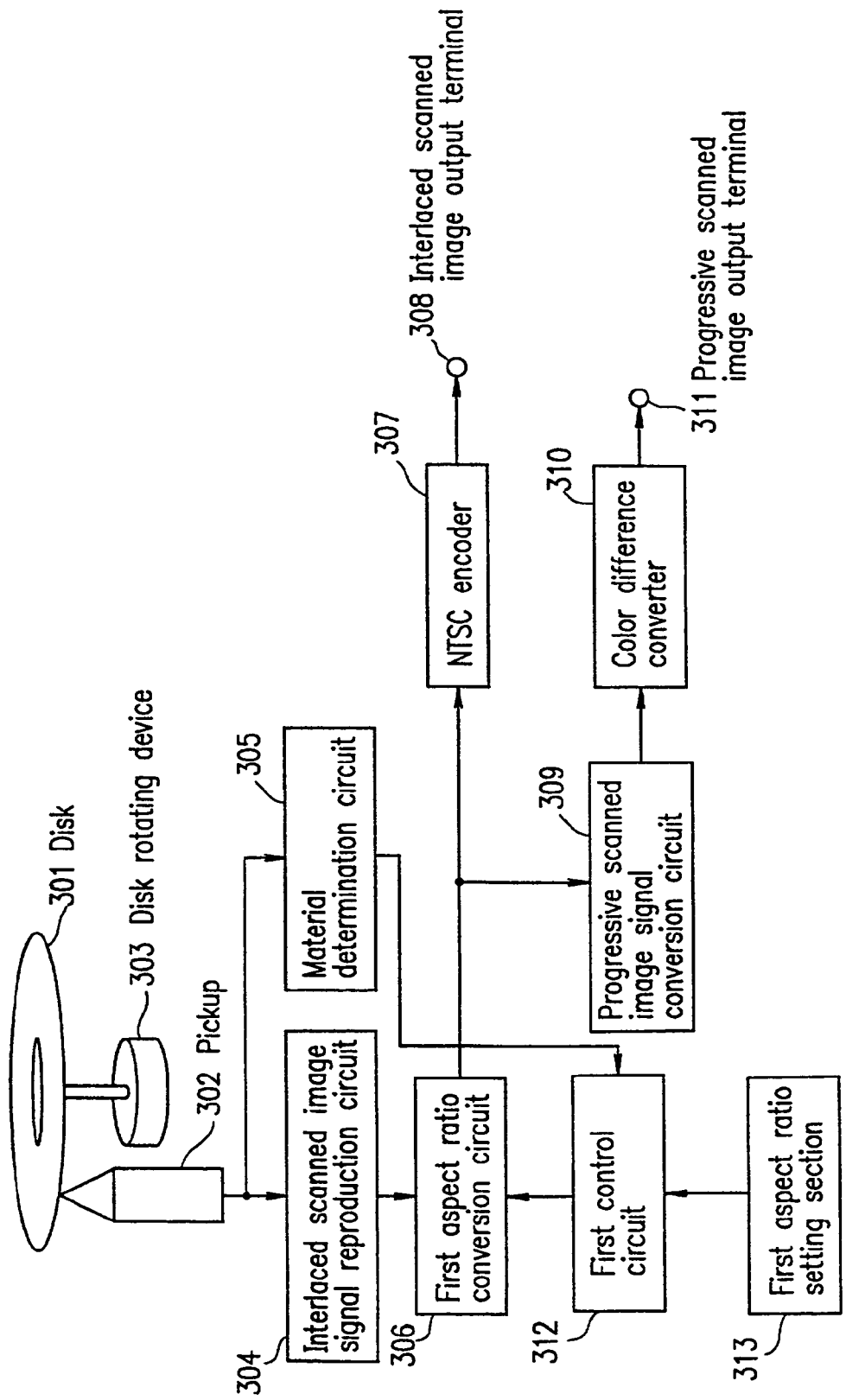
FIG. 51 is a block diagram showing a configuration of a conventional image signal reproduction apparatus.
Figure 52:
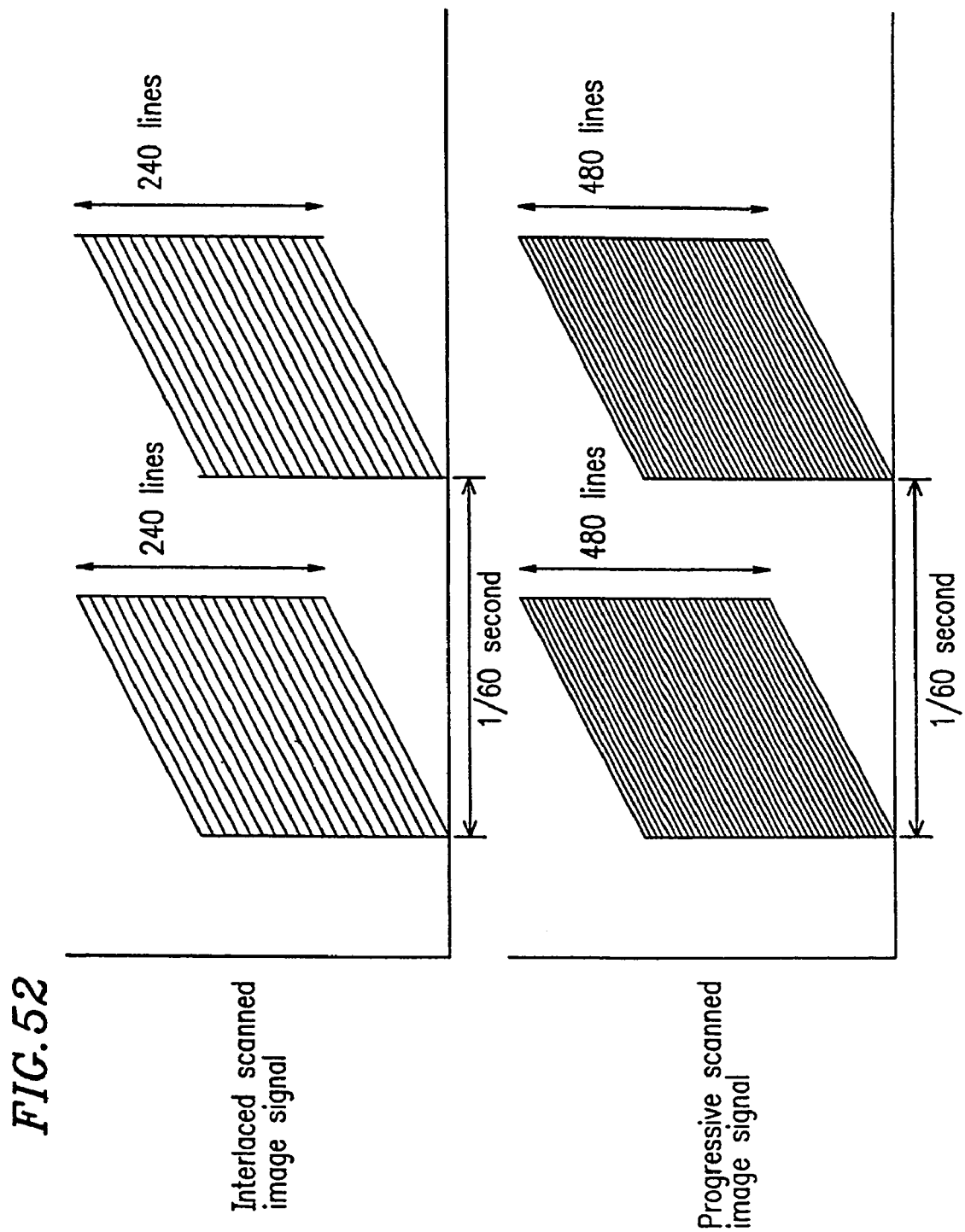
FIG. 52 is a schematic diagram showing a structure of an image signal recorded in a disk of the conventional image signal reproduction apparatus.

FIG. 10 is a schematic diagram showing structures of the interlaced scanned image signal and the progressive scanned image signal in the image signal reproduction apparatus according to Example 2 of the present invention, which is similar to FIGS. 2 and 40. In the interlaced scanned image signal, one field of image is created in ⅟₆₀ second. One frame of image is composed of two fields. The number of vertical pixels of each of the two fields is 240. The pixels of one field are buried between the other fields in the vertical direction, vice versa. In the progressive scanned signal, one frame is created in ⅟₆₀ second and the number of pixels in the vertical direction is 480.

Both signals have a vertical frequency of ⅟₆₀ second. The number of horizontal scanning lines of the progressive scanned image signal is twice as many as that of the interlaced scanned image signal. The horizontal scanning frequency of the interlaced scanned image signal is about 15.75 KHz, while that of the progressive scanned image signal is about 31.5 KHz.

Figure 11:
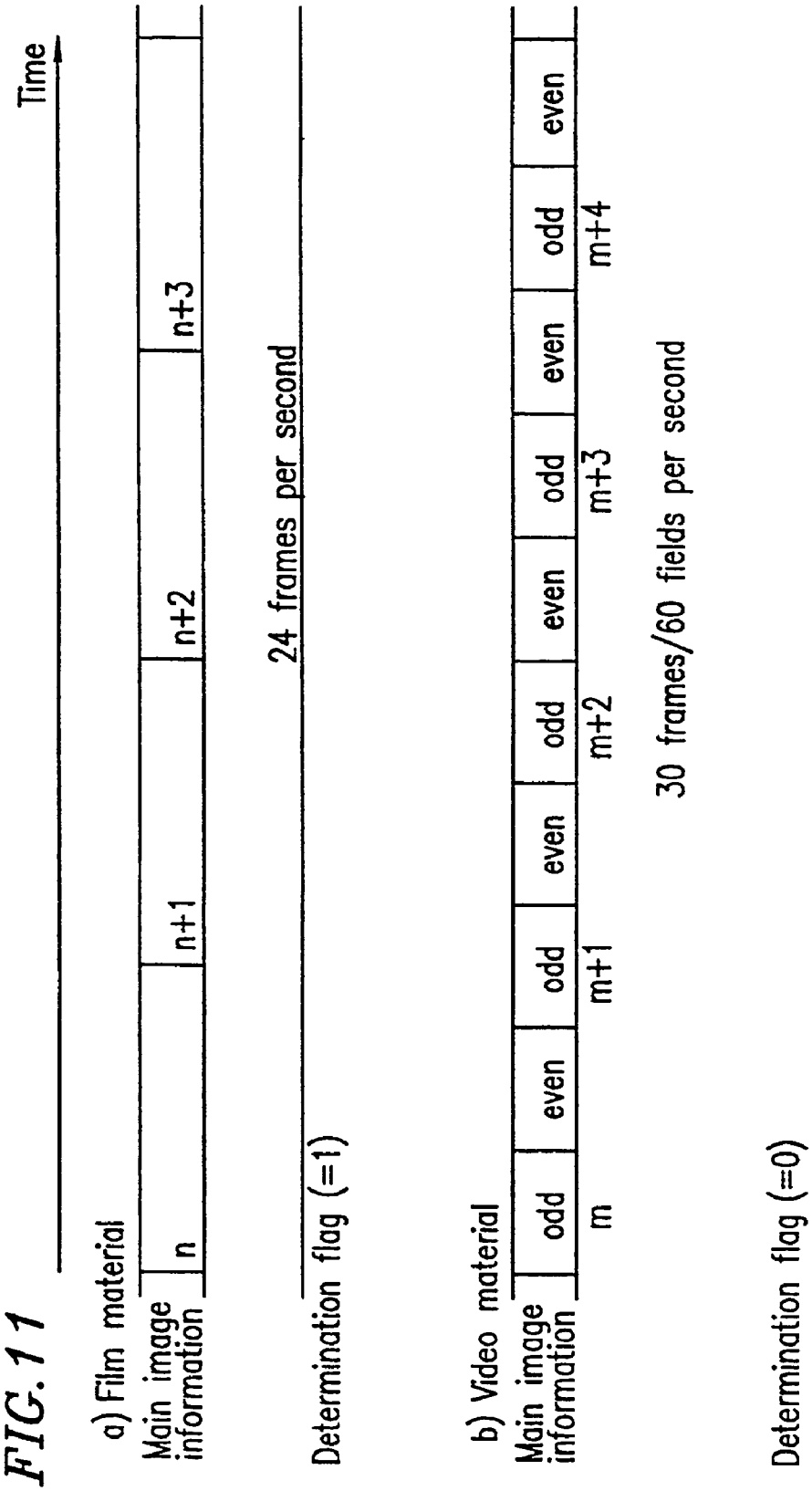
FIG. 11 is a schematic signal diagram showing a structure of an image signal recorded in the disk 1 of the image signal reproduction apparatus according to Example 2 of the present invention.

FIG. 11 is a schematic signal diagram showing a structure of the image signal recorded in the disk 1 of the image signal reproduction apparatus according to Example 2 of the present invention. As shown in FIG. 11, the image signal recorded in the disk 1 has two forms. Specifically, FIG. 11a) shows a film material. In this case, the original material is a film image composed of 24 frames of pictures per second. Each frame of the film image is compressed and recorded onto the disk 1 as an image of 720×480 dots. FIG. 11b)

shows a video material image. In this case, the original material is an interlaced scanned image composed of 30 frames/60 fields per second. Each frame is an image of 720×480 dots, but interlaced, so that each field is an image of 720×240 dots. The field is compressed and recorded onto the disk 1. As shown in FIG. 11, the determination flag which shows whether the main image signal is of film material or video material, is recorded on the disk 1 along with the main video signal.

Figure 12:
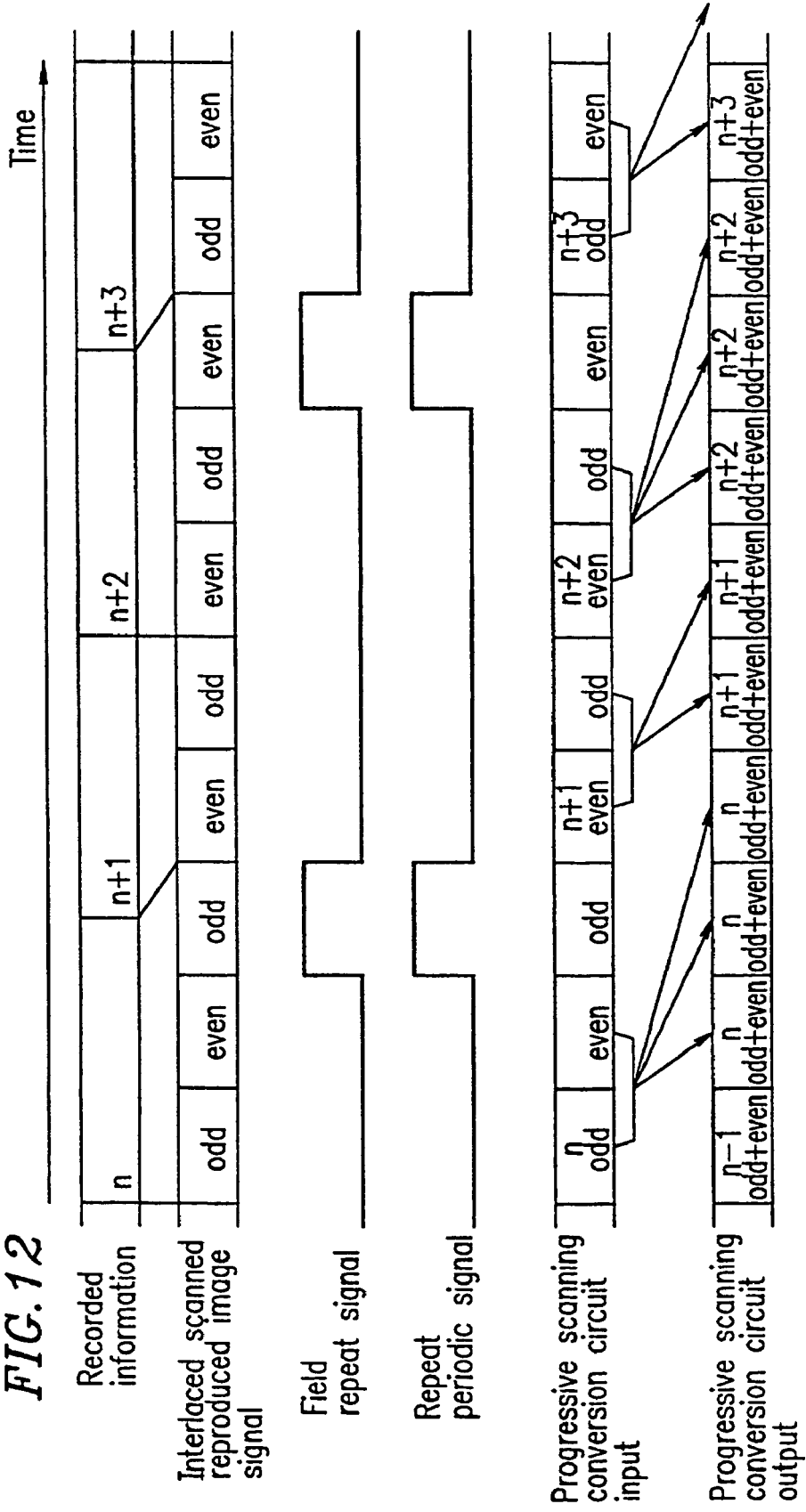
FIG. 12 is a schematic signal diagram showing a structure of a reproduced signal in a film material disk of the image signal reproduction apparatus according to Example 2 of the present invention.

FIG. 12 is a schematic signal diagram showing a reproduced signal from a film material disk of Example 2 of the present invention.

When the material of the image signal recorded in the disk 1 is a film, 24 frames of images of 720×480 dots per second are recorded as shown in FIG. 12. The interlaced scanned image signal reproduction circuit 4 reads the signal recorded on the disk 1 from an output of the pickup 2. The first material determination circuit 8 reads the determination flag from an output of the pickup 2 and determines the type of the main image signal, and outputs the result to the interlaced scanned image signal reproduction circuit 4, the field repeat signal generation circuit 9, and the second material determination circuit 19. Based on an output of the first material determination circuit 8, the interlaced scanned reproduction circuit 4 recognizes that the main image signal recorded in the disk 1 is of film material. As shown in FIG. 12, the film material images are recorded in the disk 1 in order of the frame numbers . . . , n, n+1, n+2, n+3, . . . . The film material signal thus recorded is converted into an interlaced scanned image and output by the interlaced scanned signal reproduction circuit 4. This is because television monitors are commonly used as an image display apparatus for home entertainment, and the display format is the interlaced scanning. Since the television monitor is designed to display a moving image of 30 frames/60 fields per second, the interlaced scanning video signal reproduction circuit 4 converts 24 frames of images per second into 30 frames/60 fields per second and outputs the result. The interlaced scanning video signal reproduction circuit 4 divides each frame of recorded information into two interlaced scanned field images, odd and even, as shown in the interlaced scanned reproduced image signal in FIG. 12. The interlaced scanning video signal reproduction circuit 4 further displays the head field after the last field of each frame in response to the field repeat signal repeated every 5 fields output from the field repeat signal generation circuit 9 so that 24 frames of film images per second are converted into the interlaced scanned images of 30 frames/60 fields per second which are output. The first memory 5 functions as a buffer memory when the interlaced scanning video signal reproduction circuit 4 reproduces an image.

The NTSC encoder 6 produces an NTSC standard video signal from the interlaced scanned image signal thus reproduced and outputs the result through the interlaced scanned image output terminal 7. A television monitor (not shown) is connected to the interlaced scanned image output terminal 7 so that the user can see the film material image converted into the interlaced scanned image on the monitor.

Further, the interlaced scanned image signal reproduced circuit 4 inputs the interlaced scanned image signal to the progressive scanning conversion circuit 17, the matching detection circuit 15, and the third memory 16. The third memory 16 delays the input interlaced scanned image signal by 2 fields, and outputs the result to the matching detection circuit 15.

Figure 13:
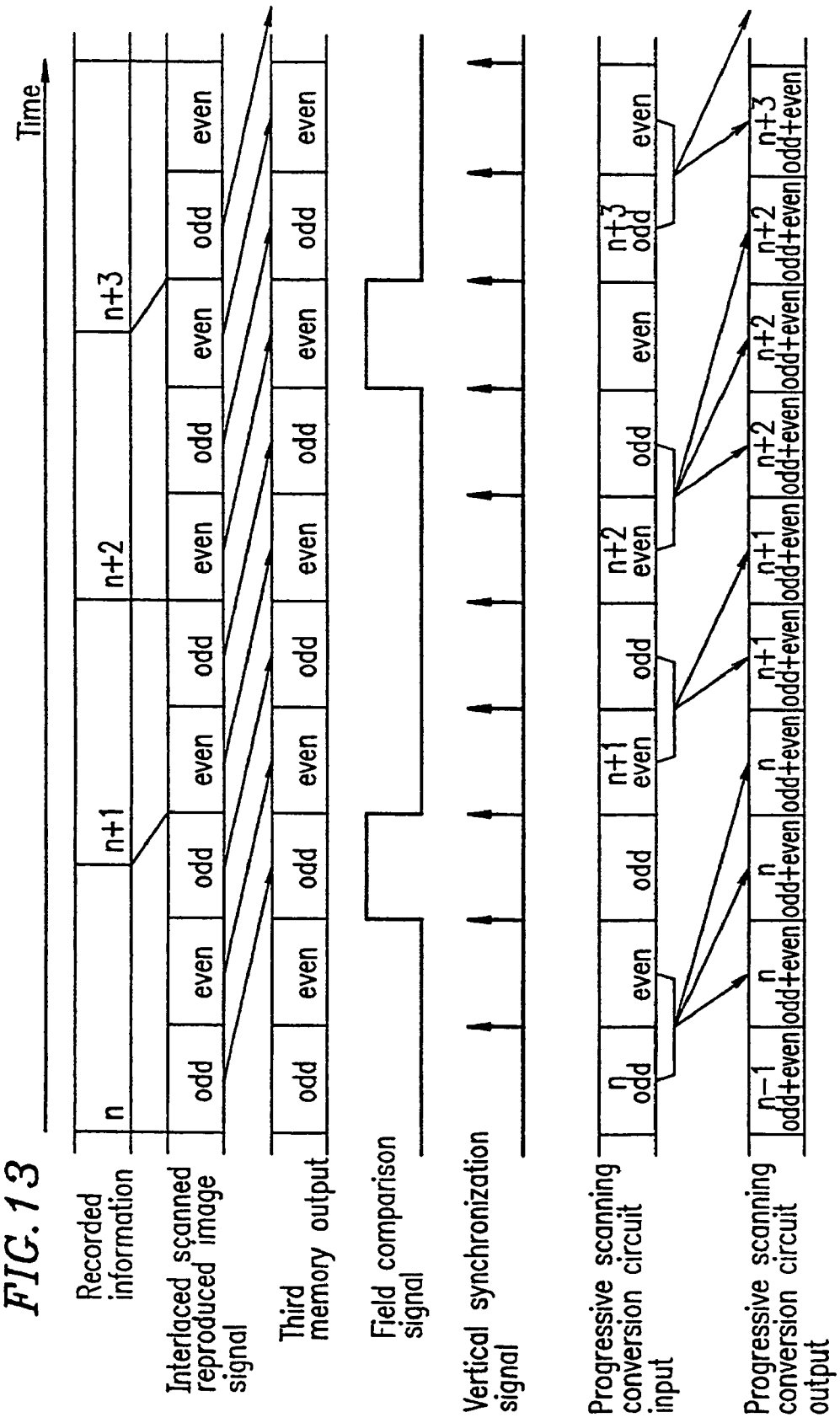
FIG. 13 is a schematic signal diagram showing an operation of a matching detection circuit in a film material disk of the image signal reproduction apparatus according to Example 2 of the present invention.

FIG. 13 is a schematic signal diagram showing an operation of the matching detection circuit in a film material disk according to Example 2 of the present invention.

In the matching detection circuit 15, it is determined whether the material of an image signal is a film material or video material. Specifically, if the input image signal is obtained by converting film to video, a head field is repeated after a last field for each frame. Therefore, the same field appears once every 5 fields. Accordingly, the matching detection circuit 15 detects that the number of pixels, which satisfies that the data difference in each pixel of each field between an output of the third memory 16 and an output of the interlaced scanned image signal generation circuit 4 is less than or equal to a predetermined threshold, is greater than or equal to a certain value. If the matching detection circuit 15 thus detects the matching of fields, the matching detection is provided to the field comparison information shown in FIG. 13. In this way, the matching detection is "1" every 5 fields. Therefore, when the matching detection circuit 15 detects a change in the field comparison information every 5 fields, the matching detection circuit 15 determines that the material of the image signal is of film.

Figure 14:
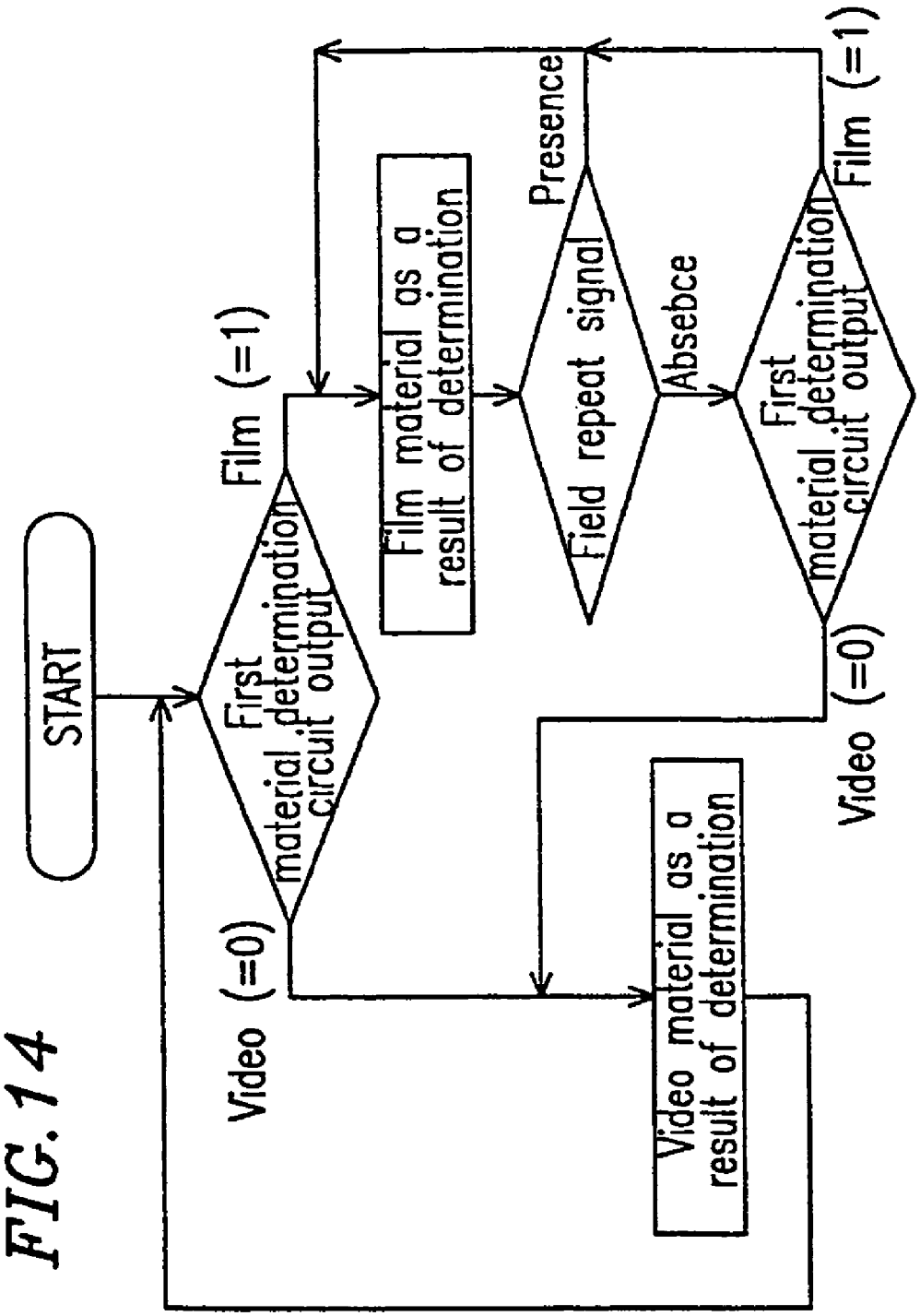
FIG. 14 is a flowchart showing a determination method of a second material determination circuit of the image signal reproduction apparatus according to Example 2 of the present invention.

FIG. 14 is a flowchart showing a determination method of the second material determination circuit according to Example 2 of the present invention.

As shown in FIG. 14, the second material determination circuit 19 determines whether the material of an image signal is a film material or video material, based on an output of the first material determination circuit 8 and an output of the matching detection circuit 15. Specifically, when the field repeat signal is generated, it is determined that the material of the image signal is of film material. Even after the first material determination circuit 8 transitions from the state where it is determined that the image signal is of film material to the state where it is determined the image signal is of video material, if the matching detection circuit determines that the material of the image signal is the film material, the second material determination circuit 19 determines that the material is the film material.

The repeat periodic signal generation circuit 18 generates a repeat periodic signal shown in FIG. 12, based on the field comparison information every 5 fields detected by the matching detection circuit 15. The field comparison information only indicates how much information a current field matches a second field before the current field. The matching detection depends on the threshold used for determining whether matching or not and the image information, and therefore the matching may not be detected. The repeat periodic signal generation circuit 18 also functions as a flywheel circuit so that the repeat information of the 5 field period is generated when the field comparison information is not obtained.

When the second material determination circuit 19 determines that the main image is of film material, the progressive scanning conversion circuit 17 performs the progressive scanning conversion in response to the repeat periodic signal generated by the repeat periodic signal generation circuit 18. Specifically, in the case of film material, for each frame of each material, an original image of 720×480 dots is divided into 2 fields of 720×240 dots, which may be synthesized again. Therefore, the progressive scanning conversion circuit 17 can detect the timing of switching of the frames of the film signal which is the material of an input digital image signal, using the repeat periodic signal shown in FIG. 12. In response to the repeat periodic signal, the progressive scanning conversion circuit 17 stores the head field of the progressive scanning conversion circuit input shown in FIG.

12 in the second memory 11 and the second field in the second memory 11, and reads out both information on a line-by-line basis at a double speed, thereby obtaining the progressive scanning conversion circuit output. The converted image signal is converted into an analog signal by the D/A converter 12. The resultant analog signal is output through the progressive scanned image signal output terminal 13. A television monitor (not shown) for the progressive scanned image signal is connected to the progressive scanned image signal output terminal 13. The user can see the film material images restored to the progressive scanned image via the television monitor.

Figure 15:
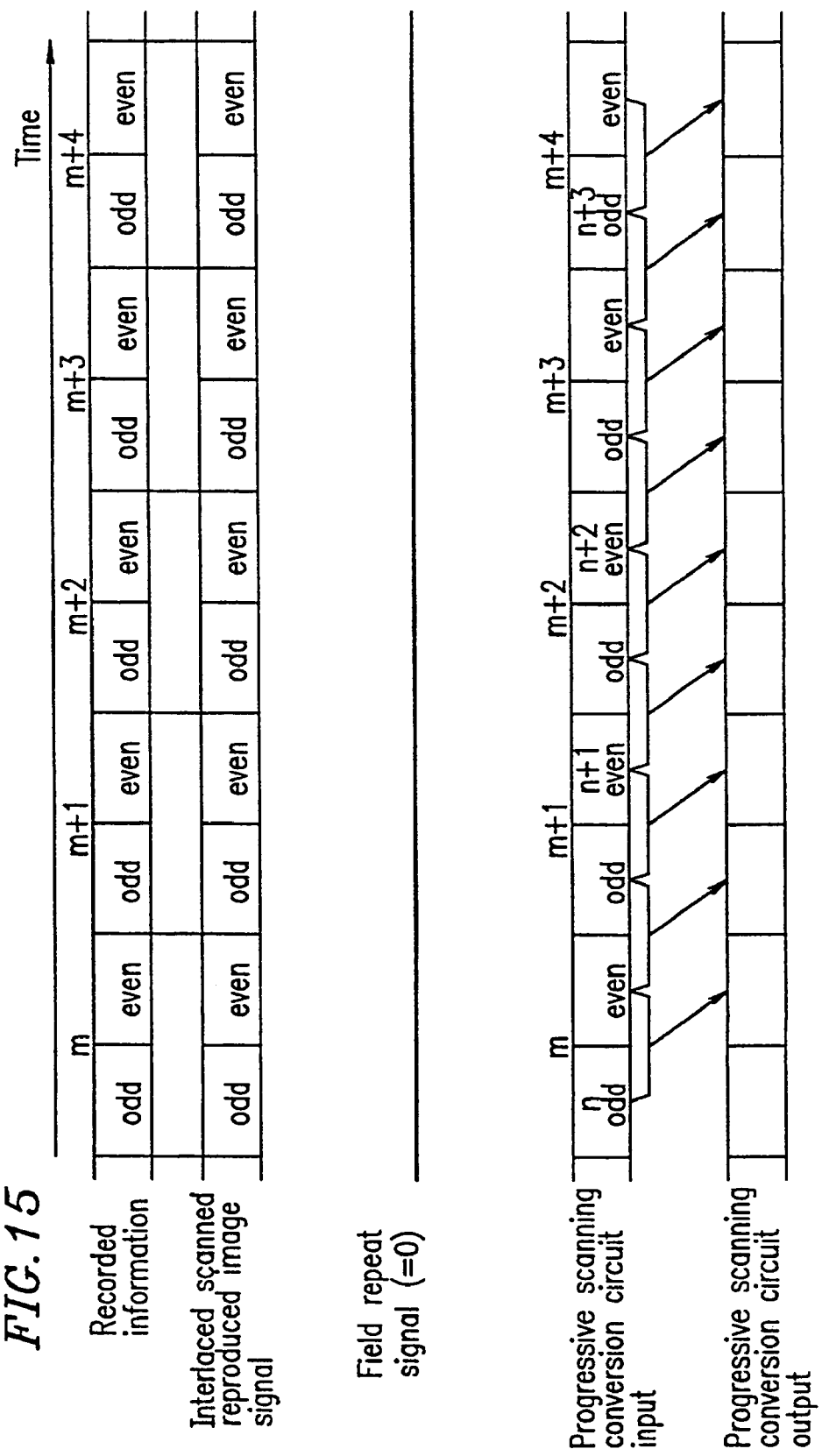
FIG. 15 is a schematic signal diagram showing a structure of a reproduced signal in a video material disk of the image signal reproduction apparatus according to Example 2 of the present invention.

FIG. 15 is a schematic signal diagram showing a reproduced signal of the video material disk of Example 1 of the present invention.

In the case when the material of image signals recorded in the disk 1 is a video material, an interlaced scanned image of 30 frames/60 fields per second is recorded as recorded information, each field having a 720×240 dots image as shown in FIG. 15. The interlaced scanned image signal reproduction circuit 4 reads the signal recorded in the disk 1 from an output of the pickup 2. The first material determination circuit 8 reads the determination flag from the output of the pickup 2 and determines the type of the main image signal, and outputs the determination flag as the determination signal to the interlaced scanned image signal reproduction circuit 4 and the field repeat signal generation circuit 9. As shown in FIG. 15, the video material images are recorded in the disk 1 in order of the frame numbers . . . , m, m+1, m+2, m+3, m+4, . . . . The interlaced scanned image signal reproduction circuit 4 outputs the video material signal thus recorded as the interlaced scanned image signal shown in FIG. 15 without alteration. The first memory 5 functions as a buffer memory when the interlaced scanned image signal reproduction circuit 4 reproduces an image.

The NTSC encoder 6 produces an NTSC standard video signal from the interlaced scanned image signal thus reproduced and outputs the result through the interlaced scanned image output terminal 7. A television monitor (not shown) is connected to the interlaced scanned image output terminal 7 so that the user can see the film material image converted into the interlaced scanned image via the monitor.

The matching detection circuit 15 determines whether the material of an image signal is of film material or video material. Specifically, the same field does not appear once every 5 fields when the input image signal is of video material. Therefore, the matching detection circuit 15 determines that the interlaced scanned image is not of film material, based on the fact that there does not exist synchronicity.

The second material determination circuit 19 determines whether the material of the image signal is of film material or video material, based on an output of the first material determination circuit 8 and an output of the matching detection circuit 15. The second material determination circuit 19 shown in FIG. 14 determines that the image signal is of video signal when the first material determination circuit 8 determines that the image signal is of video material and the matching detection circuit 15 determines that the image signal is of film material. The interlaced scanned image signal reproduction circuit 4 inputs the interlaced scanned image signal to the progressive scanning conversion circuit 17. The progressive scanning conversion circuit 17 recognizes that the input digital image signal is of video signal, based on an output of the second material determination circuit 19. Accordingly, the progressive scanning conversion circuit 17 performs the progressive scanning conversion while the main image signal is regarded as the video material. Specifically, in the case of the video material, the progressive scanning conversion circuit 17 generates a progressive scanned image signal using two pieces of field information, i.e., current field image information and the previous field information. In this case, the progressive scanning conversion circuit 17 also uses data for the previous field to interpolate in the vertical direction with respect to pixels having small movements between the current and previous fields of the progressive scanned conversion circuit input shown in FIG. 15. With respect to pixels having large movements between the current and previous fields, vertical interpolated data is generated from upper and lower pixel data in the same field to obtain a progressive scanning conversion circuit output shown in FIG. 15. The converted image signal is converted into an analog signal by the D/A converter 12. The analog signal is output through the progressive scanned image signal output terminal 13. A television monitor (not shown) for the progressive scanned image signal is connected to the progressive scanned image signal output terminal 13 so that the user can see the video material image converted into the progressive scanned image via the monitor.

Figure 16:
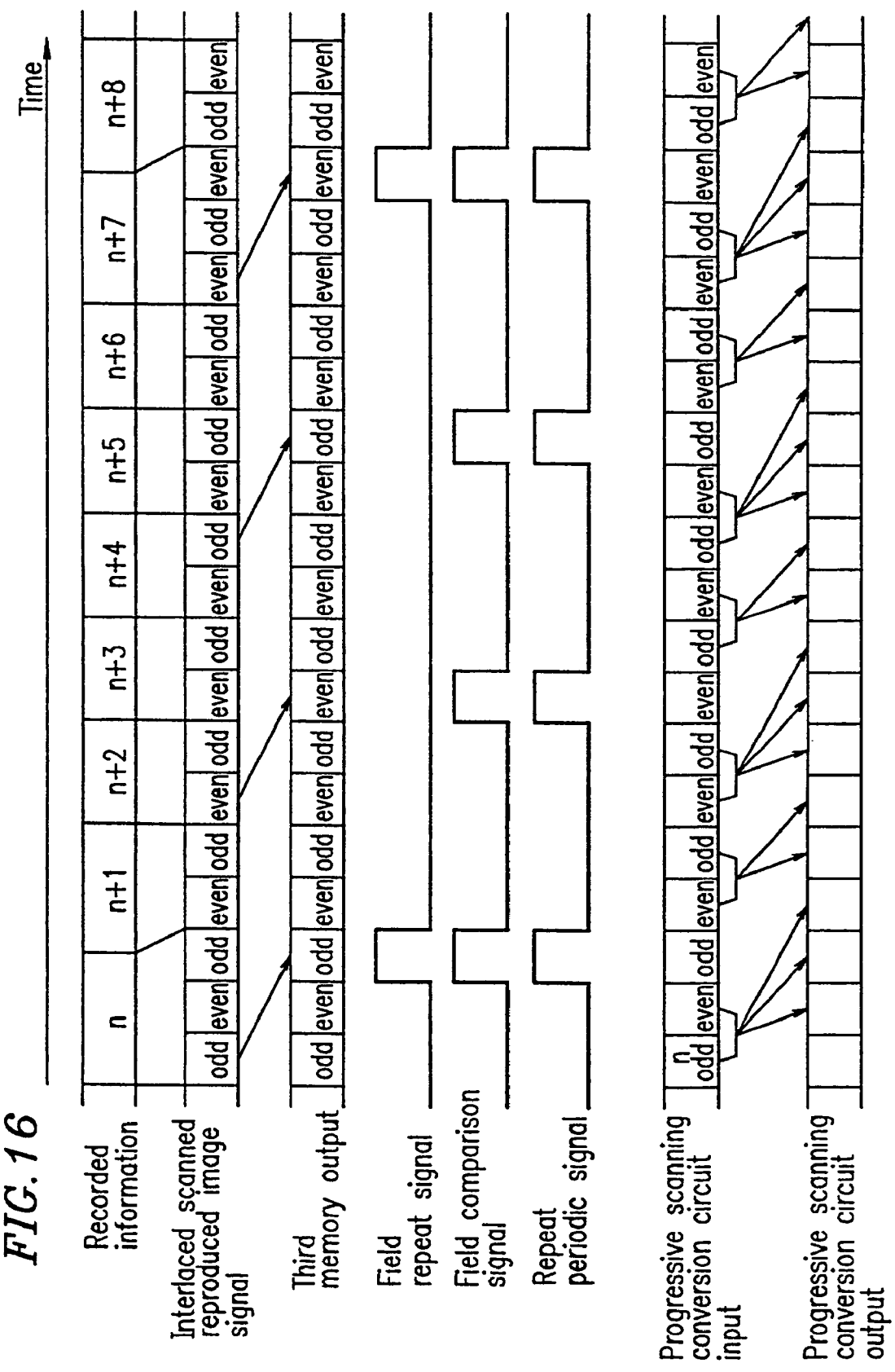
FIG. 16 is a schematic signal diagram showing a reproduced signal in a disk, on part of which a video signal is recorded, in the image signal reproduction apparatus according to Example 2 of the present invention.

FIG. 16 is a schematic signal diagram showing a reproduced signal from a disk, which is a film material disk partially including a recorded video signal, of the image signal reproduction apparatus of Example 2 of the present invention.

Even when the signal source is of film material, part of the signal source may be recorded as a video signal. This happens as follows. A film material may initially be recorded in a video or the like before being recorded on the disk 1. When the material as video is restored to 24-frame information again, part of the material remains as video and is recorded in the disk 1. Specifically, when information to be recorded in the disk 1 is generated, a breakpoint between the frames of the original picture in the recorded video is found by detecting a match every 5 fields in the material recorded in the video of 60 fields, and the video is restored to 24-frame information which is in turn recorded on the disk 1. Therefore, when noise or the like occurs in the information in the video, the detection of a match every 5 fields is not successful. The video information remains as it is, and is still recorded on the disk.

In FIG. 16, the $n^{th}$ frame and the $n+1^{th}$ frame in the recorded information are recorded as film material while the $n+2^{th}$ frame to the $n+6^{th}$ frame are recorded as video information. The $n+7^{th}$ frame and thereafter are recorded as film material.

When such a disk is reproduced by the image information reproduction apparatus of Example 2 of the present invention, the $n^{th}$ frame, the $n+1^{th}$ frame, and the $n+2^{th}$ frame are processed as film information. However, a field repeat signal to exist originally is not detected in the even field of the $n+3^{th}$ frame. Since the original image signal is obtained by converting the film material to 30 frames/60 fields, the feature that the matching of the field information occurs once every 5 field is held.

The matching detection circuit 15 counts the number of pixels, which satisfies that the data difference in each pixel of each field between an output of the third memory 16 and an output of the interlaced scanned image signal generation circuit 4 is less than or equal to a predetermined threshold, and detects the matching of fields if the count value is greater than or equal to a certain value. Such matching detection is indicated by the field comparison information shown in FIG. 16. In this way, the matching detection is "1"

every 5 fields. Therefore, when the matching detection circuit 15 detects a change in the field comparison information every 5 fields, the matching detection circuit 15 determines that the material of the image signal is of film.

The second material determination circuit 19 determines whether the material of an image signal is a film material or video material, based on an output of the first material determination circuit 8 and an output of the matching detection circuit 15. As shown in FIG. 14, even after transition from the state where the first material determination circuit 8 determines that the image signal is of film material to the state where the first material determination circuit 8 determines that the image signal is of video material, if the matching detection circuit 15 determines that the material of the image signal is the film material, the second material determination circuit 19 determines that the material is the film material. Therefore, the second material determination circuit 19 determines that the n+2$^{th}$ frame through the n+6$^{th}$ frame are of film material in FIG. 16. When the second material determination circuit 19 determines that the main image is of film material, the progressive scanning conversion circuit 17 performs the progressive scanning conversion in response to the repeat periodic signal generated by the repeat periodic signal generation circuit 18. Specifically, in the case of film material, for each frame of each material, an original image of 720×480 dots is divided into 2 fields of 720×240 dots, which may be synthesized again. Therefore, the progressive scanning conversion circuit 17 can detect the timing of switching of the frames of the film signal which is the material of an input digital image signal, using the repeat periodic timing signal shown in FIG. 16. In response to the repeat periodic signal, the progressive scanning conversion circuit 17 stores the head field of the progressive scanning conversion circuit input shown in FIG. 16 in the second memory 11 and the second field in the second memory 11, and reads out both information on a line-by-line basis at a double speed, thereby obtaining the progressive scanning conversion circuit output shown in FIG. 16. The converted image signal is converted into an analog signal by the D/A converter 12. The resultant analog signal is output through the progressive scanned image signal output terminal 13. A television monitor (not shown) for the progressive scanned image signal is connected to the progressive scanned image signal output terminal 13. The user can see the film material images restored to the progressive scanned image via the television monitor.

Therefore, the image signal reproduction apparatus according to Example 2 of the present invention can apply the progressive scanning conversion suitable for film material to an image signal of film material which has been partially recorded as a video signal of 60 fields per second.

Note that in the above-described description, the first, second, and third memories are separated for the purpose of explaining the functions thereof. All the memories can be realized using semiconductor memories. All or any two of the memories can be easily realized using a single semiconductor memory by proper arrangement of a circuit.

The above-described Examples are described as hardware arrangements, i.e., electronic circuits which are easy to explain signal flows, but are not necessarily limited thereto. All or part of the pickup 2 and the components having the reference numeral more than 2 may be constructed as software and implemented into a microprocessor, which can perform the same action and effect.

In the above-described Examples, the disk apparatuses reproduce the main image signal and the transfer information from a disk such as DVD or the like. Similarly, another image signal reproduction apparatus for reproducing (or demodulating) the main image signal and the transfer information, such as a tape apparatus, a hard disk apparatus, or a broadcast receiver for satellite broadcast, ground-wave broadcast, cable television broadcast, or the like, can be implemented. Needless to say, the disk, tape, and ground wave may include audio information and the like other than the main image information and the transfer information.

In the above-described Examples, only in the case of the progressive scanned image output, the NTSC encoder 6 and the interlaced scanned image output terminal 7 are not necessarily required. However, in this case, the image signal cannot be input and recorded in a recording apparatus using only the interlaced scanning format such as the so-called VHS video format.

Hereinafter, an example of the present invention where a signal recorded in a disk is reproduced using an information signal including either a first image signal or a second image signal will be described with reference to FIGS. 17 through 27.

Example 3

Figure 17:
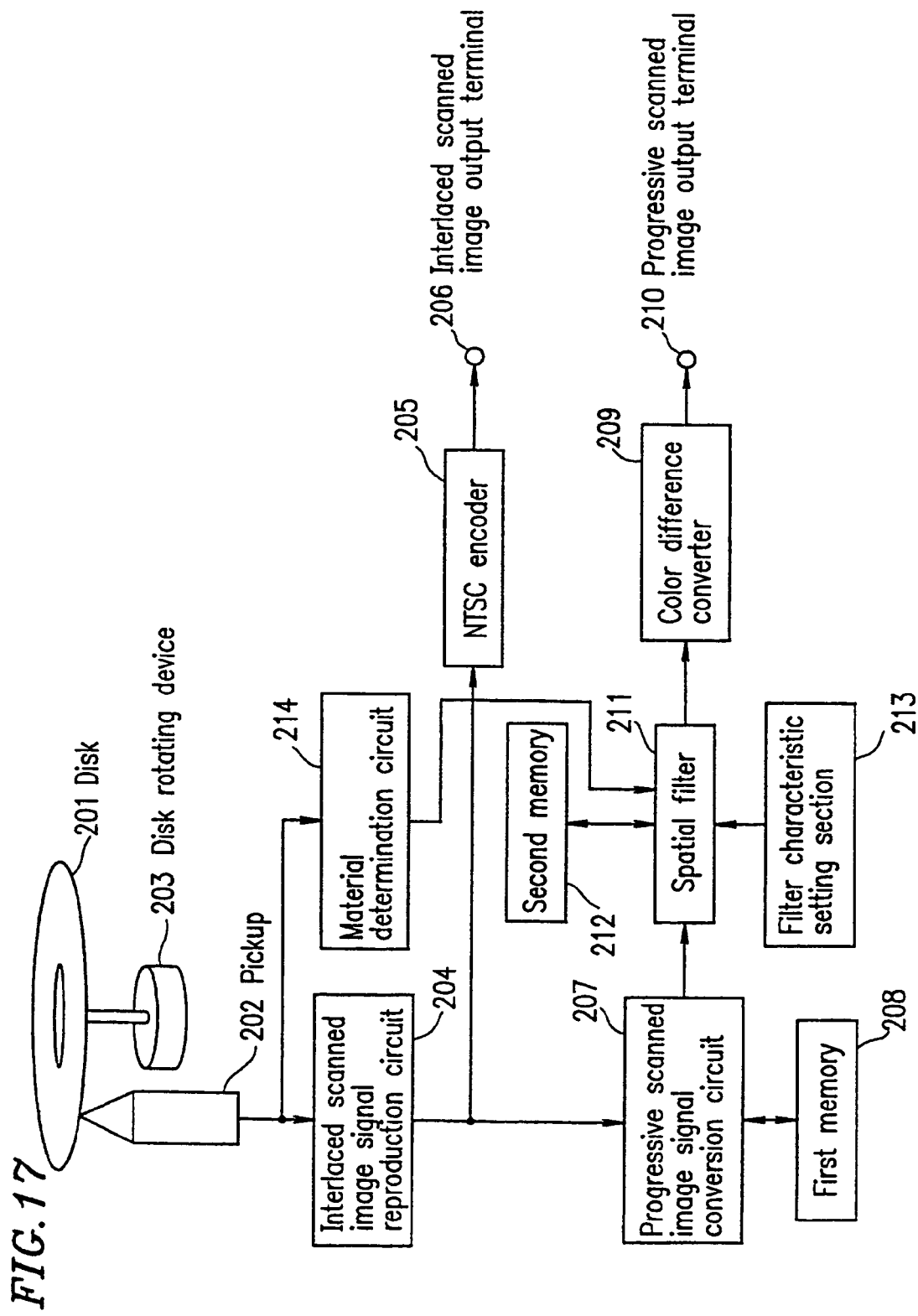
FIG. 17 is a block diagram showing a configuration of an exemplary image signal reproduction apparatus according to the present invention.

FIG. 17 is a block diagram showing a configuration of an image signal reproducing apparatus according to Example 3 of the present invention. In FIG. 17, reference numeral 201 denotes a disk on which either an image signal obtained by converting a film material image into an electrical signal or an image signal of which material is a video signal is recorded in an encoded and modulated signal form suitable for recording in advance. Reference numeral 202 denotes a pickup which converts the signal recorded on the disk 201 into an electrical signal. Reference numeral 203 denotes a disk rotating device which rotates the disk 201 at a certain revolutions-per-minute suitable for the disk 201. Reference numeral 204 denotes an interlaced scanned video signal reproduction circuit which demodulates and decodes the image signal recorded on the disk 201, and outputs the resultant signal as an interlaced scanned image signal. Reference numeral 205 denotes an encoder (e.g., NTSC encoder) which converts the interlaced scanned image signal into an NTSC video format for an interlaced scanned image monitor (not shown) and outputs the result. Reference numeral 206 denotes an interlaced scanned image output terminal through which the reproduced interlaced scanned image is output.

Reference numeral 207 denotes a progressive scanned image signal conversion circuit which converts an output of the interlaced scanned image signal reproduction circuit 204 into a progressive scanned image signal and outputs the result. Reference numeral 208 denotes a first memory which is capable of storing a field of image signal and which is used in the operation of the progressive scanned image signal conversion circuit 207. Reference numeral 209 denotes a color difference converter which converts an output of the progressive scanned image signal conversion circuit 207 into a progressive scanned color difference signal and outputs the result. Reference numeral 210 denotes a progressive scanning image output terminal through which the progressive scanned image signal is output to an image display apparatus not shown.

Reference numeral 211 denotes a spatial filter 11 which changes an output of the progressive scanned image signal conversion circuit 207 in accordance with outputs of the a filter characteristic setting section 213 and a material determination circuit 214. Reference numeral 212 is a second memory which is used for changing the vertical frequency characteristics of the spatial filter 211. Reference numeral 213 denotes the filter characteristic setting section which the user employs to set a characteristic of the spatial filter 211. Reference numeral 214 denotes the material determination circuit which determines whether an image signal recorded on the disk 201 is of film material or video material and controls the spatial filter 211.

Figure 18:
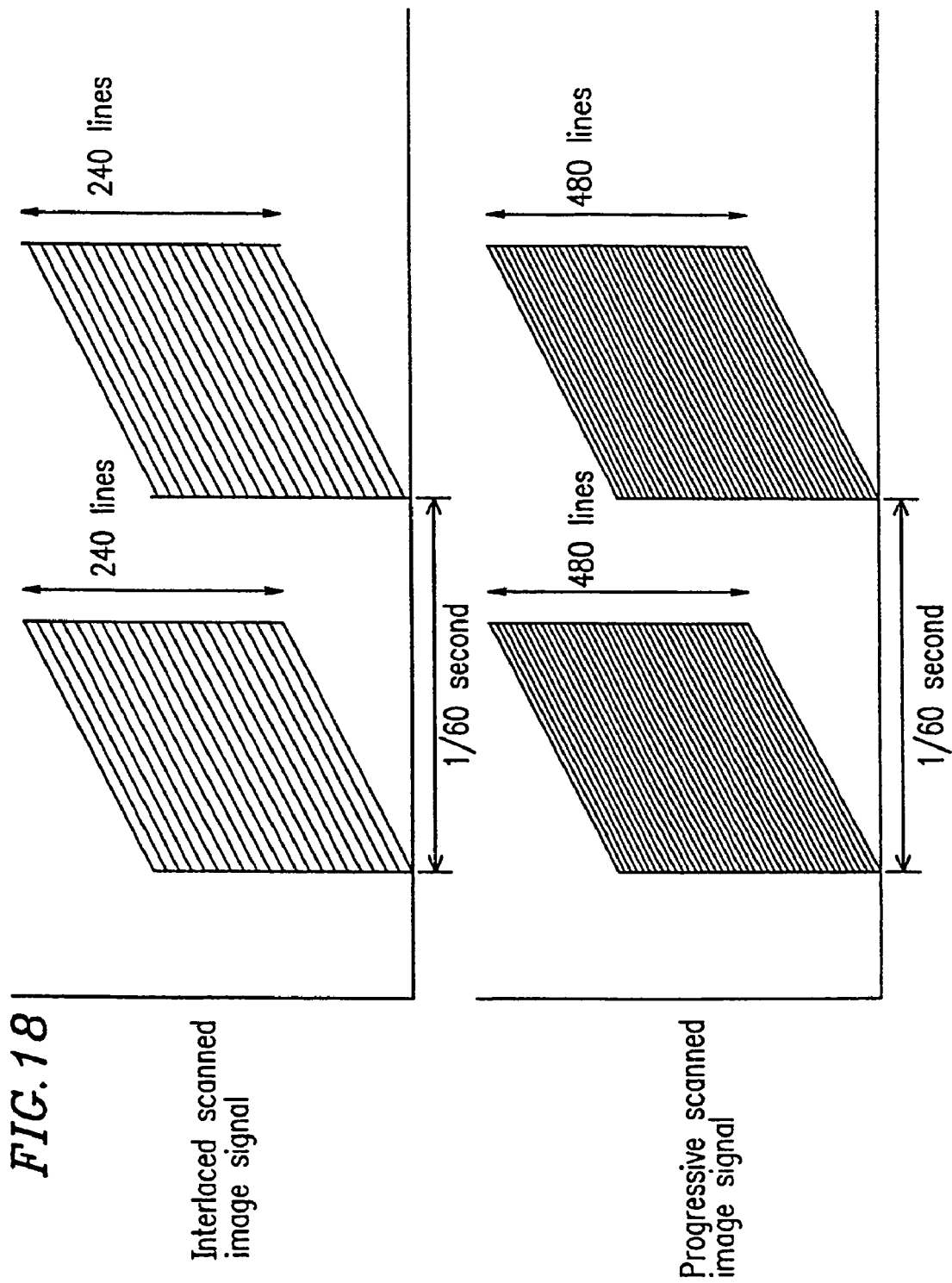
FIG. 18 is a schematic diagram showing structures of an interlaced scanned image signal and a progressive scanned image signal of an exemplary image signal reproduction apparatus according to the present invention.

The operation of the image signal reproduction apparatus thus constructed will be described. FIG. 18 is a schematic diagram showing structures of the interlaced scanned image signal and the progressive scanned image signal in the image signal reproduction apparatus according to Example 3 of the present invention. In the interlaced scanned image signal, one field of image is created in 1/60 second. One frame of image is composed of two fields. The number of vertical pixels of each of the two fields is 240. The pixels of one field are buried between the other fields in the vertical direction, vice versa. In the progressive scanned signal, one frame is created in 1/60 second and the number of pixels in the vertical direction is 480. Both have a vertical frequency of 1/60 second. The number of horizontal scanning lines of the progressive scanned image signal is twice as many as that of the interlaced scanned image signal. The horizontal scanning frequency of the interlaced scanned image signal is about 15.75 KHz, while that of the progressive scanned image signal is about 31.5 KHz.

Figure 19:
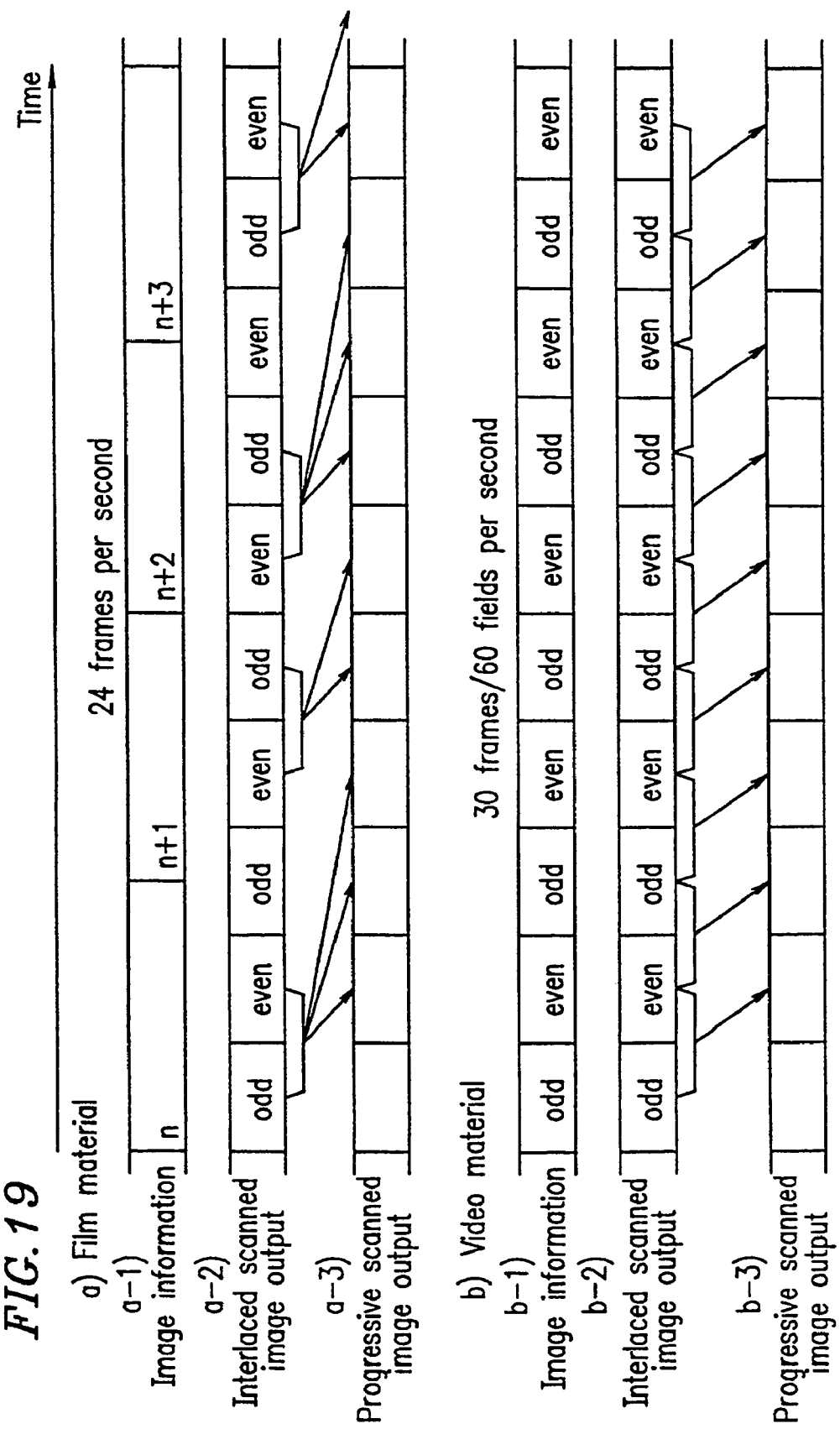
FIG. 19 is a schematic diagram showing a structure of an image signal of an exemplary image signal reproduction apparatus according to the present invention.

FIG. 19 is a schematic signal diagram showing a structure of an image signal recorded in the disk 201 of the image signal reproduction apparatus according to Example 3 of the present invention. As shown in FIG. 19, the image signal recorded in the disk 201 has two forms. Specifically, FIG. 19*a*) shows a film material. In this case, the original material is a film image composed of 24 frames of pictures per second. Each frame of the film image is compressed and recorded onto the disk 201 as an image of 720×480 dots. FIG. 19*b*) shows a video material image. In this case, the original material is an interlaced scanned image composed of 30 frames/60 fields per second. Each frame is an image of 720×480 dots, but interlaced, so that each field is an image of 720×240 dots. The field is compressed and recorded onto the disk 201.

When the material of the image signal recorded in the disk 201 is a film, 24 frames of images of 720×480 dots per second are recorded as recorded information. The interlaced scanned image signal reproduction circuit 204 reads the signal recorded on the disk 201 from an output of the pickup 202. As shown in FIG. 19*a*-1), the film material images are recorded in the disk 201 in order of the frame numbers . . . , n, n+1, n+2, n+3, . . . .

The film material signal thus recorded is modulated and converted into an interlaced scanned image and output by the interlaced scanned signal reproduction circuit 204. This is because television monitors are most commonly used as an image display apparatus for home entertainment, and the display format is the interlaced scanning. Since the television monitor is designed to display a moving image of 30 frames/60 fields per second, the interlaced scanning video signal reproduction circuit 204 converts 24 frames of images per second into 30 frames/60 fields per second and outputs the result.

Specifically, the interlaced scanning video signal reproduction circuit 204 divides each frame of recorded information into two interlaced scanned field images, odd and even, as shown in the interlaced scanned reproduced image output in FIG. 19*a*-2). The interlaced scanning video signal reproduction circuit 204 further displays the head field after the last field of each frame so that 24 frames of film images per second are converted into the interlaced scanned images of 30 frames/60 fields per second which are output. The NTSC encoder 205 produces an NTSC standard video signal from the interlaced scanned image signal thus reproduced, and outputs it through the interlaced scanned image output terminal 206. A television monitor (not shown) is connected to the interlaced scanned image output terminal 206 so that the user can see the film material image converted into the interlaced scanned image on the monitor.

Further, the interlaced scanned image signal reproduced circuit 204 inputs the interlaced scanned image signal to the progressive scanned image signal conversion circuit 207. The progressive scanned image signal conversion circuit 207 stores the head field of the progressive scanning conversion circuit input shown in FIG. 19*a*-2) in the first memory 208 and thereafter stores the second field in the first memory 208, and reads both information for each line at a double speed, thereby obtaining the progressive scanned image output shown in FIG. 19*a*-3). Specifically, a signal at the last field which displays the same signal as a signal at the head field for each frame in FIG. 19*a*-2 is not converted in FIG. 19*a*-3, but the head field and a field following the head field are converted into three consecutive fields. The converted image signal is converted into an analog signal by the color difference converter 209, and the resultant analog signal is output via the spatial filter 211 through the progressive scanned image signal output terminal 210. A television monitor (not shown) for the progressive scanned image signal is connected to the progressive scanned image signal output terminal 210. The user can see the film material images restored to the progressive scanned image via the television monitor.

In the case when the material of image signals recorded in the disk 201 is video, an interlaced scanned image of 30 frames/60 fields per second is recorded as recorded information, each field having a 720×240 dots image. The interlaced scanned image signal reproduction circuit 204 reads the signal recorded in the disk 201 from an output of the pickup 202, and modulates the signal and outputs the modulated signal as the interlaced scanned image signal shown in FIG. 19*b*-2) without alteration.

The NTSC encoder 205 produces an NTSC standard video signal from the interlaced scanned image signal thus reproduced and outputs it through the interlaced scanned image output terminal 206. A television monitor (not shown) is connected to the interlaced scanned image output terminal 206 so that the user can see the film material image converted into the interlaced scanned image via the monitor.

Further, the interlaced scanned image signal reproduced circuit 204 inputs the interlaced scanned image signal to the progressive scanned image signal conversion circuit 207. In the case of the video material, the progressive scanned image signal conversion circuit 207 generates a progressive scanned image signal using two pieces of field information, i.e., current field image information and the previous field. In this case, the progressive scanning conversion circuit 207 also uses data for the previous field to interpolate in the vertical direction with respect to pixels having small movements between the current and previous fields of the progressive scanned conversion circuit output shown in FIG. 19*b*-2). With respect to pixels having large movements between the current and previous fields, vertical interpolated data is generated from upper and lower pixel data in the same field to obtain a progressive scanned image output shown in FIG. 19*b*-3).

The converted image signal is converted into an analog progressive scanned color difference signal by the color difference converter 209. The analog progressive scanned color difference signal is output via the spatial filter 211 through the progressive scanned image signal output terminal 210. A television monitor (not shown) for the progressive scanned image signal is connected to the progressive scanned image signal output terminal 210 so that the user can see the video material image converted into the progressive scanned image via the monitor.

Figure 20:
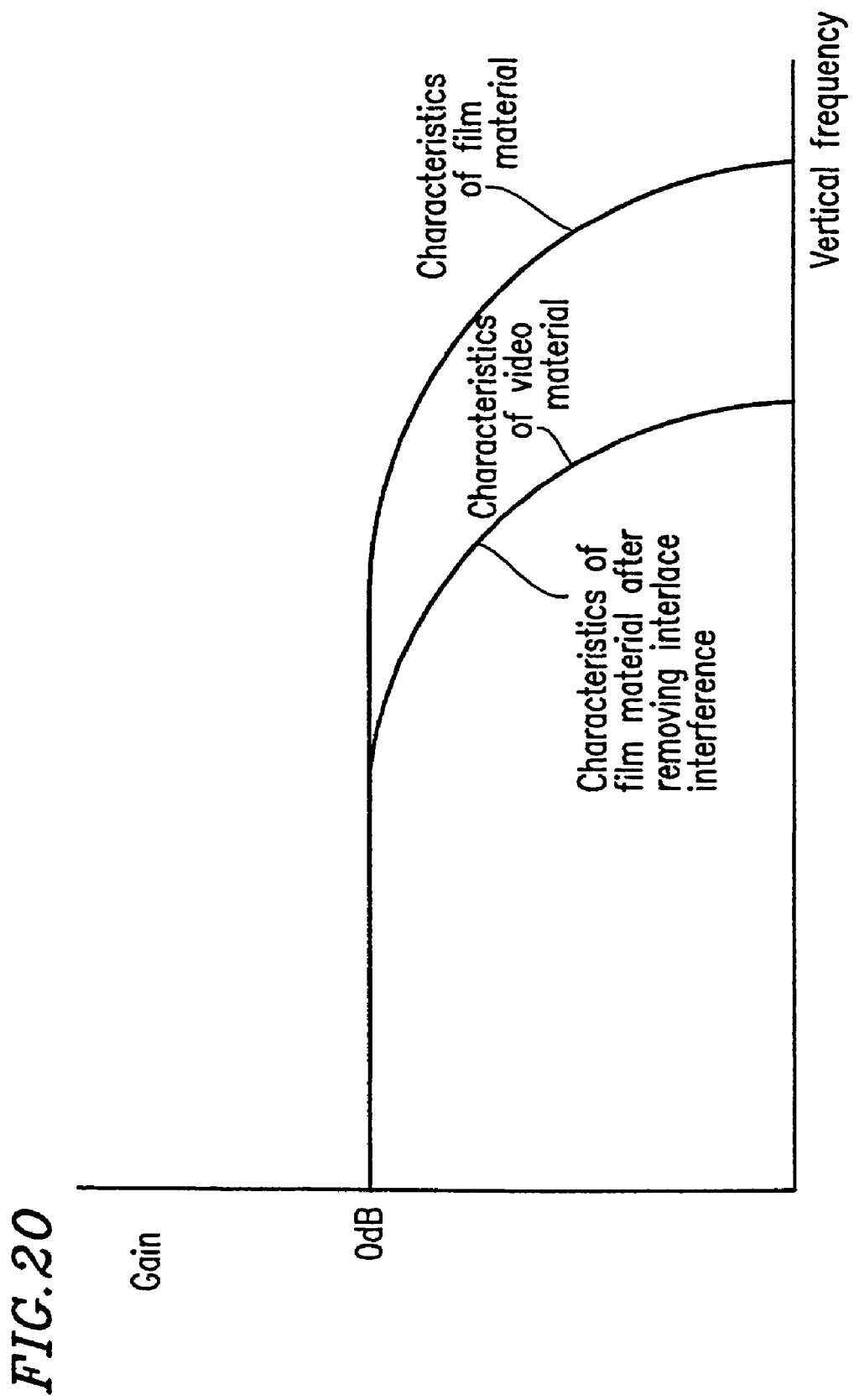
FIG. 20 is a schematic diagram showing the vertical frequency characteristics of material of an exemplary image signal reproduction apparatus according to the present invention.

FIG. 20 is a schematic diagram showing the vertical frequency characteristics of materials for the image signal reproduction apparatus according to an example of the present invention. In the case of the video material to be interlaced scanned, each field has 240 lines, two fields having 480 lines. In the case of the film material, optical information recorded on the original film is converted into electrical information of 480 lines of progressive scanned signals. Therefore, the vertical frequency characteristics are of a high band region indicated by the characteristics of the film material shown in FIG. 20. The film material image is supposed to be reproduced by the interlaced scanned receiver. Bandwidth is limited in advance in order to avoid feedback interference. As indicated by the characteristics of the film material after removing interlace interference, the vertical frequency characteristics are reduced to the same level as that of the characteristics of the video material, at which level the film material image is recorded.

Figure 21:
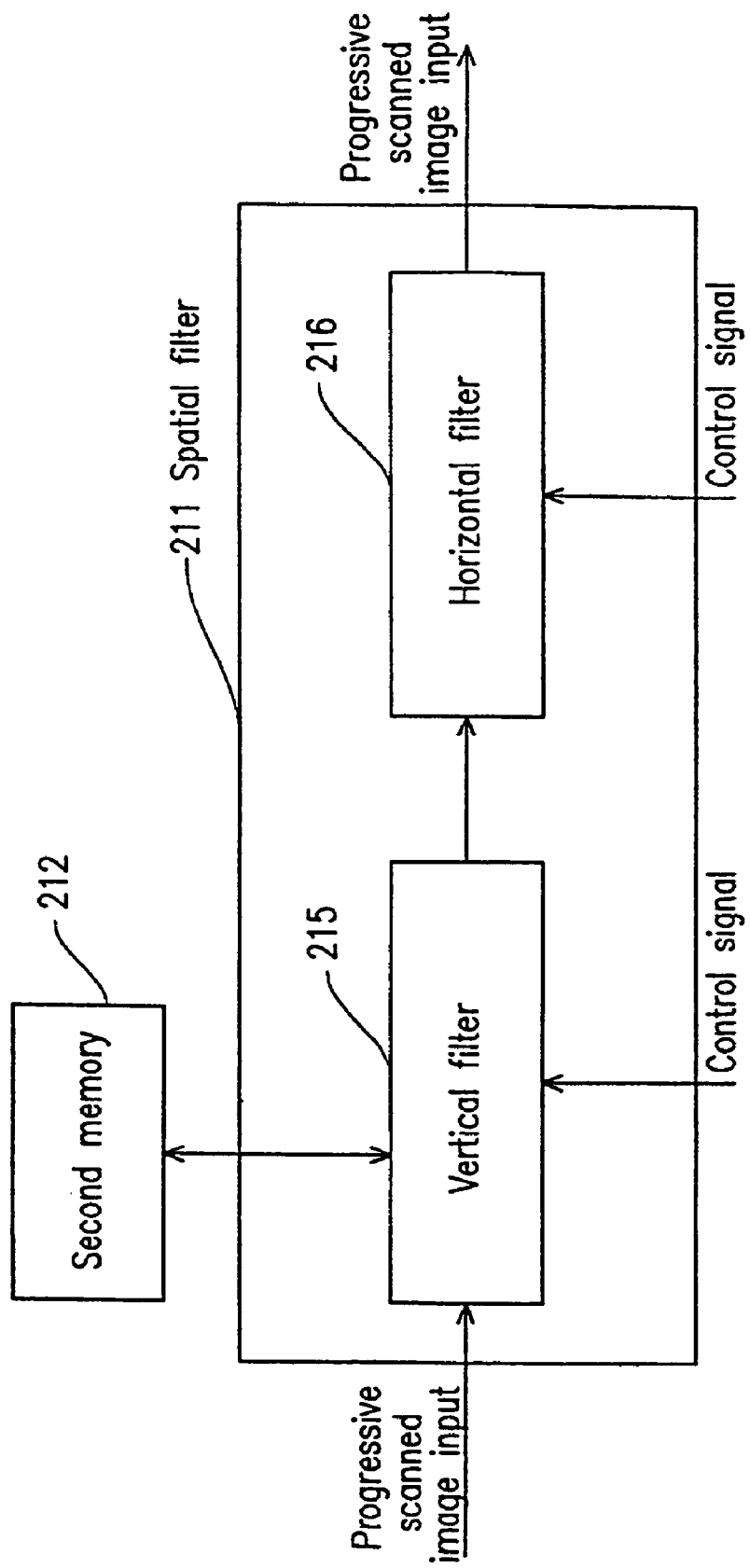
FIG. 21 is a block diagram showing a structure of a spatial filter 11 of an exemplary image signal reproduction apparatus according to the present invention.

FIG. 21 is a block diagram showing a configuration of the spatial filter 211 of the image signal reproduction apparatus of Example 3 of the present invention. In FIG. 21, reference numeral 215 denotes a vertical filter which changes the vertical frequency characteristics of the progressive scanned image signal. Reference numeral 216 denotes a horizontal filter which changes the horizontal frequency characteristics of the progressive scanned image signal. In FIG. 17, an output of the progressive scanned image signal conversion circuit 207 is output via the spatial filter 211 to the color difference converter 209. In the spatial filter 211, the vertical and horizontal frequency characteristics are changed and output using a circuit shown in FIG. 21.

Figure 22:
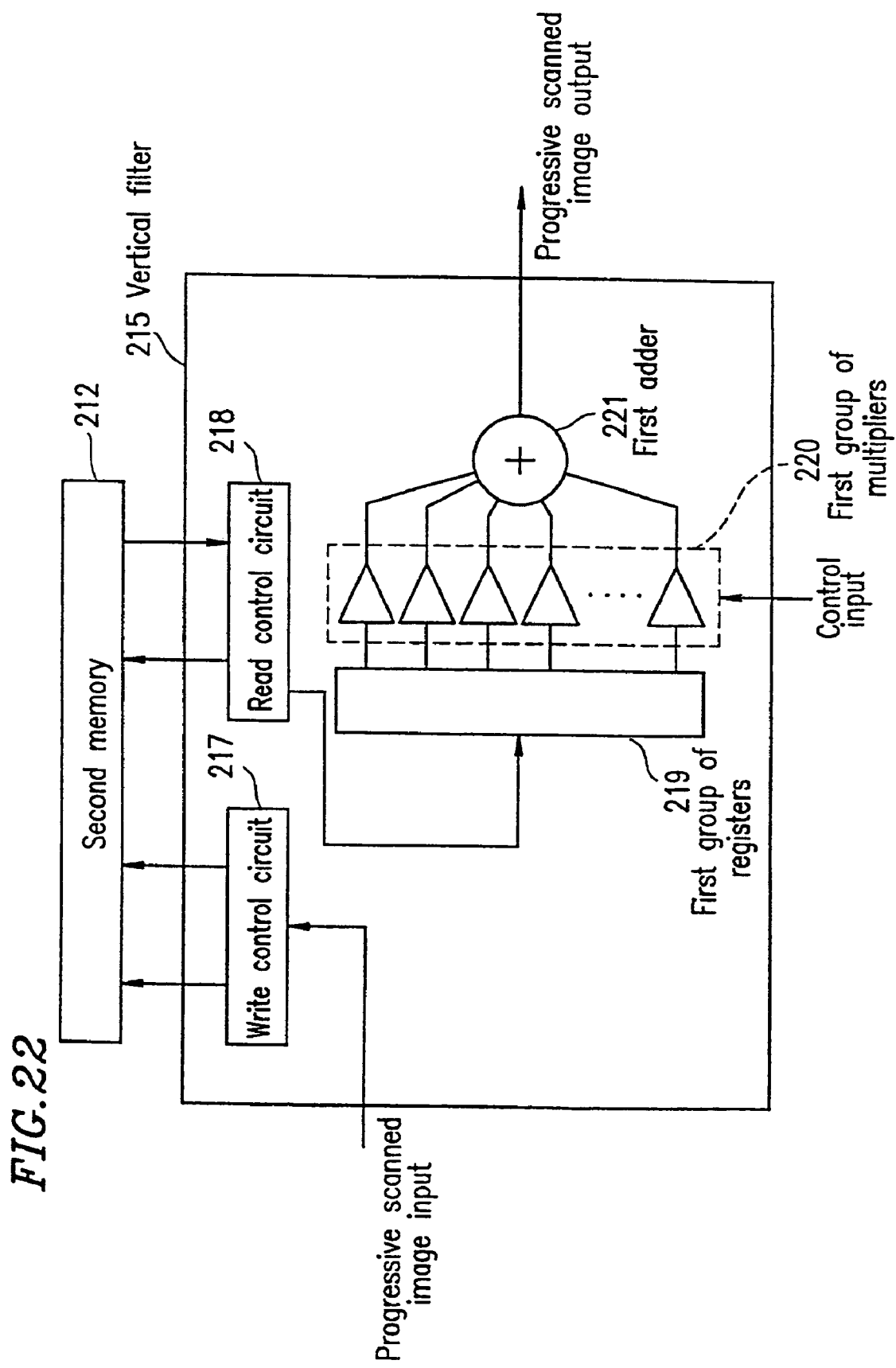
FIG. 22 is a block diagram showing a structure of a vertical filter 15 of an exemplary image signal reproduction apparatus according to the present invention.

FIG. 22 is a block diagram showing a configuration of the vertical filter 215 of the image signal reproduction apparatus of Example 3 of the present invention. In FIG. 22, reference numeral 217 denotes a write control circuit which writes an input progressive scanned image signal to the second memory 212. Reference numeral 218 denotes a read control circuit which reads data from the second memory 212. Reference numeral 219 denotes a first group of registers which hold data read from the second memory 212 by the read control circuit 218. Reference numeral 220 denotes a first group of multipliers which multiply data in the first group of resisters 219 by a preset coefficient, and output the results. Reference numeral 221 denotes a first adder which adds outputs of the first group of multipliers 220 and outputs the result. In FIG. 22, the first group of resister 219, the first group of multipliers 220, and the first adder 221 constitute the filter. If data to be stored in the first group of resisters 219 are arranged in a line in the vertical direction of the progressive scanned image signal, it is possible to obtain the vertical filter which can change the frequency characteristics in the vertical direction. Further, the ON and OFF of the function of the vertical filter can be externally controlled by changing the coefficients of the first group of multipliers 220.

Figure 23:
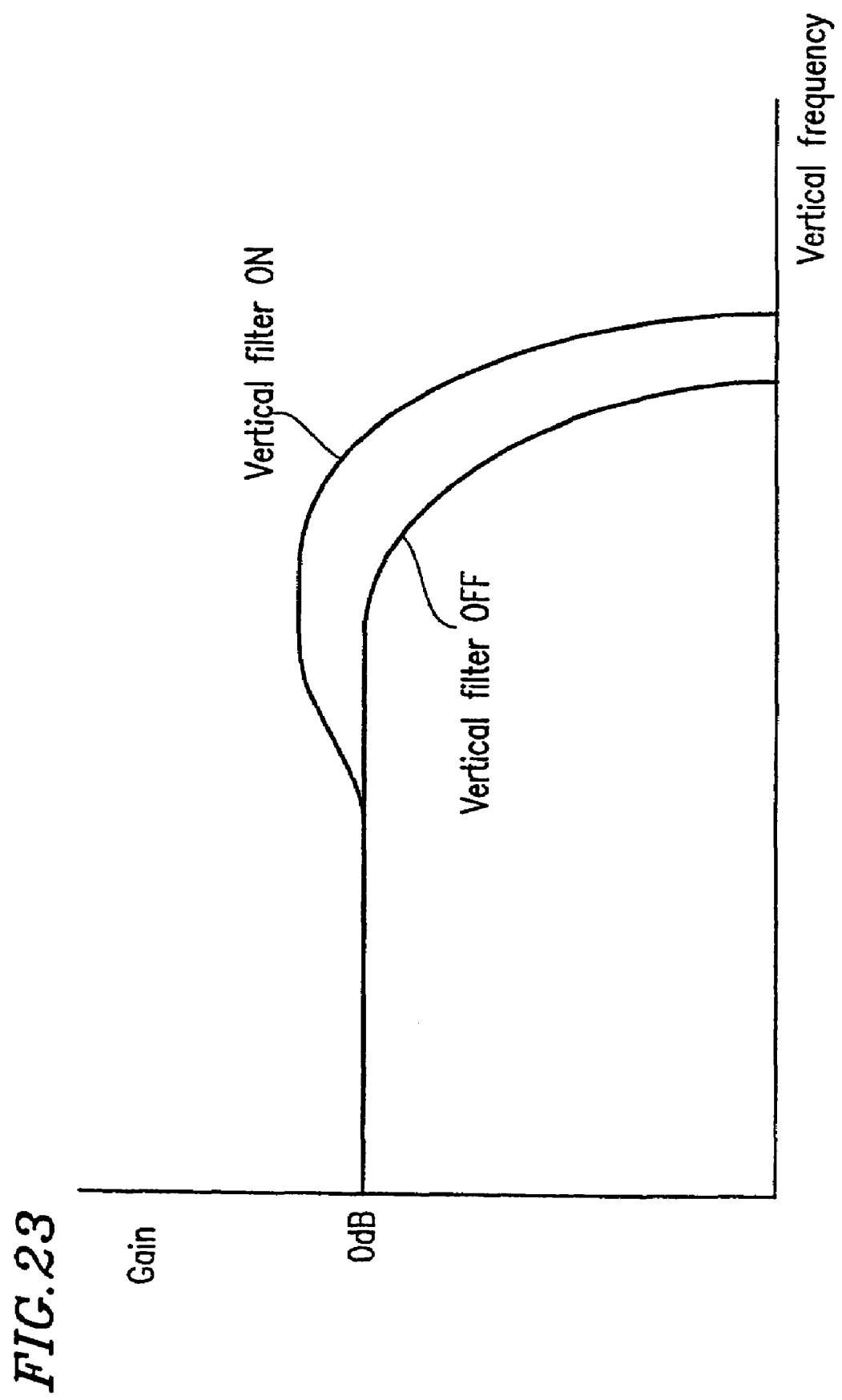
FIG. 23 is a schematic diagram showing a characteristic of the vertical filter 15 of an exemplary image signal reproduction apparatus according to the present invention.

FIG. 23 is a schematic figure showing the characteristics of the vertical filter 215 of the image signal reproduction apparatus of Example 3 of the present invention. As shown in FIG. 23, when the vertical filter in the OFF state, the vertical frequency characteristics are flat. When the vertical filter is in the ON state, the vertical frequency characteristics are such that the high region is raised.

Figure 24:
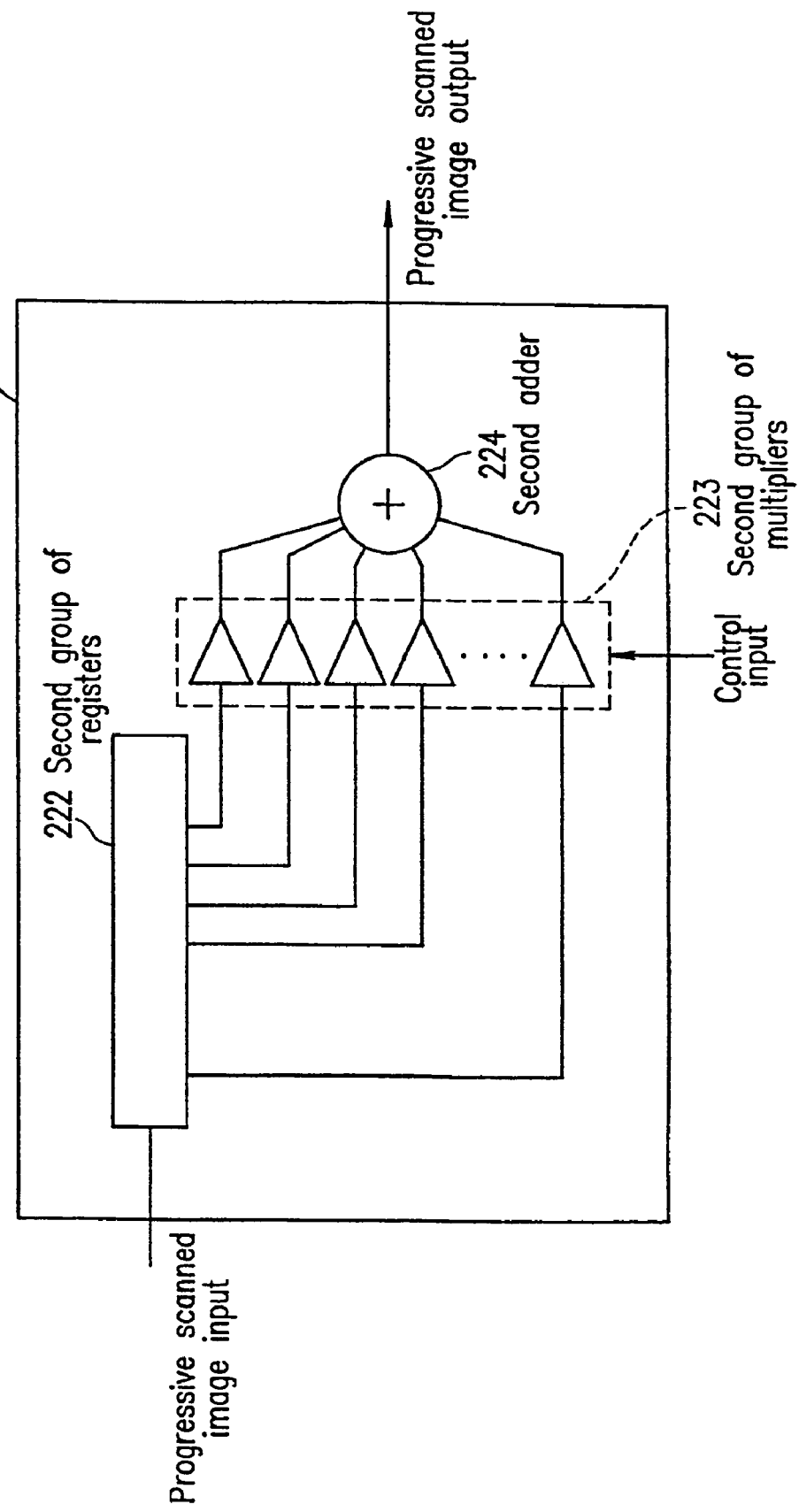
FIG. 24 is a block diagram showing a structure of a horizontal filter 16 of an exemplary image signal reproduction apparatus according to the present invention.

FIG. 24 is a block diagram showing a configuration of the horizontal filter 216 of the image signal reproduction apparatus of Example 3 of the present invention. In FIG. 24, Reference numeral 222 denotes a second group of registers which hold input data. Reference numeral 223 denotes a second group of multipliers which multiply data in the second group of resisters 222 by a preset coefficient, and output the results. Reference numeral 224 denotes a second adder which adds the outputs of the second group of multipliers 223 and outputs the result. In FIG. 24, the second group of resister 222, the second group of multipliers 223, and the second adder 224 constitute the filter. It is thus possible to obtain the horizontal filter which can change the frequency characteristics in the horizontal direction. Further, the ON and OFF of the function of the vertical filter can be externally controlled by changing the coefficients of the second group of multipliers 223 by input control.

Figure 25:
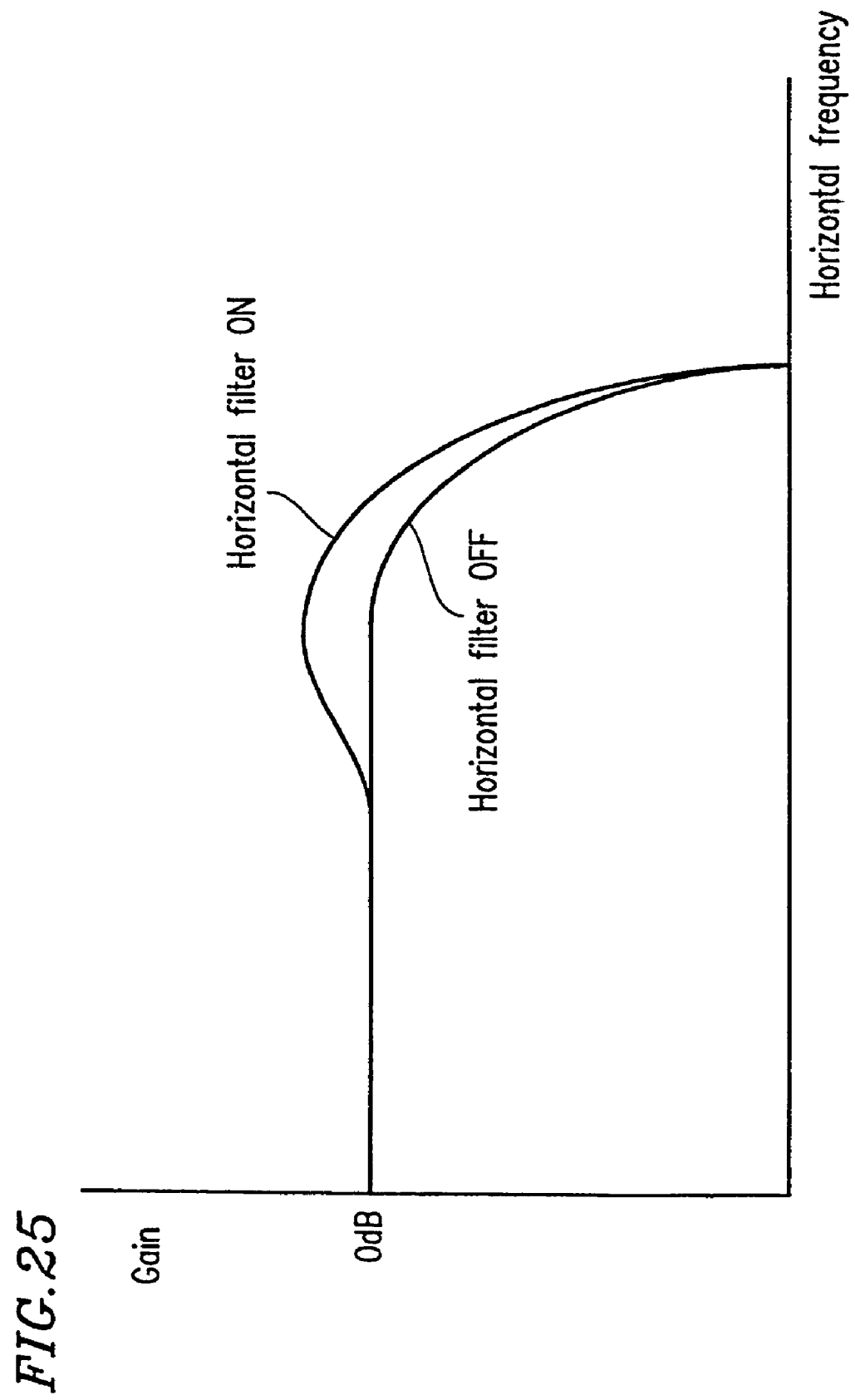
FIG. 25 is a schematic diagram showing a characteristic of the horizontal filter 16 of an exemplary image signal reproduction apparatus according to the present invention.

FIG. 25 is a schematic diagram showing the characteristics of the vertical filter 216 of the image signal reproduction apparatus of Example 3 of the present invention. As shown in FIG. 25, when the horizontal filter 216 in the OFF state, the horizontal frequency characteristics are flat. When the horizontal filter 216 is in the ON state, the horizontal frequency characteristics are such that the high region is raised.

In FIG. 17, the material determination circuit 214 determines whether the image component of an information signal recorded on the disk 201 is of film material or of video material, and outputs the result to the spatial filter 211. The spatial filter 211 switches the vertical filter ON when the material determination circuit 214 determines that the material recorded on the disk 201 is of film. The spatial filter 211 switches the vertical filter OFF when the material determination circuit 214 determines that the material recorded on the disk 201 is of video. Thus, the material determination circuit 214 output a progressive scanned image signal having an optimal characteristic each for film material and video material.

Further, in FIG. 17, using the filter characteristic setting section 213, the user can arbitrarily provide the settings of the spatial filter 211, i.e., switch the ON and OFF of the vertical filter 215 and the horizontal filter 216.

Figure 26:
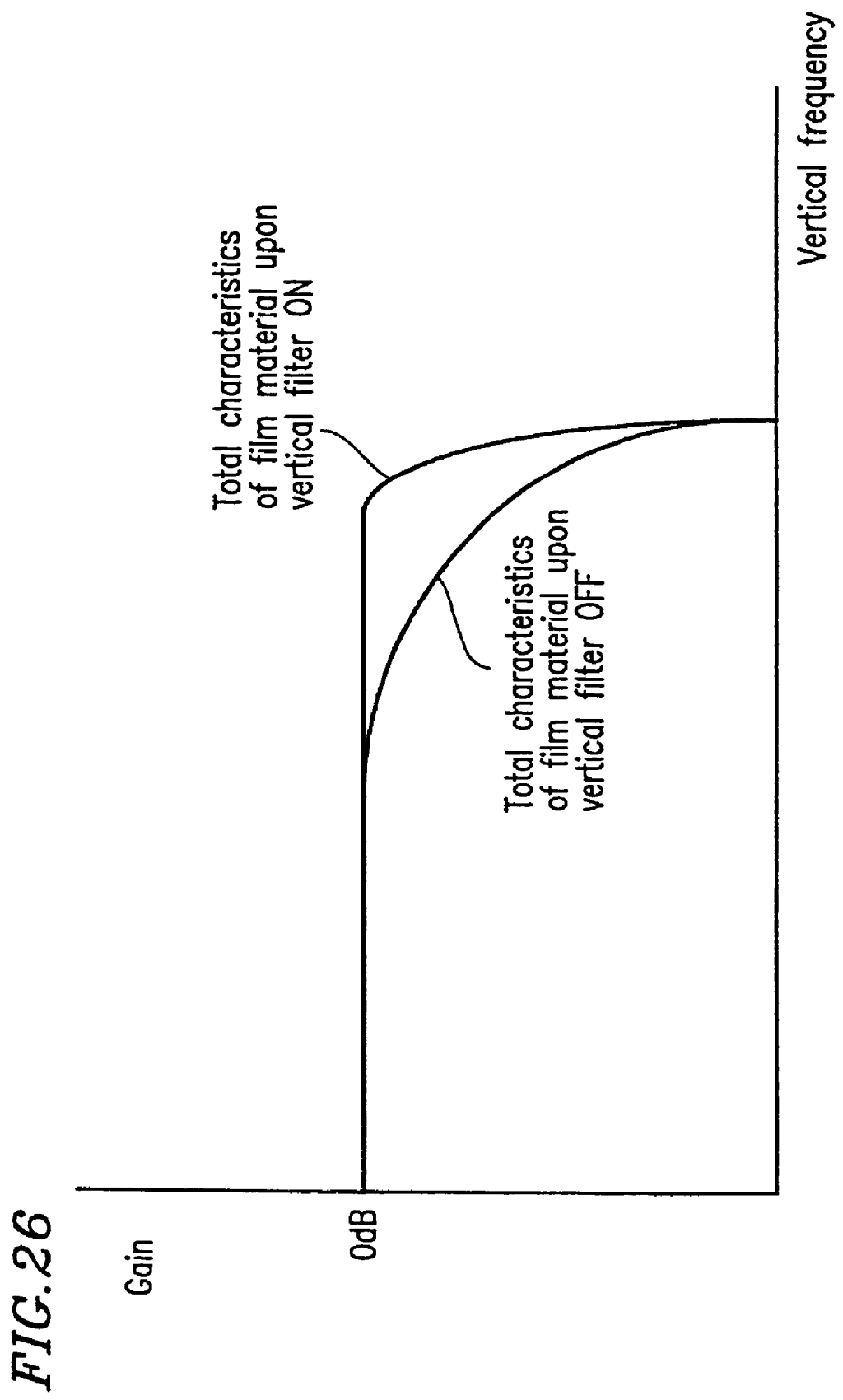
FIG. 26 is a schematic diagram showing an effect of the vertical filter 15 of an exemplary image signal reproduction apparatus according to the present invention.

FIG. 26 is a schematic diagram showing an effect of the vertical filter 215 of the image signal reproduction apparatus of Example 3 of the present invention. As shown in FIG. 26, the total characteristics of the film material when the vertical filter is in the OFF state is such that the high region is degraded due to the vertical filter 215. The total characteristics of the film material when the vertical filter is in the ON state is such that the vertical frequency characteristics are less degraded due to the vertical filter 215.

Figure 27:
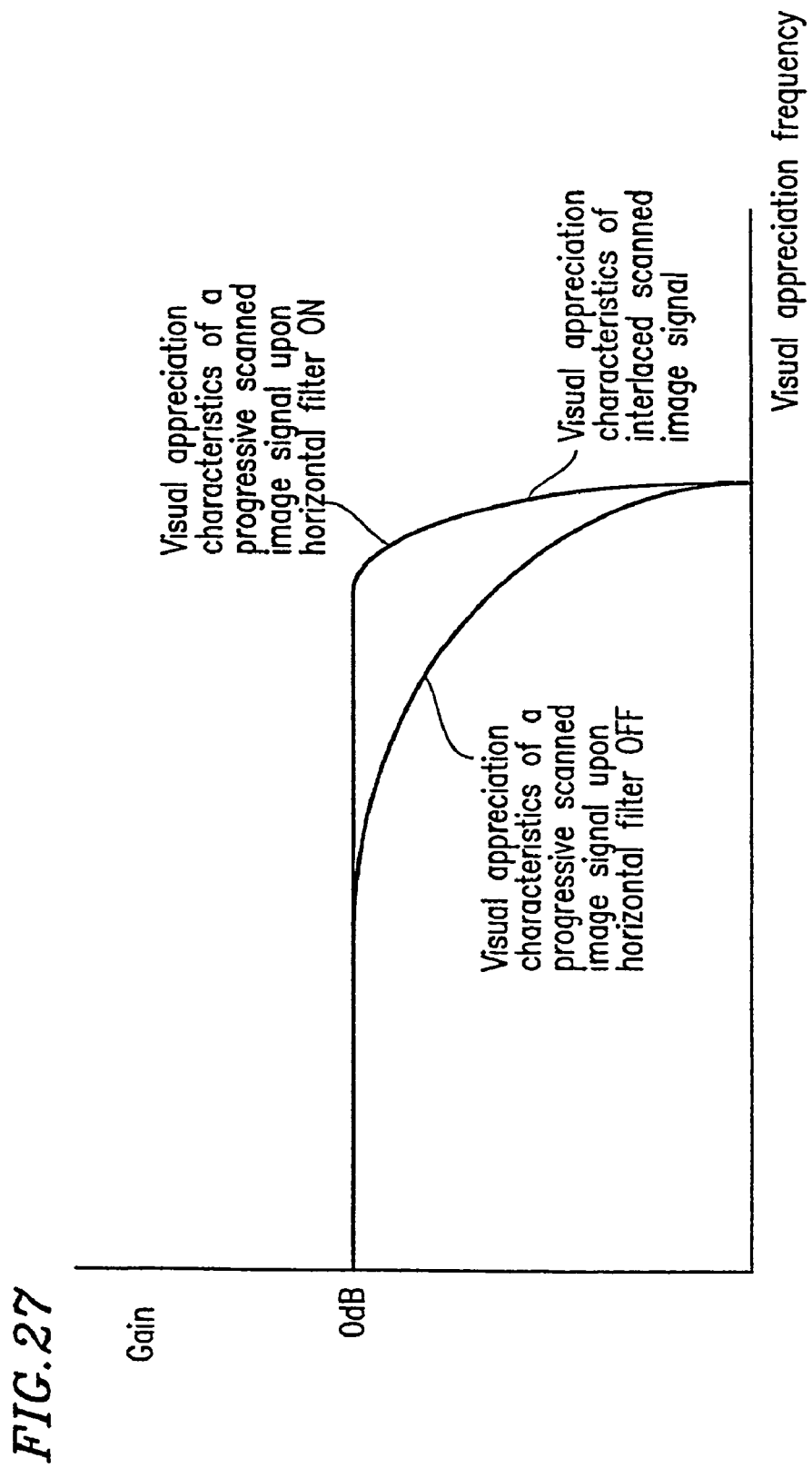
FIG. 27 is a schematic diagram showing visual appreciation-related characteristics of an interlaced scanned image and a progressive scanned image of an exemplary image signal reproduction apparatus according to the present invention.

FIG. 27 is a schematic diagram showing the frequency characteristics of visual appreciation of the interlaced scanned image and the progressive scanned image output of the image signal reproduction apparatus of Example 3 of the present invention. In general, a progressive scanning image monitor has twice as many the number of the horizontal scanning frequency as that of an interlaced scanning image monitor. Therefore, the electrical and optical frequency bands required to attain the same resolution needs to be doubled. The double number of scanning lines leads to a characteristic in which visual impression is low resolution. Therefore, comparing the interlaced scanned image signal with the image signal obtained by converting the interlaced scanned image signal into the progressive scanned image signal, the latter image signal gives the user the impression that the frequency characteristics are poorer. However, the spatial filter 211 corrects and removes the difference in visual appreciation between the interlaced scanned image signal and the progressive scanned image signal. Particularly, in the conventional image signal reproduction apparatus, the interlaced scanned image and the progressive scanned image are output at the same time. Although both images can be easily compared with each other, there is no difference in visual appreciation between both images, which does not result in any detriment to the image signal reproduction apparatus.

Note that in the above-described description, the case where the input of the progressive scanned image signal conversion section is the output of the interlaced scanned image signal reproduction section is described. Information signals can be applied to a configuration in which the interlaced scanned image signal reproduction section and the progressive scanned image signal reproduction section are provided in parallel. Note that, in this case, the progressive scanned image signal reproduction section needs to include a scanned image signal reproduction section which demodulates and combines the information signals to the progressive scanned image signal. The additional scanned image signal reproduction section leads to complications as compared with the above-described Examples.

Note that in the above-described description, the first and second memories are separated for the purpose of explaining the functions thereof. All the memories can be realized using semiconductor memories. All the memories can be easily realized using a single semiconductor memory by proper arrangement of a circuit.

The ON and OFF of the spatial filter is switched by both the filter characteristic setting section and the material determination circuit. The switching is not necessarily performed by both. Control either by the filter characteristic setting section or by the material determination circuit can lead to the effect of the present invention.

Further, although the spatial filter is simply controlled and switched between ON and OFF, i.e., in two ways, the filter characteristics of the spatial filter may be switched between multiple stages.

Further, in FIG. 17, each component denoted by reference numeral 4 or thereafter may be replaced with a microprocessor or the like and implemented by software.

Further, although the image signal reproduction apparatus is constructed as the disk apparatuses, another image signal reproduction apparatus, such as a tape apparatus or a broadcast receiver can be similarly implemented.

Example 4

Figure 28:
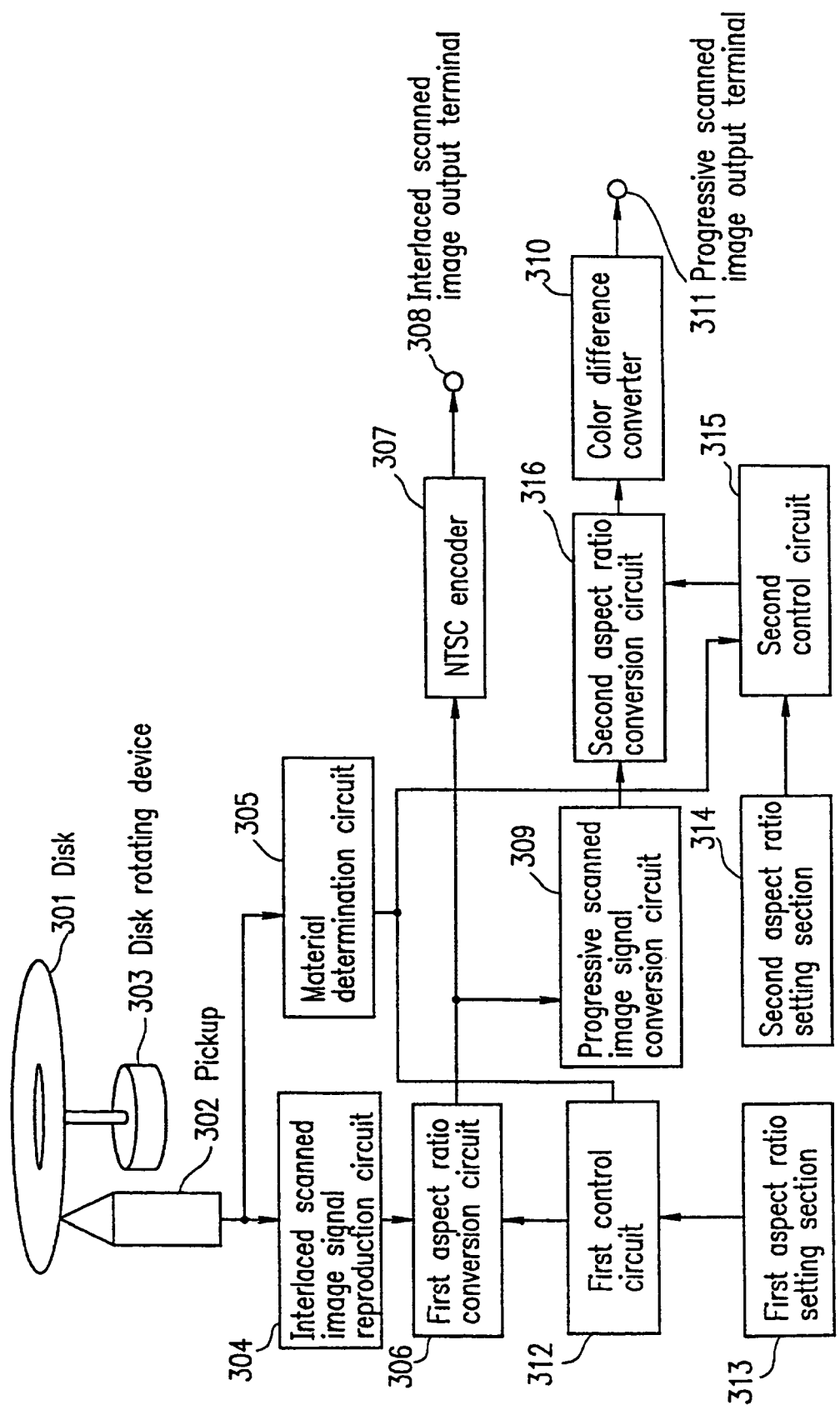
FIG. 28 is a block diagram showing a configuration of an exemplary image signal reproduction apparatus according to the present invention.

FIG. 28 is a block diagram showing a configuration of an image signal-reproducing apparatus according to an example of the present invention. In FIG. 28, reference numeral 301 denotes a disk on which an image signal and the determination flag indicating the aspect ratio of the image signal are recorded in an encoded and modulated signal form suitable for recording in advance. Reference numeral 302 denotes a pickup which converts the signal recorded on the disk 301 into an electrical signal. Reference numeral 303 denotes a disk rotating device which rotates the disk 301 at a certain revolutions-per-minute suitable for the disk 301.

Reference numeral 304 denotes an interlaced scanned video signal reproduction circuit which demodulates and decodes the image signal recorded on the disk 301, and outputs the resultant signal as an interlaced scanned image signal. Reference numeral 305 denotes a material determination circuit which reads the determination flag recorded on the disk 301 from an output of the pickup 302.

Reference numeral 306 denotes a first aspect ratio conversion circuit which is controlled by a first control circuit 312 and which converts the aspect ratio of the input image signal and outputs the result. Reference numeral 307 denotes an NTSC encoder which converts the interlaced scanned image signal into an NTSC video format and outputs the result. Reference numeral 308 denotes an interlaced scanned image output terminal through which the reproduced interlaced scanned image is output.

Reference numeral 309 denotes a progressive scanned image signal conversion circuit which converts an output of the first aspect ratio conversion circuit 306 into a progressive scanned image signal and outputs the result. Reference numeral 310 denotes a color difference converter which converts an output of the progressive scanned image signal conversion circuit 309 into an analog color difference signal and outputs the result.

Reference numeral 311 denotes a progressive scanning image output terminal through which the progressive scanned image signal resulting from conversion is output. Reference numeral 312 denotes a first control circuit which controls the first aspect ratio conversion circuit 306 using an output of the material determination circuit 305 and an output of a first aspect ratio setting section 313. Reference numeral 313 denotes the first aspect ratio setting section which is used by the user to set the aspect ratio of the receiver.

Reference numeral 314 denotes a second aspect ratio setting section by which the user sets the aspect ratio of the image receiver. Reference numeral 315 denotes a second control circuit which controls a second aspect ratio conversion circuit 316 based on an output of the material determination circuit 305 and an output of the second aspect ratio setting section 314. Reference numeral 316 denotes a second aspect ratio conversion circuit which is controlled by the second control circuit 315 and converts the aspect ratio of an input image signal and outputs the result.

The operation of the image signal reproduction apparatus thus constructed according to Example 4 of the present invention will be further described.

Figure 29:
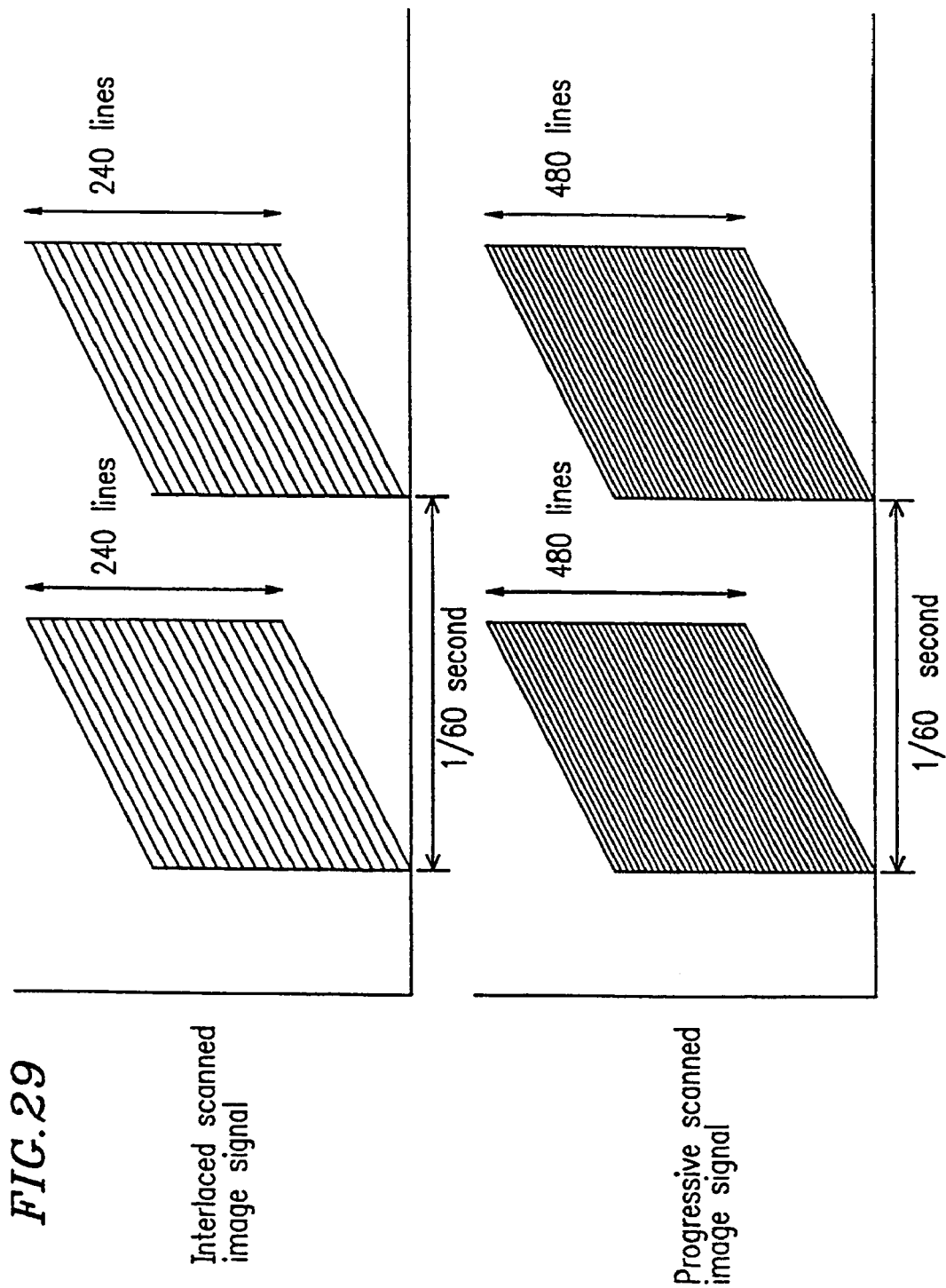
FIG. 29 is a schematic diagram showing a structure of an image signal recorded in a disk of an exemplary image signal reproduction apparatus according to the present invention.

FIG. 29 is a schematic diagram showing structures of the interlaced scanned image signal and the progressive scanned image signal in the image signal reproduction apparatus of Example 4 of the present invention. In the interlaced scanned image signal, one field of image is created in ⅟60 second. One frame of image is composed of two fields. The number of vertical pixels of each of the two fields is 240. The pixels of one field are buried between the other fields in the vertical direction, and vice versa. In the progressive scanned signal, one frame is created in ⅟60 second and the number of pixels in the vertical direction is 480.

Both have a vertical frequency of ⅟60 second. The number of horizontal scanning lines of the progressive scanned image signal is twice as many as that of the interlaced scanned image signal. The horizontal scanning frequency of the interlaced scanned image signal is about 15.75 KHz, while that of the progressive scanned image signal is about 31.5 KHz.

Figure 30:
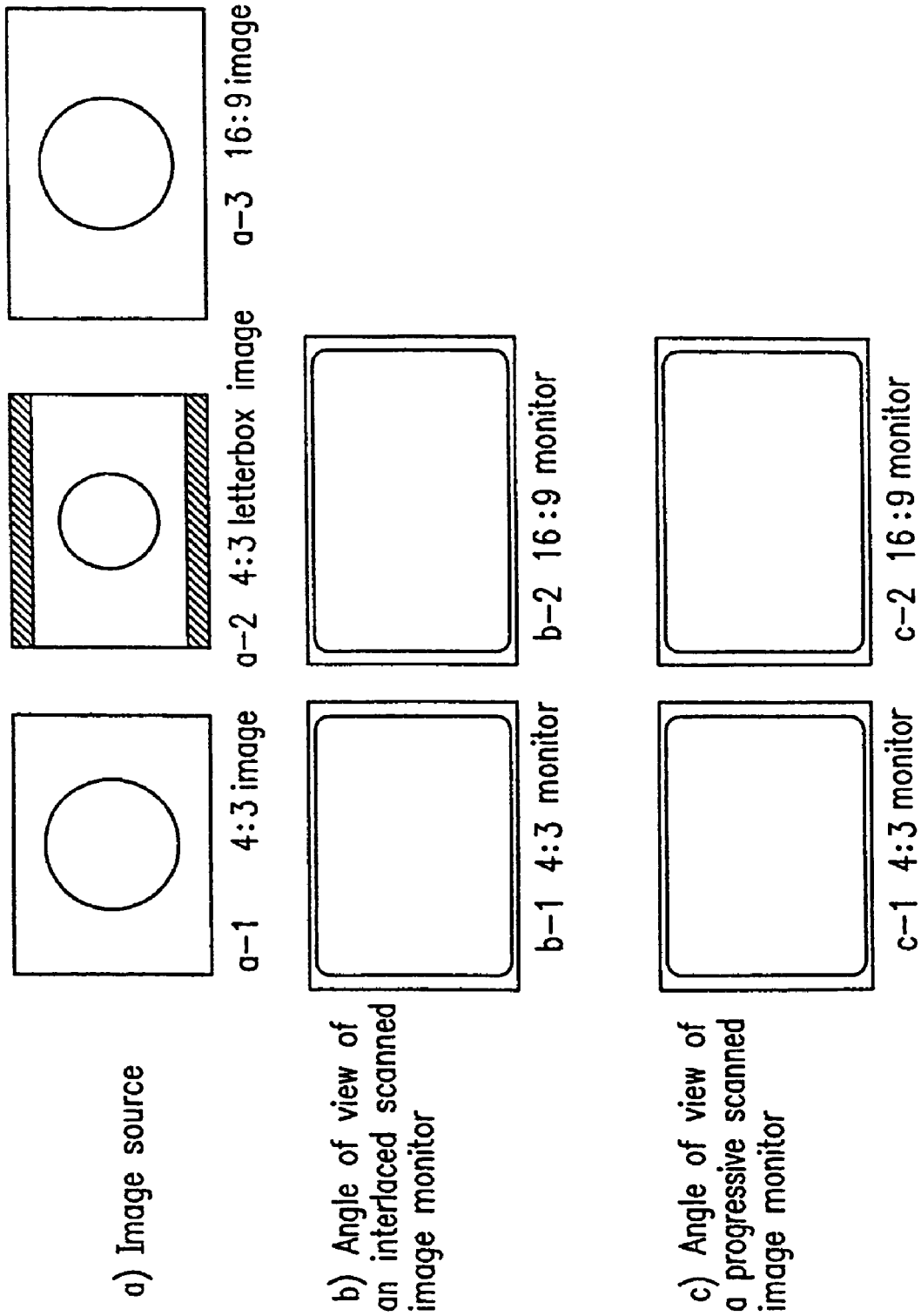
FIG. 30 is a schematic diagram showing the aspect ratio of an image signal of an exemplary image signal reproduction apparatus according to the present invention.

FIG. 30 is a schematic signal diagram showing the aspect ratio of an image signal of the image signal reproduction apparatus of Example 4 of the present invention. As shown in FIG. 30a), the image signal of image source recorded in the disk 301 has three forms. Specifically, FIG. 30a)a-1) shows a 4:3 full image having information which fills a full screen of 4:3. FIG. 30a)a-2) shows a 4:3 letterbox image having an image of 16:9 in the middle of the 4:3 screen, the upper and lower portions being shaded. FIG. 30a)a-3) shows a 16:9 image having information which fills a full screen of 16:9.

FIG. 30b) shows the aspect ratio of the monitors for the interlaced scanned image signal. As shown in FIG. 30b), there are two types of monitor for the interlaced scanned image signal, one type shown in FIG. 30b)b-1) having an aspect ratio of 4:3 and the other shown in FIG. 30b)b-2) having an aspect ratio of 16:9.

Figure 53:
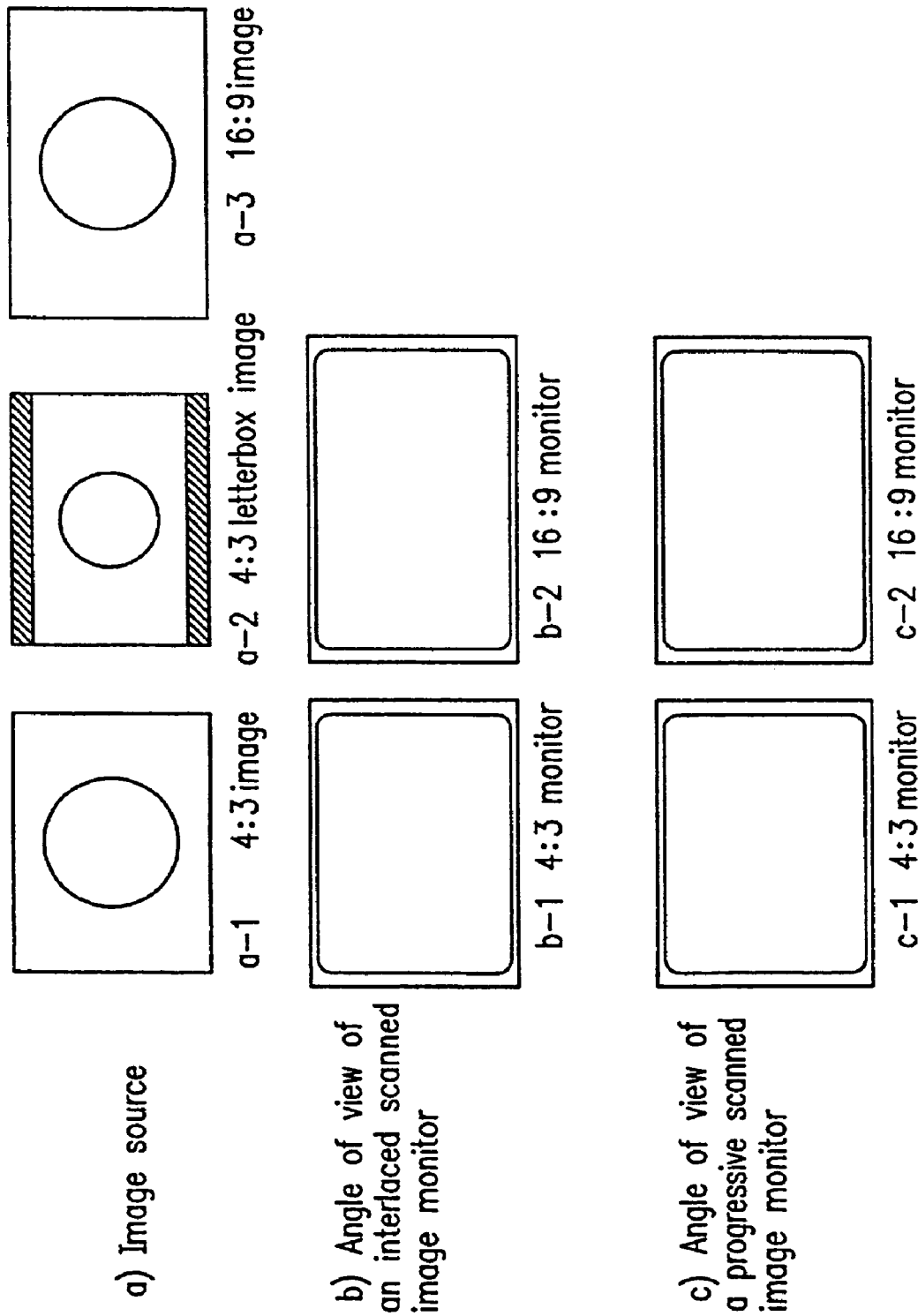
FIG. 53 is a schematic diagram showing the aspect ratio of an image signal of the conventional image signal reproduction apparatus.
Figure 54:
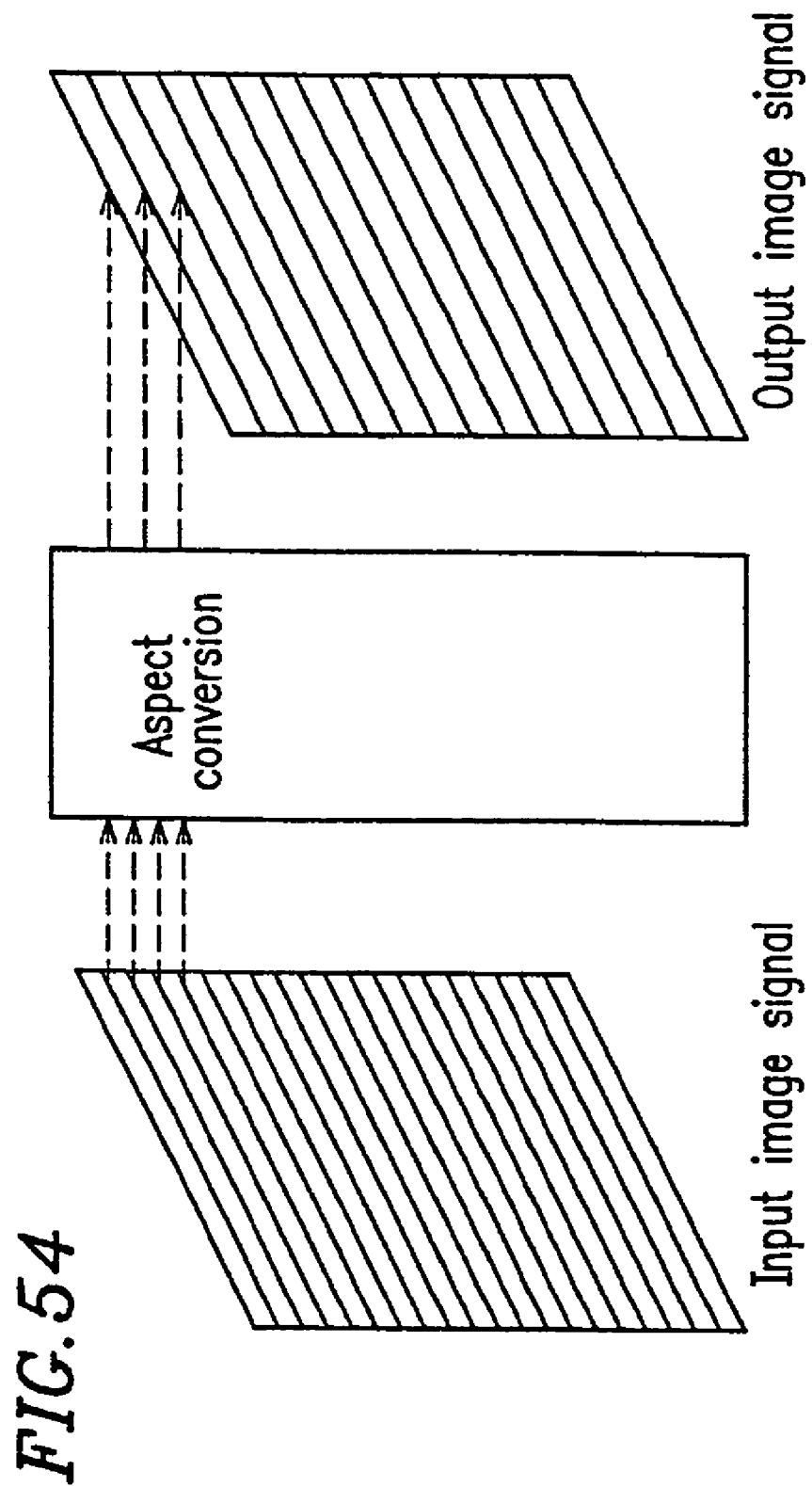
FIG. 54 is a schematic diagram showing the operation of a first aspect ratio conversion circuit of the conventional image signal reproduction apparatus.
Figure 55:
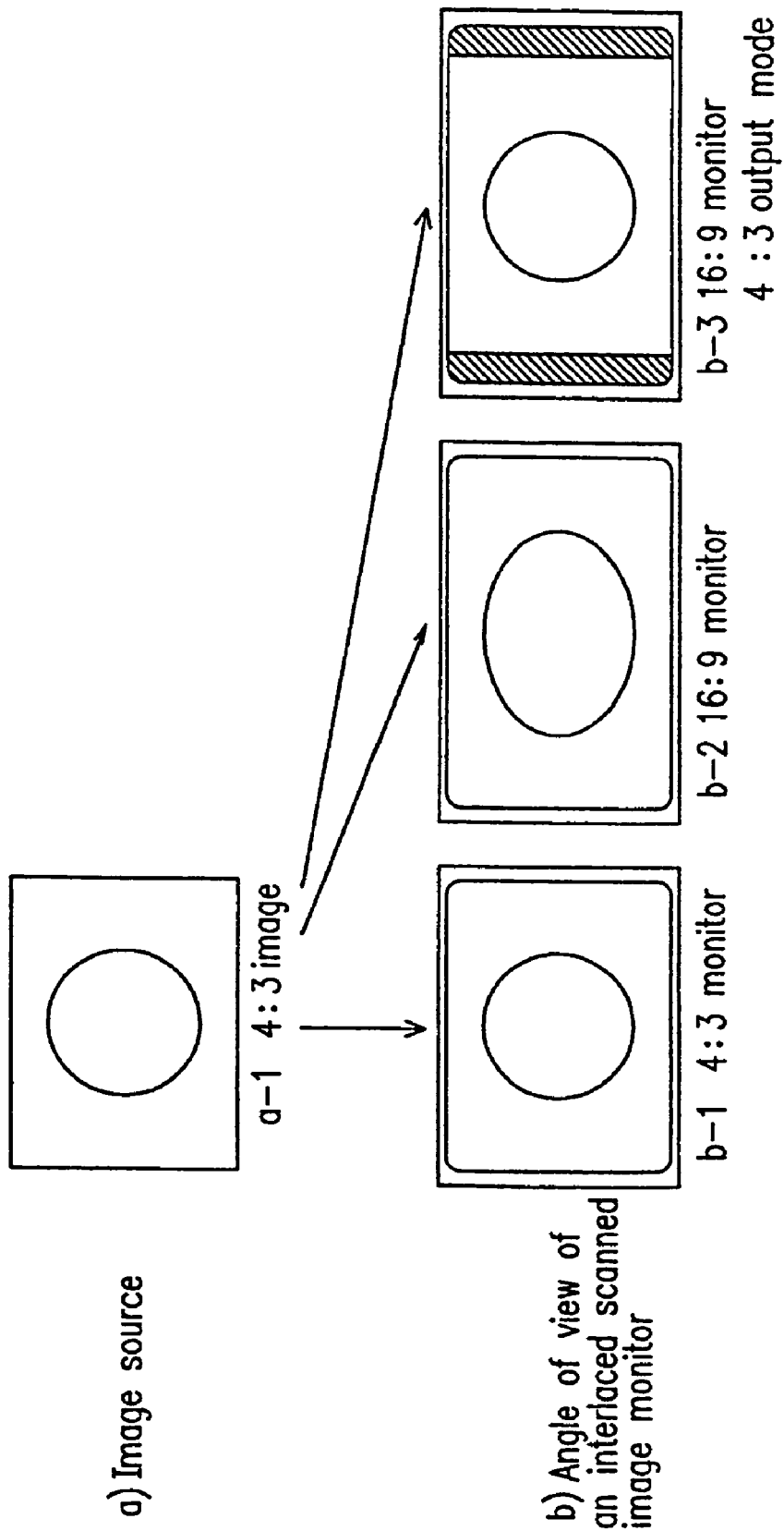
FIG. 55 is a schematic diagram for explaining an aspect ratio of an image displayed on an interlaced scanned image monitor in the case of an image source of the 4:3 full image, in the conventional image signal reproduction apparatus.
Figure 56:
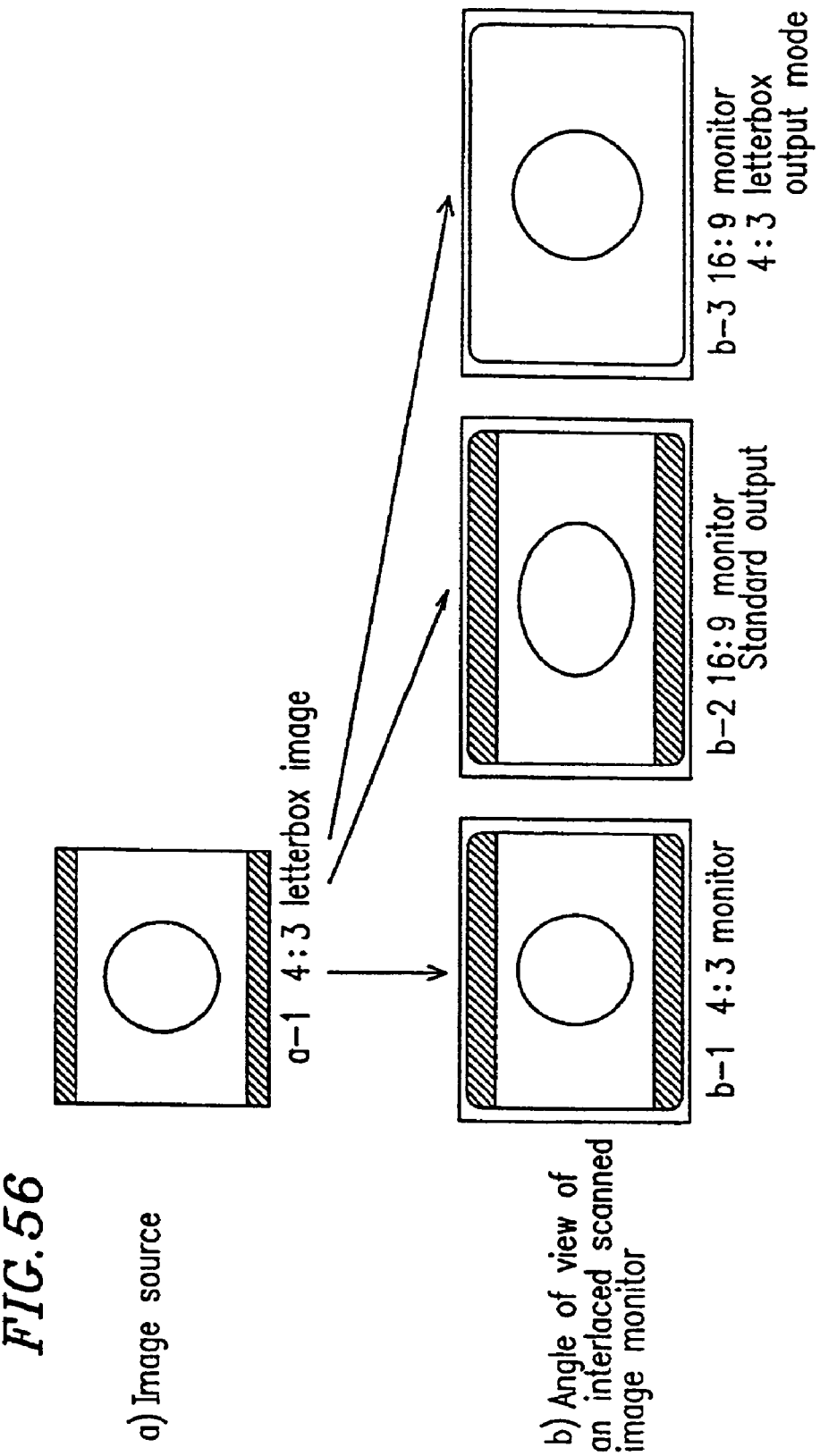
FIG. 56 is a schematic diagram for explaining an aspect ratio of an image displayed on an interlaced scanned image monitor in the case of an image source of the 4:3 letterbox image, in the conventional image signal reproduction apparatus.
Figure 57:
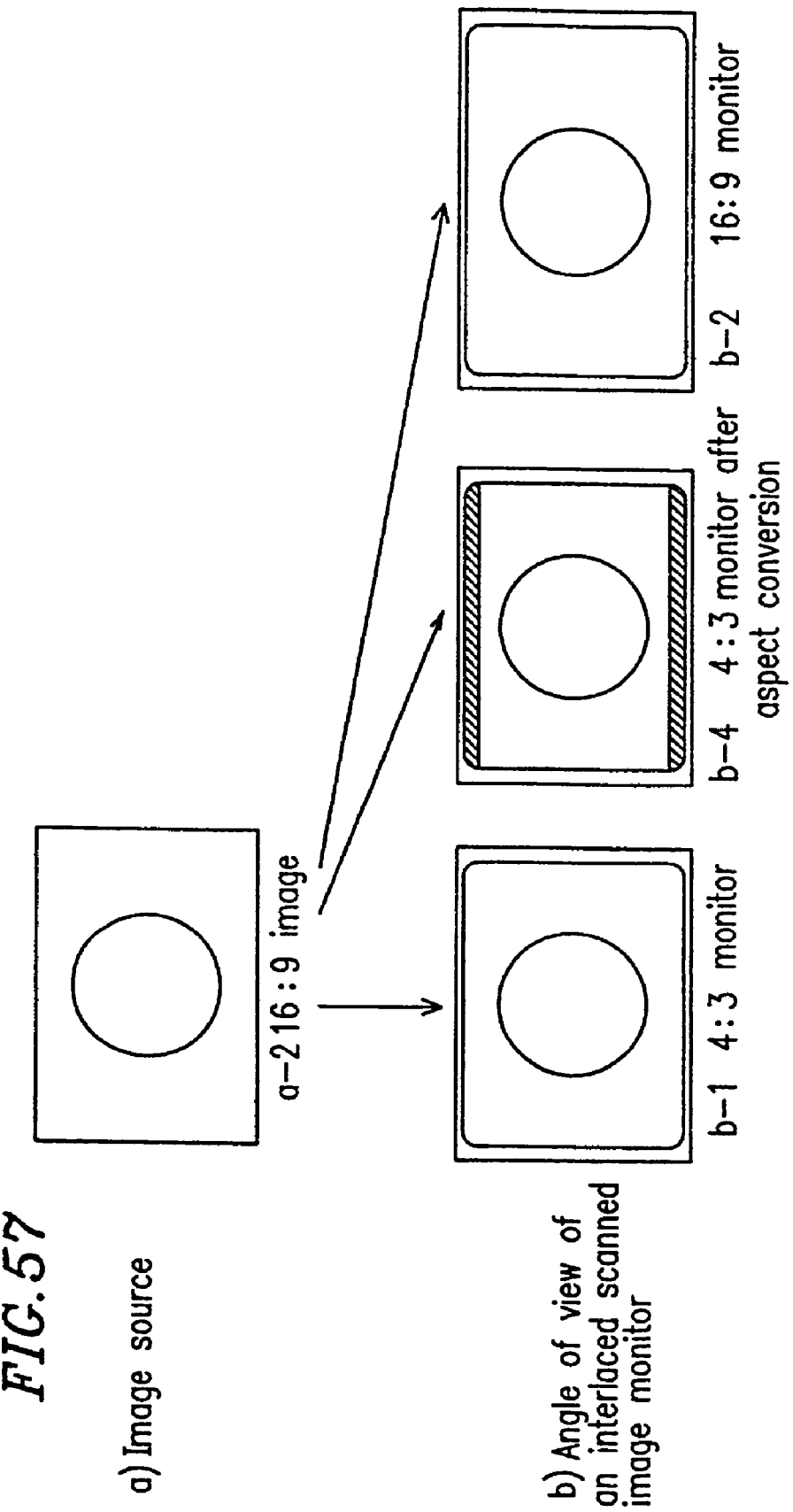
FIG. 57 is a schematic diagram for explaining an aspect ratio of an image displayed on an interlaced scanned image monitor in the case of an image source of the 16:9 image, in the conventional image signal reproduction apparatus.
Figure 58:
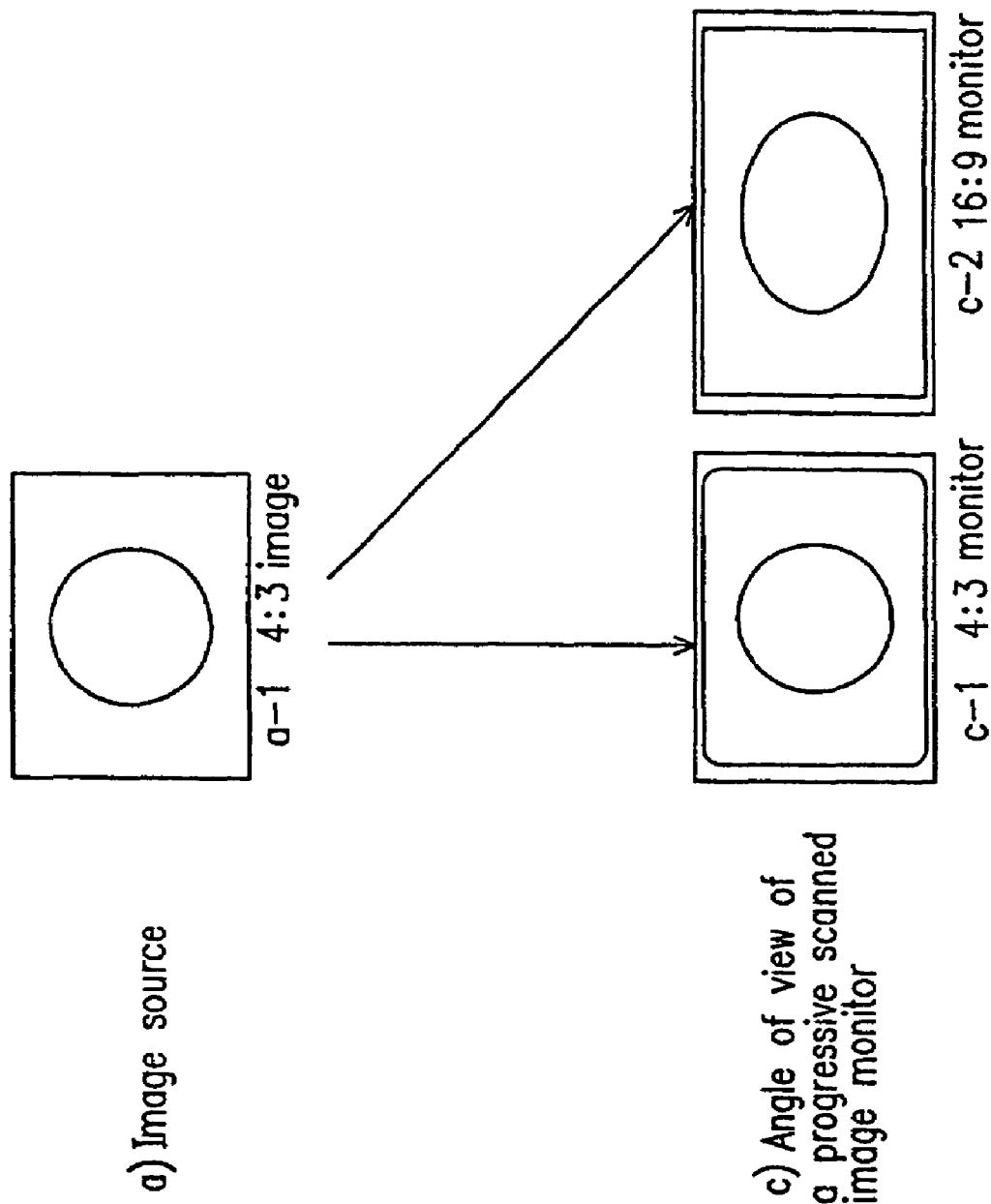
FIG. 58 is a schematic diagram for explaining an aspect ratio of an image displayed on a progressive scanned image monitor in the case of an image source of the 4:3 full image, in the conventional image signal reproduction apparatus.
Figure 59:
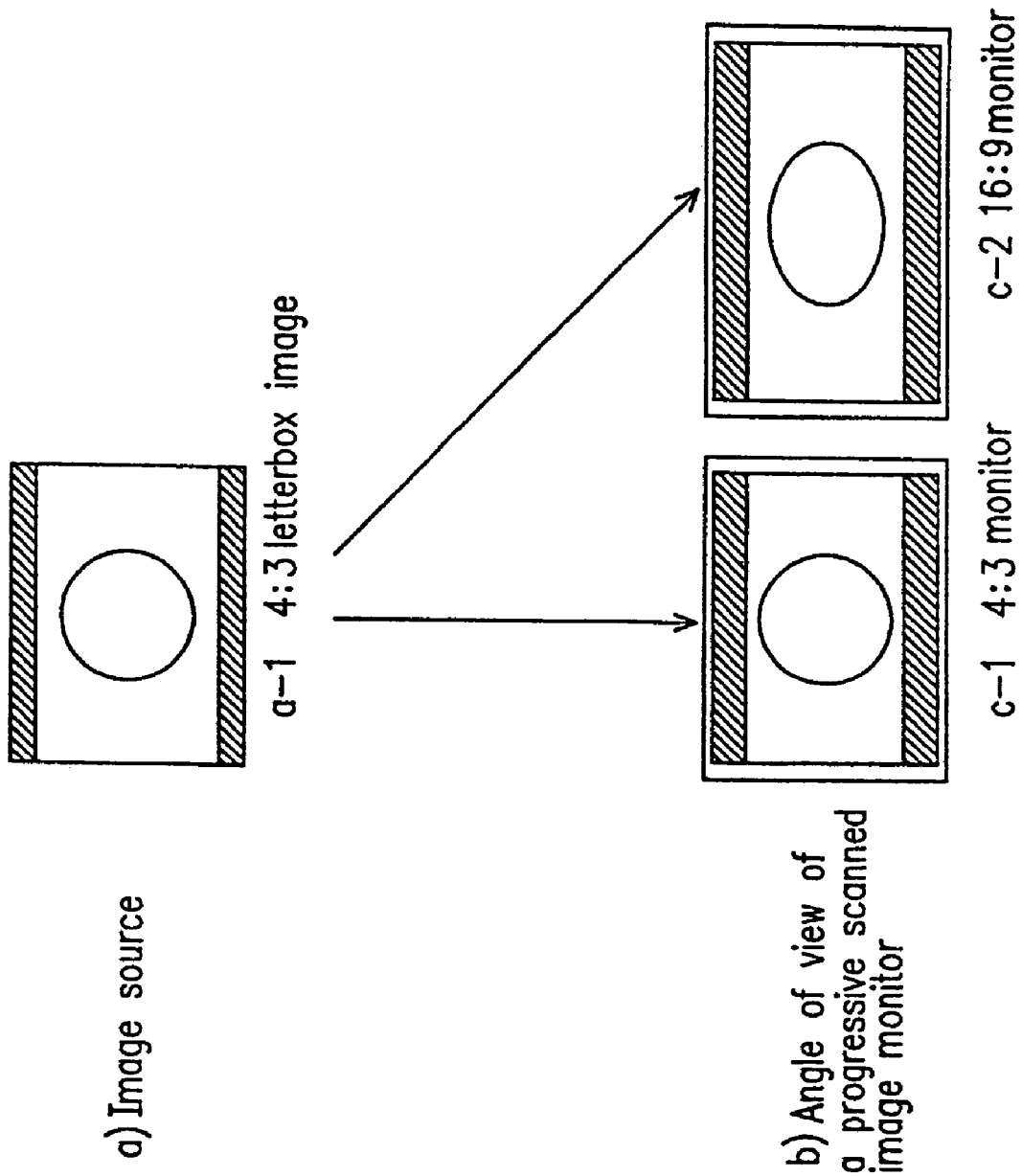
FIG. 59 is a schematic diagram for explaining an aspect ratio of an image displayed on a progressive scanned image monitor in the case of an image source of the 4:3 letterbox image, in the conventional image signal reproduction apparatus.
Figure 60:
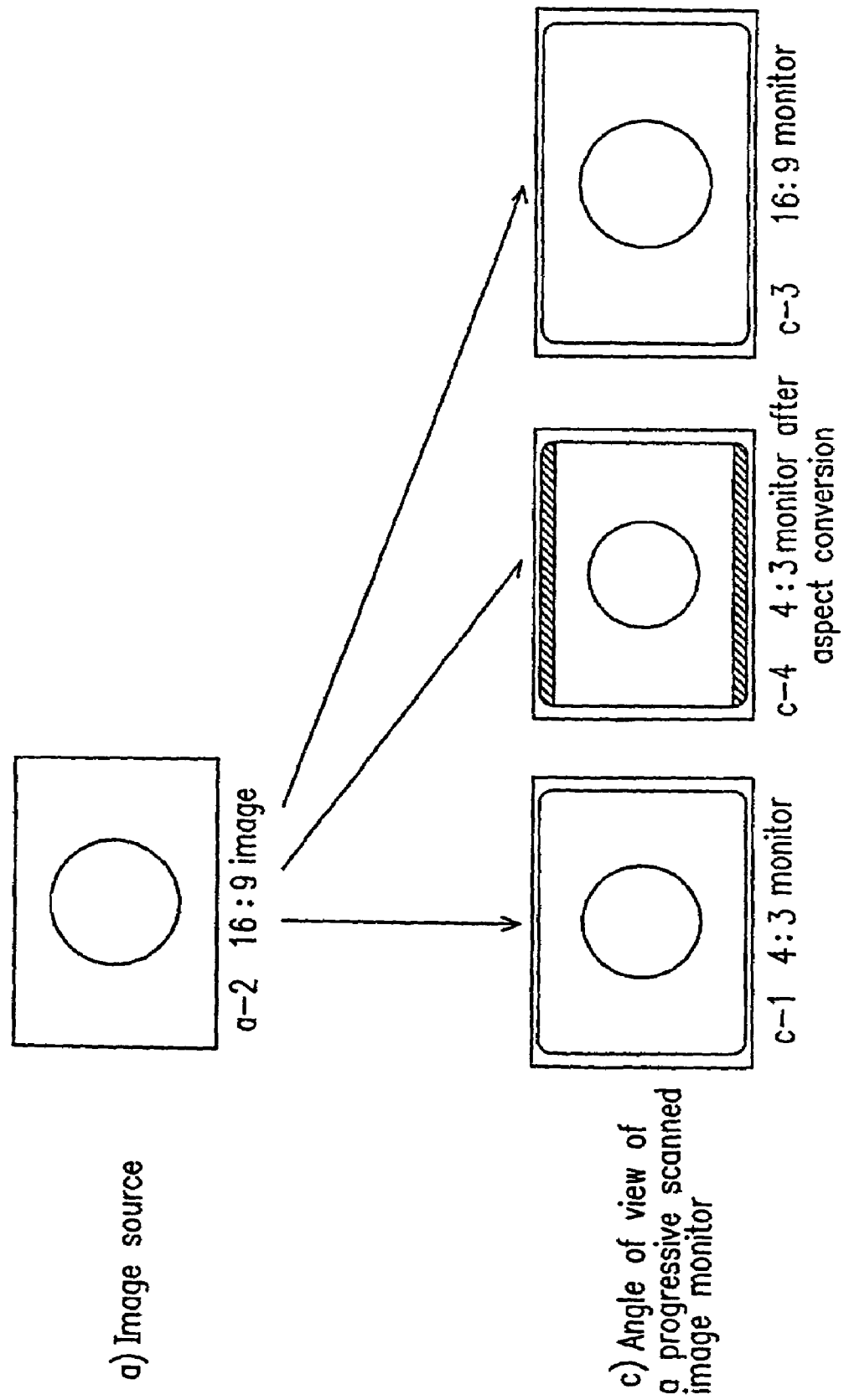
FIG. 60 is a schematic diagram for explaining an aspect ratio of an image displayed on a progressive scanned image monitor in the case of an image source of the 16:9 image, in the conventional image signal reproduction apparatus.

FIG. 30c) shows the aspect ratio of the monitors for the progressive scanned image signal. As shown in FIG. 30c), there are two types of monitor for the progressive scanned image signal, one type shown in FIG. 30c)c-1) having an aspect ratio of 4:3 and the other shown in FIG. 53c)c-2) having an aspect ratio of 16:9.

The interlaced scanned image signal reproduction circuit 304 reads a signal recorded on the disk 301 from an output of the pickup 302, reproduces the interlaced scanned image signal, and outputs the result to the first aspect ratio conversion circuit 306. The material determination circuit 305 reads the determination flag from an output of the pickup 302, determines the type of the image signal, and outputs the result as the determination signal to the first control circuit 312.

The user sets the aspect ratio of a monitor via which the user intends to output the image signal, using the first aspect ratio setting section 313. The first control circuit 312 controls the first aspect ratio conversion circuit 306 using an output of the material determination circuit 305 and an output of the first aspect ratio setting section 313.

Figure 31:
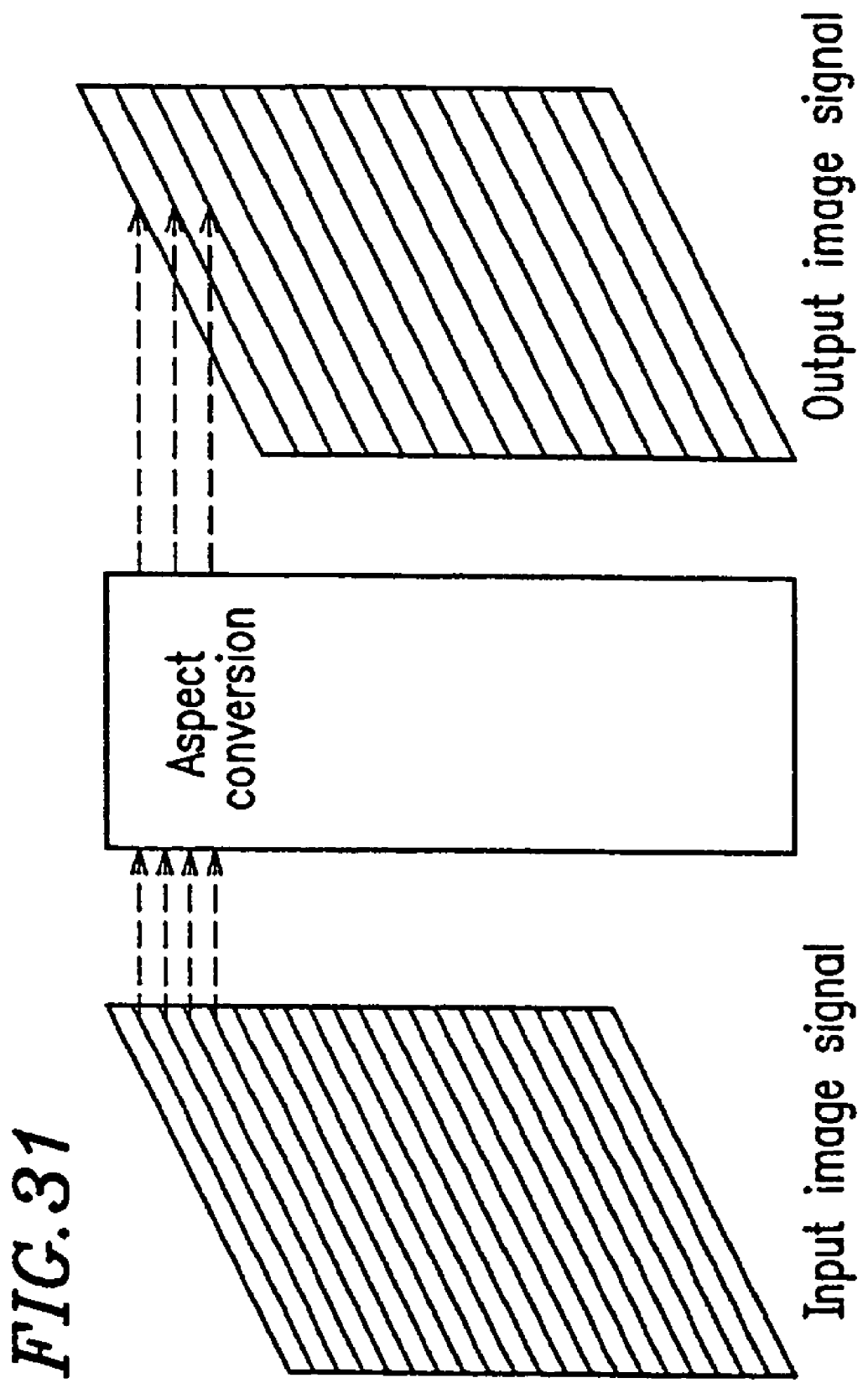
FIG. 31 is a schematic diagram showing the operation of a first aspect ratio conversion circuit of an exemplary image signal reproduction apparatus according to the present invention.

FIG. 31 is a schematic diagram for explaining the operation of the first aspect ratio conversion circuit 306 of the image signal reproduction apparatus according to Example 4 of the present invention.

Assuming that the monitor has an aspect ratio of 4:3, the first aspect ratio conversion circuit 306 has a function which compresses a material having an aspect ratio of 16:9 in the vertical direction. Specifically, in order to display the 16:9 material on the 4:3 monitor at the correct aspect ratio, 4 lines of information of an input image signal are subjected to a filtering process so that 3 lines of information are generated. Such a process is performed for the entire screen, so that the entire screen is compressed in the vertical direction. In this case, the aspect ratio is correctly converted for the 16:9 screen, but leaving blanks in the upper and lower portions. Such portions are rendered as black images. The aspect ratio conversion function can select a working or non-working state using the first control circuit 312. In the case of the non-working state, the first aspect ratio conversion circuit 306 outputs the input image signal without the aspect ratio conversion.

In FIG. 28, the user sets the aspect ratio of the monitor for display to 4:3 or 16:9 using the first aspect ratio setting section 313. On the other hand, the material determination circuit 305 outputs the aspect ratio of the image source, i.e., which it is, the 4:3 full screen, the 4:3 letterbox screen or the 16:9 screen, to the first control circuit 312.

The first control circuit 312 causes the aspect ratio conversion operation of the first aspect ratio conversion circuit 306 to be in the non-working state when the aspect ratio of the image source of the material determination circuit 305 is the 4:3 full image or the 4:3 letterbox image.

The first control circuit 312 causes the aspect ratio conversion operation of the first aspect ratio conversion circuit 306 to be in the non-working state when the material determination circuit 305 indicates that the aspect ratio of the image source of is 16:9 and the first aspect ratio setting section outputs 16:9.

The first control circuit 312 causes the aspect ratio conversion operation of the first aspect ratio conversion circuit 306 to be in the working state when the material determination circuit 305 indicates that the aspect ratio of the image source is 16:9 and the first aspect ratio setting section outputs 4:3.

The NTSC encoder 307 converts an output of the first aspect ratio conversion circuit 306 to the NTSC video format. The interlaced scanned image output is output through the interlaced scanned image output terminal 308 to the interlaced scanned image monitor (not shown).

Figure 32:
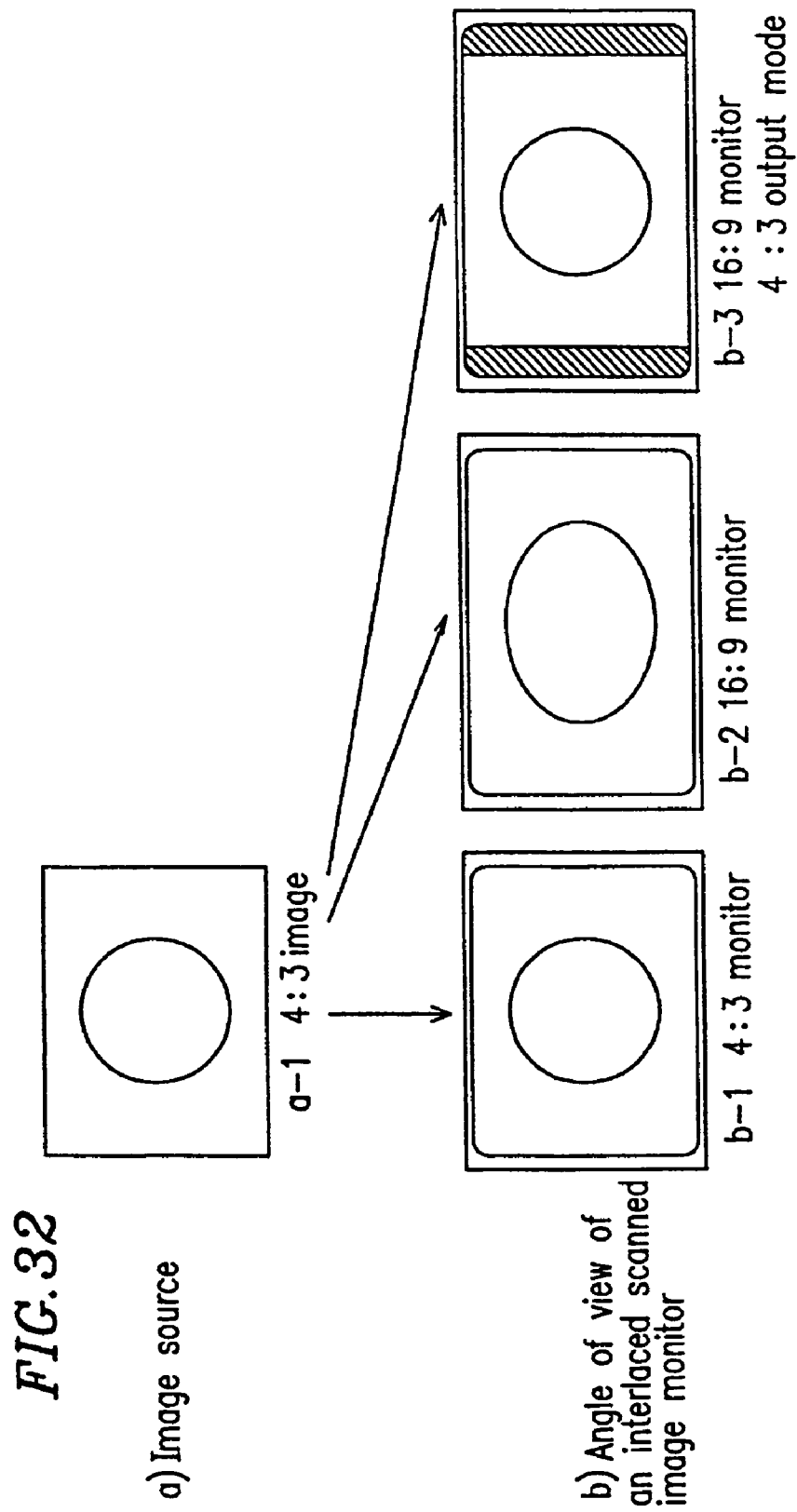
FIG. 32 is a schematic diagram for explaining an aspect ratio of an image displayed on an interlaced scanned image monitor in the case of an image source of the 4:3 full image, in an exemplary image signal reproduction apparatus according to the present invention.

FIG. 32 is a schematic diagram for explaining the aspect ratio of an image displayed on the interlaced scanned image monitor in the case of the image source having the 4:3 full image in the image signal reproduction apparatus of Example 4 of the present invention. As shown in FIG. 32b-1, the correct aspect ratio is displayed on the 4:3 monitor. However, as shown in FIG. 32b-2, the 16:9 monitor does not display the correct aspect ratio, so that the displayed image is extended horizontally. The interlaced scanned image monitor includes a 4:3 output switch function since the standard aspect ratio of the conventional interlaced scanned image signal is 4:3. The interlaced scanned image monitor can display as shown in FIG. 32b-3 at the correct 4:3 aspect ratio using the 4:3 output switch function.

Figure 33:
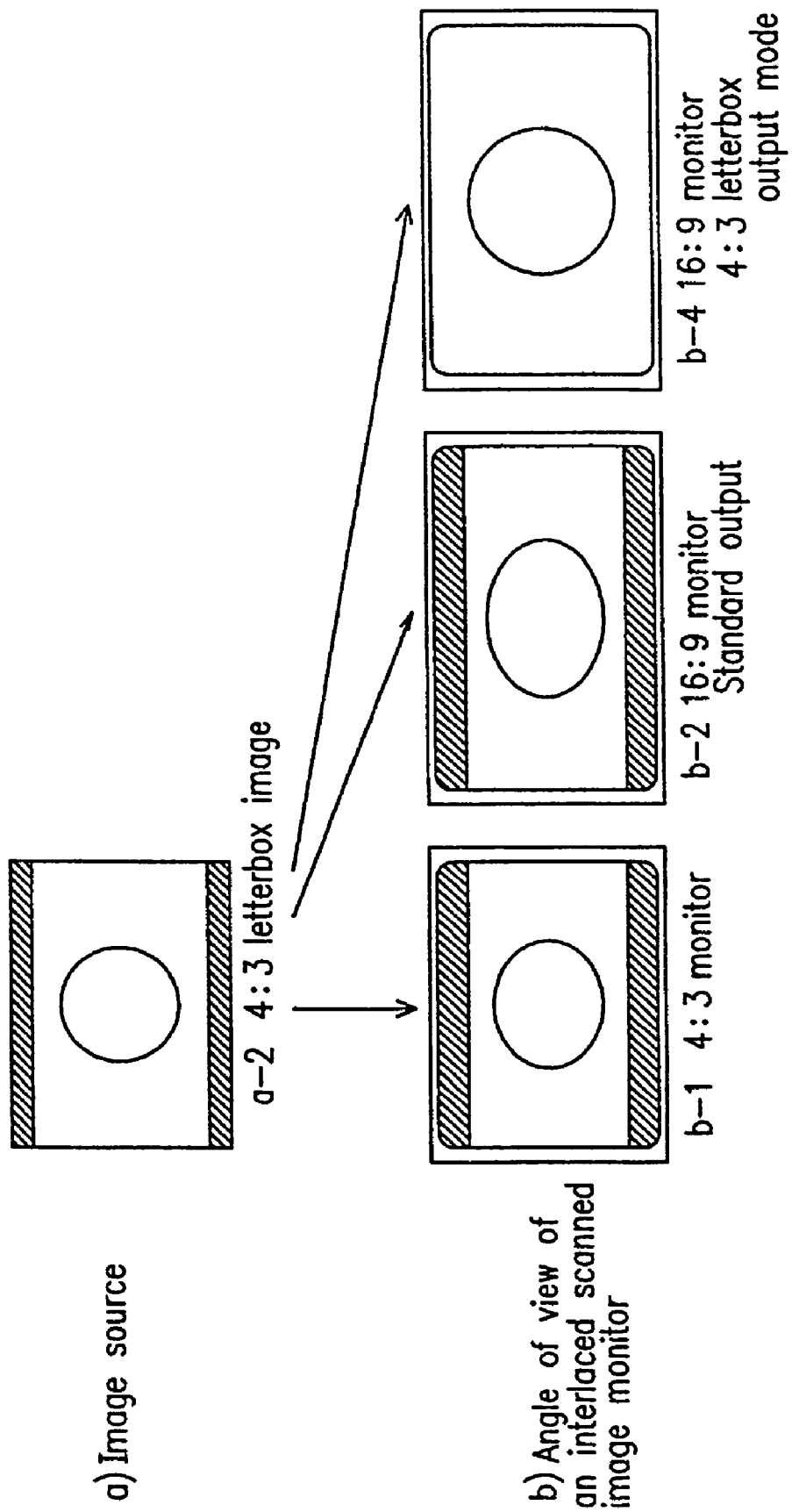
FIG. 33 is a schematic diagram for explaining an aspect ratio of an image displayed on an interlaced scanned image monitor in the case of an image source of the 4:3 letterbox image, in an exemplary image signal reproduction apparatus according to the present invention.

FIG. 33 is a schematic diagram for explaining the aspect ratio of an image displayed on the interlaced scanned image monitor in the case of the image source having the 4:3 letterbox image in the image signal reproduction apparatus of Example 4 of the present invention. As shown in FIG. 33b-1, the correct aspect ratio is displayed on the 4:3 monitor. However, as shown in FIG. 33b-2, the 16:9 monitor does not display the correct aspect ratio, so that the displayed image is extended horizontally. The interlaced scanned image monitor includes a 4:3 letterbox image output switch function since the standard aspect ratio of the conventional interlaced scanned image signal is 4:3. The interlaced scanned image monitor can display as shown in FIG. 33b-3 at the correct 16:9 aspect ratio using the 4:3 output switch function.

Figure 34:
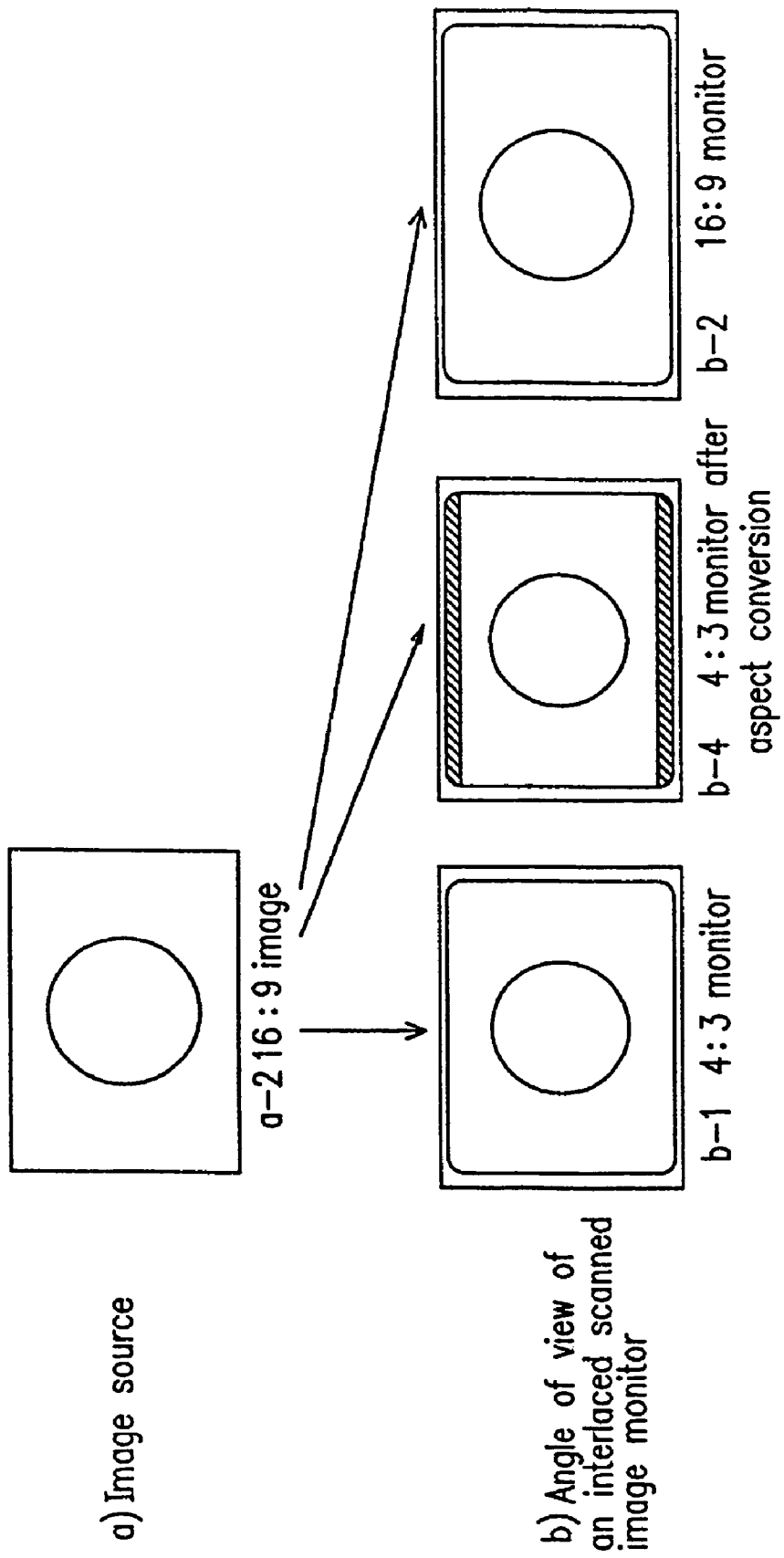
FIG. 34 is a schematic diagram for explaining an aspect ratio of an image displayed on an interlaced scanned image monitor in the case of an image source of the 16:9 image, in an exemplary image signal reproduction apparatus according to the present invention.

FIG. 34 is a schematic diagram for explaining the aspect ratio of an image displayed on the interlaced scanned image monitor in the case of the image source having the 16:9 image in the image signal reproduction apparatus of Example 4 of the present invention. As shown in FIG. 34b-1, the aspect ratio with no change is not correctly displayed on the 4:3 monitor, so that the displayed image is extended vertically. However, if the user sets the fact that a monitor to be connected is 16:9, to the first aspect ratio setting section, the first aspect ratio conversion circuit 306 is activated. The aspect ratio is converted so that the image is correctly displayed as shown in FIG. 34b-4. In addition, as shown in FIG. 34b-2, the 16:9 monitor displays the image at the 16:9 aspect ratio.

Specifically, the interlaced scanned image monitor can display at the correct aspect ratio any combination of 3 types of image sources, i.e., the 4:3 full image, the 4:3 letterbox image, and the 16:9 image with 2 types image monitor, i.e., the 4:3 monitor and the 16:9 monitor.

An output of the first aspect ratio conversion circuit 306 is input to the progressive scanned image signal conversion circuit 309. The progressive scanned image signal conversion circuit 309 converts the input interlaced scanned image signal to the progressive scanned image signal, and outputs the result.

Figure 35:
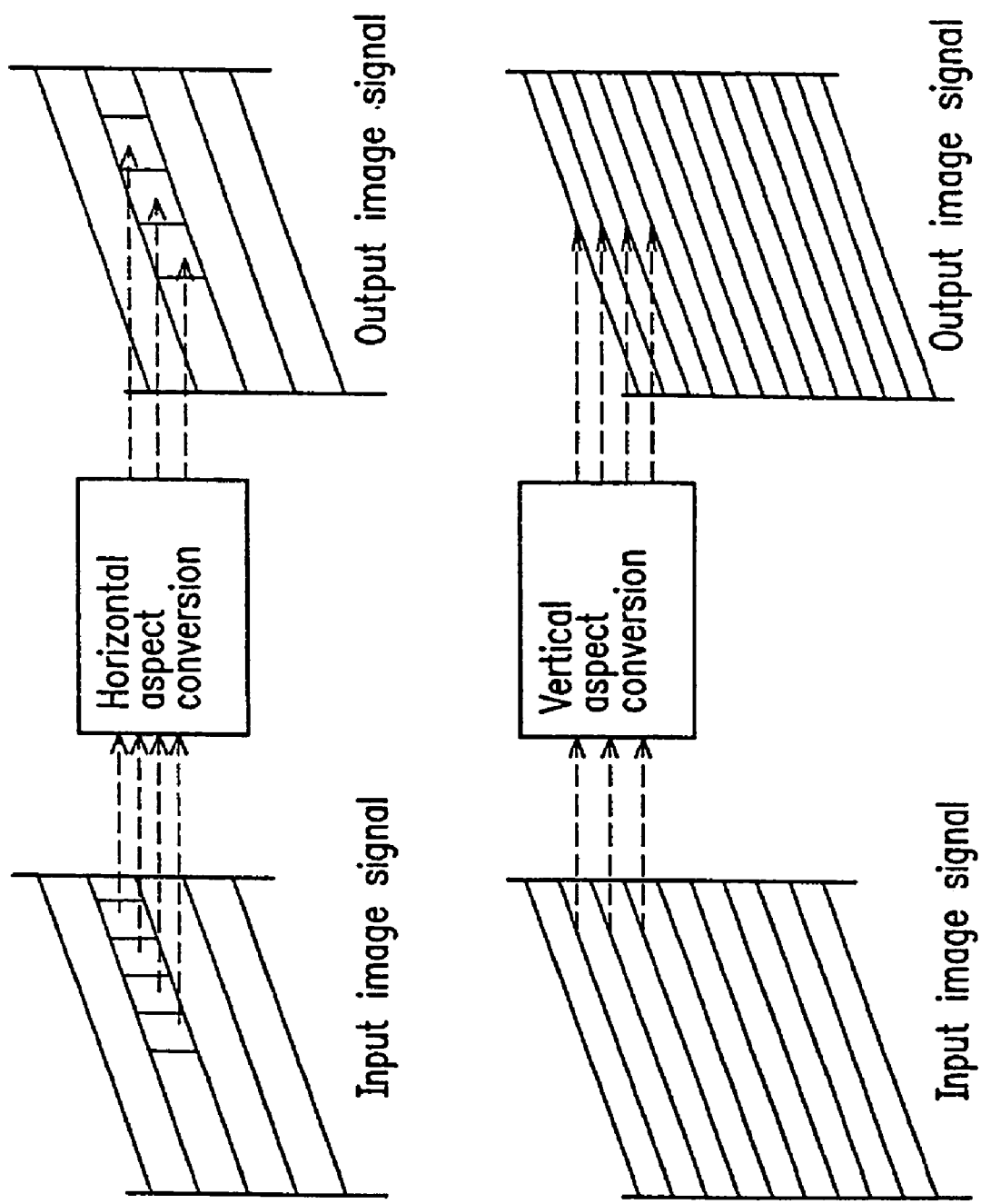
FIG. 35 is a schematic diagram showing the operation of a second aspect ratio conversion circuit of an exemplary image signal reproduction apparatus according to the present invention.

FIG. 35 is a schematic diagram for explaining the operation of the second aspect ratio conversion circuit 316 of the image signal reproduction apparatus of Example 4 of the present invention.

Assuming that the monitor has an aspect ratio of 16:9, the second aspect ratio conversion circuit 306 has a horizontal aspect ratio conversion function which compresses the 4:3 full image in the horizontal direction. Specifically, in order to display the 4:3 material on the 16:9 monitor at the correct aspect ratio, 4 pixels of information of an input image signal are subjected to a filtering process so that 3 pixels of information are generated. Such a process is performed for the entire screen, so that the entire screen is compressed in the horizontal direction. In this case, the aspect ratio is correctly converted for the 4:3 screen, but leaving blanks in the right and left portions. Such portions are rendered as black images.

Assuming that the monitor has an aspect ratio of 16:9, the second aspect ratio conversion circuit 306 has a vertical aspect ratio conversion function which compresses the 4:3 letterbox image in the vertical direction. Specifically, in order to display the 4:3 letterbox image on the 16:9 monitor at the correct aspect ratio, 3 pixels of information of an input image signal are subjected to a filtering process so that 4 pixels of information are generated. Such a process is performed for the entire screen, so that the entire screen is expanded in the vertical direction, thereby being converted into the 16:9 screen.

The two aspect ratio conversion functions each can select a working or non-working state using the second control circuit 312. In the case of the non-working state of both conversion functions, the second aspect ratio conversion circuit 316 outputs the input image signal without the aspect ratio conversion.

In FIG. 28, the user sets the aspect ratio of the monitor for display to 4:3 or 16:9 using the first aspect ratio setting section 313 and the second aspect ratio setting section 314. On the other hand, the material determination circuit 305 outputs the aspect ratio of the image source, i.e., which it is, the 4:3 full screen, the 4:3 letterbox screen or the 16:9 screen, to the second control circuit 315.

The second control circuit 315 causes both the horizontal and vertical aspect ratio conversion operations of the second aspect ratio conversion circuit 316 to be in the non-working state when the aspect ratio of the image source of the material determination circuit 305 is the 4:3 full image or the 4:3 letterbox image and the output of the second aspect ratio setting section 314 is 4:3.

The second control circuit 315 causes the horizontal and vertical aspect ratio conversion operations of the second aspect ratio conversion circuit 316 to be in the working state and in the non-working state, respectively, when the material determination circuit 305 indicates that the aspect ratio of the image source of is the 4:3 full image and the second aspect ratio setting section 314 outputs 16:9.

The second control circuit 315 causes the vertical and horizontal aspect ratio conversion operations of the second aspect ratio conversion circuit 316 to be in the working state and in the non-working state, respectively, when the material determination circuit 305 indicates that the aspect ratio of the image source of is the 4:3 letterbox image and the second aspect ratio setting section 314 outputs 16:9.

The second control circuit 315 causes both the horizontal and vertical aspect ratio conversion operations of the second aspect ratio conversion circuit 316 to be in the non-working state when the aspect ratio of the image source of the material determination circuit 305 is the 16:9 image.

The color difference converter 310 converts the progressive scanned image signal to a color difference image signal, and outputs the progressive scanned image output through the progressive scanned image output terminal 311 to the progressive scanned image monitor (not shown).

Figure 36:
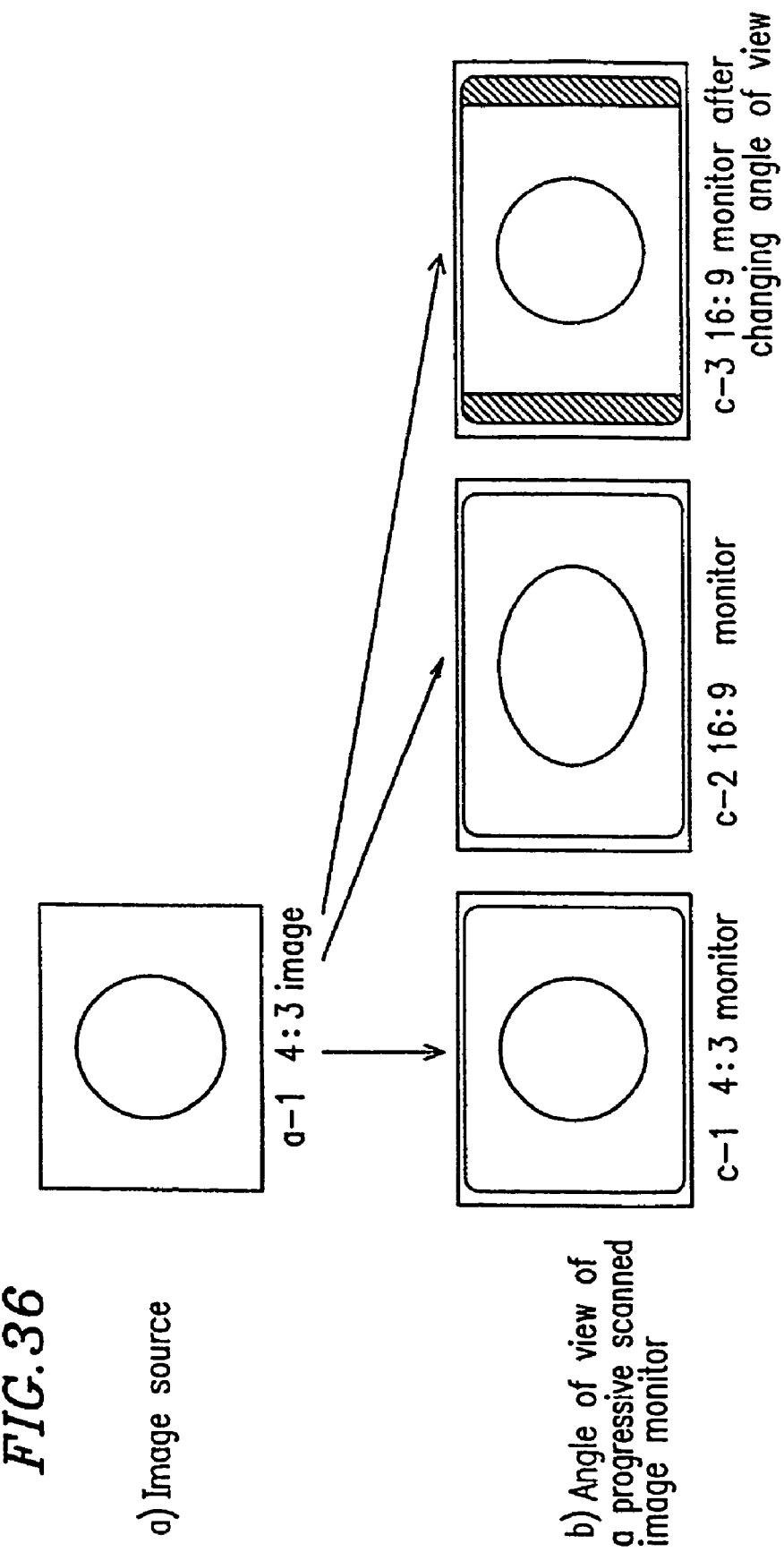
FIG. 36 is a schematic diagram for explaining an aspect ratio of an image displayed on an interlaced scanned image monitor in the case of an image source of the 4:3 full image, in an exemplary image signal reproduction apparatus according to the present invention.

FIG. 36 is a schematic diagram for explaining the aspect ratio of an image displayed on the progressive scanned image monitor in the case of the image source having the 4:3 full image in the image signal reproduction apparatus of Example 4 of the present invention. As shown in FIG. 36c-1, the aspect ratio is correctly displayed on the 4:3 monitor. However, the aspect ratio with no change is not correctly displayed on the 16:9 monitor, so that the displayed image is extended horizontally. Here, the progressive scanned image 16:9 monitor is a monitor intended to receive a high-definition television signal, and does not include the 4:3 output mode. In this case, however, if the user sets the fact that a monitor to be connected is 16:9, to the first and second aspect ratio setting sections 313 and 314, the horizontal aspect ratio conversion function of the second aspect ratio conversion circuit 316 is activated, an image converted into a correct aspect ratio can be displayed as shown in FIG. 36c-3.

Figure 37:
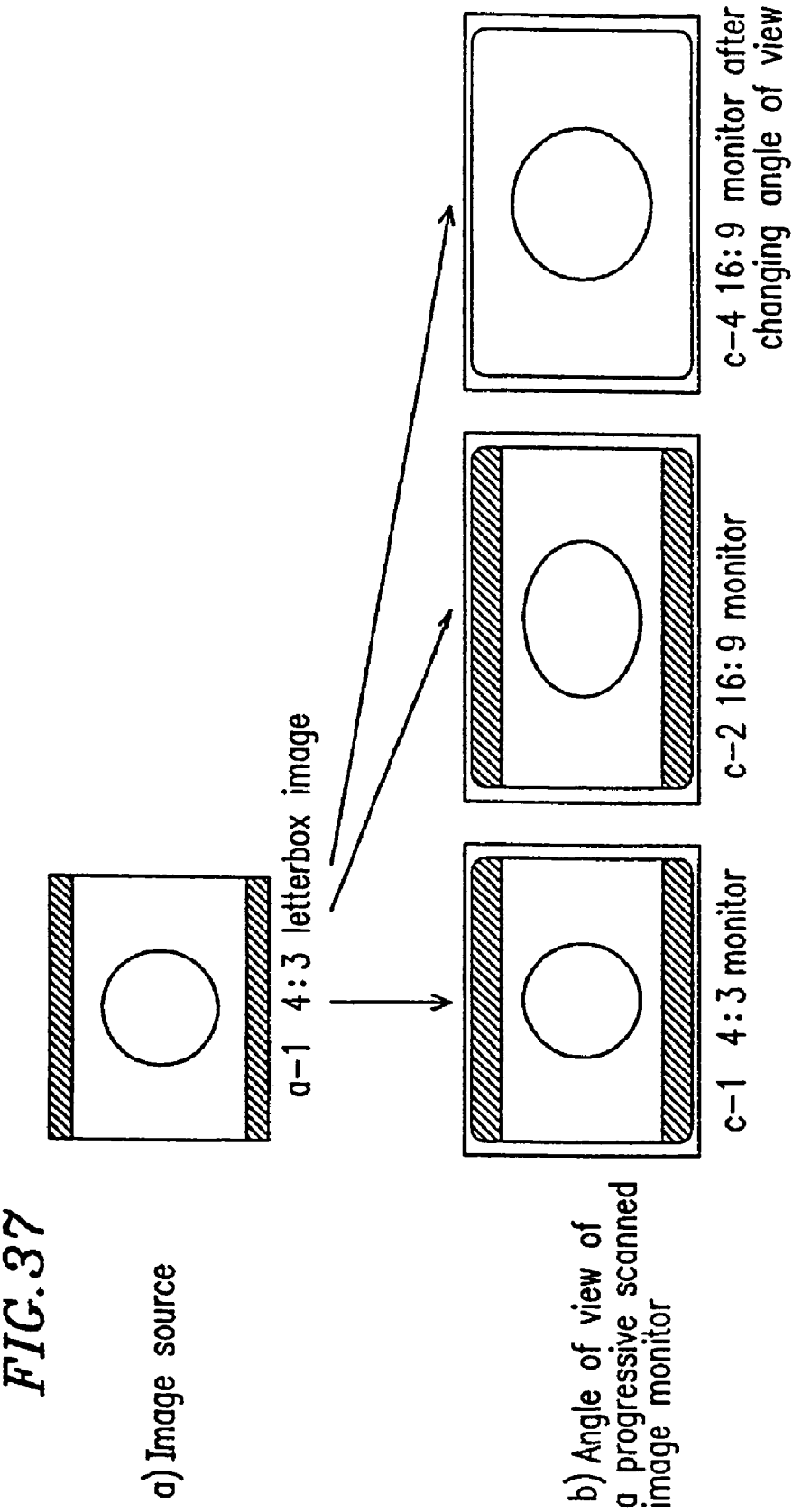
FIG. 37 is a schematic diagram for explaining an aspect ratio of an image displayed on an interlaced scanned image monitor in the case of an image source of the 4:3 letterbox image, in an exemplary image signal reproduction apparatus according to the present invention.

FIG. 37 is a schematic diagram for explaining the aspect ratio of an image displayed on the progressive scanned image monitor in the case of the image source having the 4:3 letterbox image in the image signal reproduction apparatus of Example 4 of the present invention. As shown in FIG. 37c-1, the aspect ratio is correctly displayed on the 4:3 monitor. As shown in FIG. 37c-2, however, the aspect ratio with no change is not correctly displayed on the 16:9 monitor, so that the displayed image is extended horizontally. The progressive scanned image 16:9 monitor is a monitor intended to receive a high-definition television signal, and does not include the 4:3 output mode. The 16:9 standard aspect ratio of the high-definition television signal is not displayed at the correct aspect. In this case, however, if the user sets the fact that a monitor to be connected is 16:9, to the first and second aspect ratio setting sections 313 and 314, the vertical aspect ratio conversion function of the second aspect ratio conversion circuit 316 is activated, an image converted into a correct aspect ratio and into a full screen can be displayed as shown in FIG. 37c-3.

Figure 38:
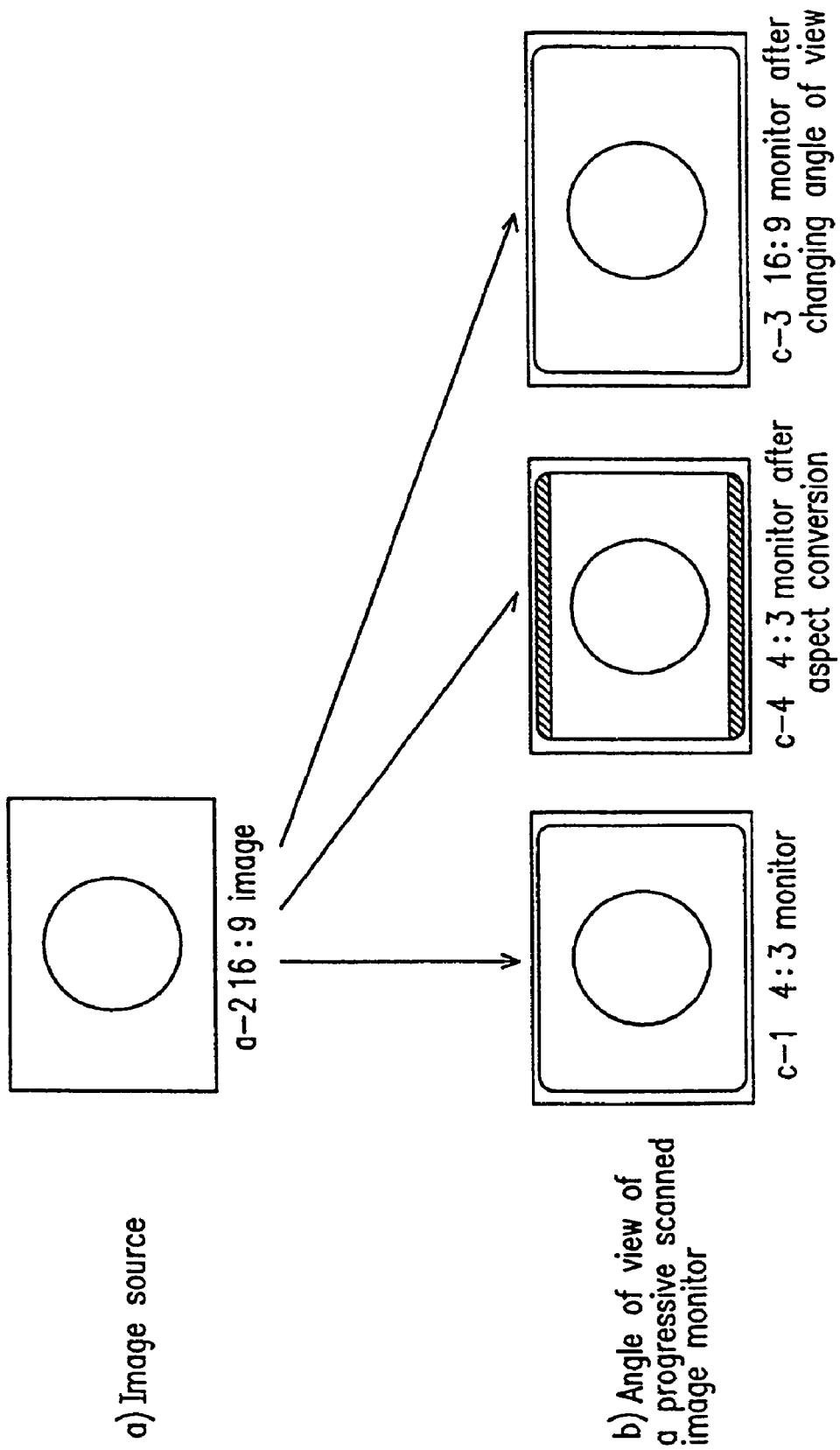
FIG. 38 is a schematic diagram for explaining an aspect ratio of an image displayed on an interlaced scanned image monitor in the case of an image source of the 16:9 image, in an exemplary image signal reproduction apparatus according to the present invention.
Figure 39:
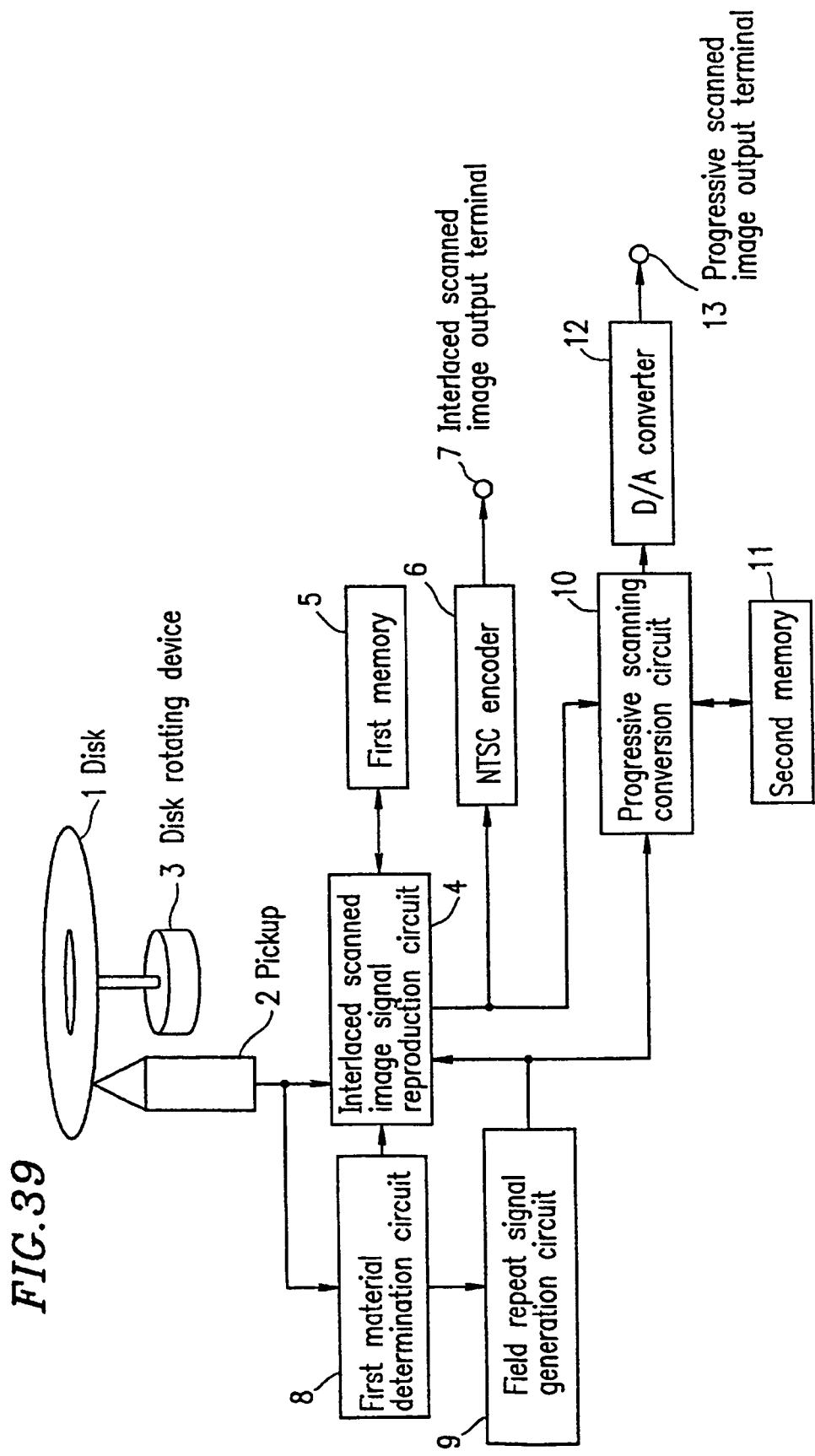
FIG. 39 is a block diagram showing a configuration of a conventional image signal reproduction apparatus.

FIG. 38 is a schematic diagram for explaining the aspect ratio of an image displayed on the progressive scanned image monitor in the case of the image source having the 16:9 image in the image signal reproduction apparatus of Example 4 of the present invention.

As shown in FIG. 38c-1, the aspect ratio with no change is not correctly displayed on the 4:3 monitor, so that the displayed image is extended vertically. However, if the user sets the fact that a monitor to be connected is 4:3, to the first and second aspect ratio setting sections 313 and 314, the first aspect ratio conversion circuit 306 is activated. The aspect ratio is converted so that the image is correctly displayed as shown in FIG. 38c-4. In addition, as shown in FIG. 38c-3, the 16:9 monitor displays the image at the 16:9 aspect ratio.

In other words, in the image signal reproduction apparatus of Example 4 of the present invention, the progressive scanned image monitor can display at the correct aspect ratio any combination of the image sources of the 4:3 full image and the 4:3 letterbox image with the 4:3 and 16:9 image monitors.

Note that, in the present invention, the image sources are limited to the 3 types, i.e., the 4:3 full image, the 4:3 letterbox image, the 16:9 image. If the aspect conversion function of the second aspect ratio conversion circuit is changed in accordance with the aspect ratio of the source, 3 or more types of image sources may be used.

Further, in FIG. 28, each component having reference numeral 304 or thereafter is in the form of a circuit in Example 4, which may be replaced with software.

Further, in Example 4, the description is given of the image signal recorded on a disk medium. The present invention can also be applied to other tape media, and information media including an image signal, such as satellite broadcast and ground-wave broadcast.

INDUSTRIAL APPLICABILITY

As described above, according to the present invention, an image signal reproduction apparatus is provided which includes a section which determines the type of a material using the field repeat signal generated when converting the film material into an interlaced scanned image signal and the determination flag for determining the type of the main image signal, and a section which determines whether a material signal is of film or video using an image signal which has been once converted into an interlaced scanned image signal. Using the determination results of both sections, the determination of the material is performed. Therefore, the image signal reproduction apparatus can apply the progressive scanning conversion suitable for film material to an image signal of film material which has been partially recorded as a video signal of 60 fields per second.

Further, according to the present invention, an image signal reproduction apparatus is provided which includes an interlaced scanned image signal reproduction section which outputs an image signal as an interlace scanned image signal of 60 fields per second, a progressive scanning conversion section which converts an image signal to a progressive scanned image signal, and a filtering section which changes the frequency characteristics of the output of the progressive scanning conversion section. Therefore, the image signal reproduction apparatus can output a progressive scanned image with a resolution close to the original film and with less degradation of resolution compared with the interlaced scanned image even in visual appreciation, after subjecting the film material image signal to progressive scanning conversion.

Still further, according to the present invention, an image signal reproduction apparatus is provided which includes a second aspect ratio conversion circuit which compresses an image in the horizontal or expands an image in the vertical direction after progressive scanned image signal conversion, a second aspect ratio setting section which sets the screen aspect ratio of an image receiver for outputting the progressive scanned image signal on a screen, and a second control circuit which controls the second aspect ratio conversion circuit using the second aspect ratio setting section and a material determination circuit. Therefore, the image signal reproduction apparatus can output an image having a correct aspect in any combination of 3 types of image sources, i.e., the 4:3 full image, the 4:3 letterbox image, and the 16:9 image with 2 types of progressive scanned image monitors, i.e., 4:3 and 16:9.

The invention claimed is:

1. An image signal reproduction apparatus for reproducing a main image signal including either a first type of image signal obtained by converting a film material image into an electrical signal or a second type of image signal including a video signal as a material thereof, using a transfer information including the main image signal and a determination flag for determining whether the main image signal is the first type of image signal or the second type of image signal, the apparatus including:

a first timing signal generation section for outputting a first timing signal indicating a field to be repeatedly output in the case where the main image signal is the first type of image signal;

a first material determination section for determining whether the main image signal is the first type of image signal or the second type of image signal, based on the determination flag;

an interlaced scanned image signal reproduction section for converting the main image signal to an interlaced scanned image signal of 60 fields per second in response to an output of the first timing signal generation section when the first material determination section determines that the maim image signal is the first type of image signal, and outputting the main image signal as it is when the first material determination section determines that the main image signal is the second type of image signal;

a field memory for storing 2 fields of outputs of the interlaced scanned image signal reproduction section;

a field difference detection section for detecting a difference between an output of the interlaced scanned image signal reproduction section and an output of the field memory;

a second material determination section for determining whether the main image signal is the first type of image signal or the second type of image signal, based on an output of the first material determination section or on outputs of the first timing signal generation section and the field difference detection section;

a second timing signal generation section for generating a second timing signal indicating a breakpoint between frames of the film material in the interlaced scanned image signal, based on an output of the field difference detection section when the second material detection section detects that the main image signal is the first type of image signal; and a progressive scanning conversion section for obtaining a progressive scanned image signal by synthesizing 2 fields of interlaced scanned image signals of 60 fields per second in response to the second timing signal when a generation method of an insertion scanning signal is changed in response to an output of the second material determination section and the second material determination section determines that the main image signal is the first type of image signal.

2. An image signal reproduction apparatus according to claim 1, wherein the second material determination section determines that the main image signal is the first type of image signal when an output of the first material determination section or when a state of the timing generation section is in the state of the first type of image signal; even when the output of the first material determination section or the state of the timing generation section transitions from the state of the first type of image signal to the state of the second type of image signal, if the field difference detection section detects a field matching in a given period, the second material determination section determines that the main image signal is the first type of image signal.

3. An image signal reproduction apparatus according to claim 2, wherein even when the output of the first material determination section or the state of the timing generation section transitions from the state of the first type of image signal to the state of the second type of image signal, if the field difference detection section detects a field matching every 5 fields, the second material determination section determines that the main image signal is the first type of image signal.

4. An image signal reproduction apparatus for reproducing an information signal including any one of a first image signal obtained by converting a film material into an electrical signal or a second image signal whose material is a video signal, the apparatus including:

an interlaced scanned image signal reproduction section for outputting the information signal as an interlaced scanned image signal of 60 fields per second;

a progressive scanning conversion section for converting the information signal to a progressive scanned image signal; and a filtering section for receiving the progressive scanned image signal obtained by the progressive scanning conversion section to change a frequency characteristic of the progressive scanned image signal so as not to generate a difference in visual appreciation between the interlaced scanned image signal and the progressive scanned image signal, wherein the filtering section differentiates frequency characteristics between the first and second image signals.

5. An image signal reproduction apparatus according to claim 4, wherein an output of the interlaced scanned image signal reproduction section is the input of the progressive scanning conversion section.

6. An image signal reproduction apparatus according to claim 4, wherein the frequency characteristic can be changed by a setting made by the user.

7. An image signal reproduction apparatus according to claim 5, wherein the frequency characteristic can be changed by a setting made by the user.

8. An image signal reproduction apparatus according to claim 4, wherein the frequency characteristic can be changed by a setting made by the user.

9. An image signal reproduction apparatus including:

an interlaced scanned image signal reproduction section for reproducing an image signal and an information signal including a determination signal determining the aspect ratio of the image signal as an interlaced scanned image signal of 60 fields per second;

a flag determination section for reading the determination flag;

a first aspect ratio conversion section for converting the aspect ratio of the interlaced scanned image signal;

a first setting section for setting the aspect ratio of an image receiver to which an output of the first aspect ratio conversion section is output;

a first control section for controlling the aspect ratio of an output of the first aspect ratio conversion section based on outputs of the first setting section and the flag determination section;

a progressive scanning conversion section for converting the output of the first aspect ratio conversion section to a progressive scanned image signal;

a second aspect ratio conversion section for converting the image signal into an aspect ratio different from the first aspect ratio of the output of the first aspect ratio conversion section;

a second setting section for setting the aspect ratio of an image receiver to which an output of the second aspect ratio conversion section is output; and a second control section for controlling the aspect ratio of an output of the second aspect ratio conversion section based on outputs of the second setting section and the flag determination section.

10. An image signal reproduction apparatus according to claim 9, wherein the first aspect ratio conversion section has functions of compressing an input image signal in a vertical direction, and causing a blank portion to be a black image; and the second aspect ratio conversion section has functions of compressing an input image signal in a horizontal direction, and causing a blank portion to be a black image.

11. An image signal reproduction apparatus according to claim 9, wherein the first aspect ratio conversion section has functions of compressing an input image signal in a vertical direction, and causing a blank portion as a result of the compression to be a black image; and the second aspect ratio conversion section has either a function of compressing an input image signal in a horizontal direction, and causing a blank portion as a result of the compression to be a black image, or a function of expanding the image in the vertical direction.

12. An image signal reproduction apparatus according to claim 9, wherein the determination flag includes at least two pieces of image information of an aspect ratio of 4:3, an aspect ratio of 16:9, and 16:9 image information in a screen having an aspect ratio of 4:3.

13. An image signal reproduction apparatus according to claim 10, wherein the determination flag includes at least two pieces of image information of an aspect ratio of 4:3, an aspect ratio of 16:9, and 16:9 image information in a screen having an aspect of 4:3.

14. An image signal reproduction apparatus according to claim 11, wherein the determination flag includes at least two pieces of image information of an aspect ratio of 4:3, an aspect ratio of 16:9, and 16:9 image information in a screen having an aspect of 4:3.

* * * * *